US008657188B2

(12) United States Patent
Ma et al.

(10) Patent No.: US 8,657,188 B2
(45) Date of Patent: Feb. 25, 2014

(54) AUTOMATED BANKING SYSTEM CONTROLLED RESPONSIVE TO DATA BEARING RECORDS

(75) Inventors: Songtao Ma, Wadsworth, OH (US); Eric Toepke, Akron, OH (US); Mike R. Ryan, Canton, OH (US); Randall W. Jenkins, Orrville, OH (US); Natarajan Ramachandran, Uniontown, OH (US); Thomas D. Ertle, Massillon, OH (US); Tim Crews, Alliance, OH (US); Willis Miller, Cuyahoga Falls, OH (US); Nick Billett, Massillon, OH (US); Steven Shepley, Uniontown, OH (US); Dave Krzic, Wadsworth, OH (US); Victor A. Cogan, Amherst, OH (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 13/567,023

(22) Filed: Aug. 4, 2012

(65) Prior Publication Data

US 2012/0312870 A1 Dec. 13, 2012

Related U.S. Application Data

(63) Continuation of application No. 13/324,252, filed on Dec. 13, 2011, which is a continuation-in-part of application No. 13/134,592, filed on Jun. 10, 2011, now Pat. No. 8,448,849, which is a continuation of application No. 12/459,187, filed on Jun. 26, 2009, now Pat. No. 7,959,072.

(60) Provisional application No. 61/459,593, filed on Dec. 14, 2010, provisional application No. 61/572,328, filed on Jul. 14, 2011, provisional application No. 61/192,282, filed on Sep. 17, 2008, provisional application No. 61/133,477, filed on Jun. 30, 2008, provisional application No. 61/133,346, filed on Jun. 27, 2008.

(51) Int. Cl.
*G06F 17/00* (2006.01)
*G06F 1/00* (2006.01)
*G06K 5/00* (2006.01)
*G06Q 40/00* (2012.01)

(52) U.S. Cl.
USPC ............. 235/379; 235/375; 235/380; 705/43; 902/8; 713/300; 713/323

(58) Field of Classification Search
USPC ................. 235/375, 379, 380; 705/43; 902/8; 713/300, 323
See application file for complete search history.

(56) References Cited

U.S. PATENT DOCUMENTS

2002/0162884 A1* 11/2002 Speas et al. .................. 235/380
2003/0132288 A1* 7/2003 Fulcher et al. ............... 235/381

(Continued)

*Primary Examiner* — Daniel Hess
*Assistant Examiner* — Laura Gudorf
(74) *Attorney, Agent, or Firm* — Black, McCuskey, Souers & Arbaugh, LPA

(57) ABSTRACT

An automated banking machine operates responsive to data read from data bearing records corresponding to authorized user or financial account data. The automated banking machine includes a card reader for reading data from user cards. The automated banking machine causes financial transfers related to financial accounts that correspond to data read from user cards. The automated banking machine also includes devices that control the supply of power to transaction function devices such as the card reader to avoid exceeding power supply capacity.

20 Claims, 22 Drawing Sheets

(56) References Cited

U.S. PATENT DOCUMENTS

2006/0054700 A1* 3/2006 May .............................. 235/449
2006/0090079 A1* 4/2006 Oh et al. ....................... 713/186
2006/0131408 A1* 6/2006 McNamara ................... 235/440
2010/0106982 A1* 4/2010 Castelli et al. ................ 713/300
2010/0273450 A1* 10/2010 Papineau et al. ............. 455/411

* cited by examiner

AUTOMATED BANKING SYSTEM CONTROLLED RESPONSIVE TO DATA BEARING RECORDS

CROSS REFERENCE TO RELATED APPLICATIONS

This application is a continuation of application Ser. No. 13/324,252 filed Dec. 13, 2011, which claims benefit pursuant to 35 U.S.C. §119(e) of provisional applications 61/459,593 filed Dec. 14, 2010 and 61/572,328 filed Jul. 14, 2011. Application Ser. No. 13/324,252 is also a continuation-in-part of application Ser. No. 13/134,592 filed Jun. 10, 2011, which is a continuation of application Ser. No. 12/459,187 filed Jun. 26, 2009, which claims benefit pursuant to 35 U.S.C. §119(e) of provisional applications 61/192,282 filed Sep. 17, 2008; 61/133,477 filed Jun. 30, 2008; and 61/133,346 filed Jun. 27, 2008. The disclosures of each of these applications are herein incorporated by reference in their entirety.

TECHNICAL FIELD

This invention relates to banking systems controlled by data bearing records that may be classified in U.S. Class 235, Subclass 379.

BACKGROUND ART

Automated banking machines may include a card reader that operates to read data from a bearer record such as a user card. Automated banking machines may operate to cause the data read from the card to be compared with other computer stored data related to the bearer or their financial accounts. The machine operates at least in part in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of exemplary embodiments to provide an improved automated banking machine.

It is another object of exemplary embodiments to provide an automated banking machine having improved operating and servicing capabilities.

It is a further object of exemplary embodiments to provide an automated banking machine that deters the theft thereof.

It is a further object of exemplary embodiments to provide an automated banking machine that can carry out certain computer executable instructions when the machine has been disconnected from its power source and/or network connections.

It is a further object of exemplary embodiments to provide an automated banking machine that may allocates power to its components based on certain criteria.

It is a further object of exemplary embodiments to provide an automated banking machine that is more energy efficient.

Further objects of exemplary embodiments will be made apparent in the following Detailed Description of Exemplary Embodiments and the appended claims.

The foregoing objects are accomplished in one exemplary embodiment by an apparatus including a cash dispensing automated banking machine that includes a visual display, at least one serviceable component, and a controller. For purposes of this disclosure a controller shall be construed as at least one processor that executes program instructions. The exemplary apparatus also includes a movable image capture device such as a camera in operative connection with the controller, which can be selectively positioned toward and away from the serviceable component. Visual images generated by the image capture device can be output on the visual display. Thus, regions of the serviceable component that cannot be directly viewed by a servicer by looking into the interior of the machine may be indirectly viewed by a servicer.

The exemplary apparatus may include a microphone that can pick up sounds which may correspond to diagnostic information related to a transaction function device. The sonic information may be output to a service provider through speakers located at the rear of the banking machine, through headphones, or be communicated by the machine to a remote location. A microphone may also be used in some embodiments to pick up sounds in front of or near the banking machine to alert a service provider that a potential customer is approaching. In some embodiments a microphone may be attached to the image capture device, so that image data and sonic data may be simultaneously generated.

Diagnostic information, such as the generated visual images and/or sonic information, concerning one or more transaction function devices, may be stored in one or more data stores in operative connection with one or more machine controllers. A service provider may be permitted to access the diagnostic information by placing a diagnostic article, such as a CD, in engagement with a diagnostic article reading device on the machine. Information about the transaction function devices and data generated by image capture devices may be stored on-site in the machine, stored on the diagnostic article, or may be communicated to a remote computer.

Some exemplary banking machines may be equipped with a service display primarily used for service and diagnostic purposes. This service display may be a separate display from the customer display that provides outputs to machine users conducting cash dispensing and other transactions. Alternately or in addition, a display in operative connection with a remote computer may be utilized for service and diagnostic purposes. Visual images, sonic information, device status information and/or diagnostic information may be communicated to the remote computer through a communications network. The remote computer may be used to analyze such information for service purposes.

In some exemplary embodiments an automated banking machine includes components that control the supply of power to devices in the machine. In exemplary embodiments the devices operate to control the supply and shutoff of electrical power to components of the machine in predetermined sequences. In exemplary embodiments predetermined sequences are operative to avoid the risk of damage that may result from electrical power being shut off to devices at undesirable times in the operating sequence. Further exemplary embodiments control the start and shutdown of the terminal processor of the machine. In still other embodiments the shutdown and restart of the terminal processor and other devices in the machine may be controlled remotely. This can facilitate correcting malfunctions that can be remedied merely by shutting down the machine and restarting the terminal processor and other devices.

In still other exemplary embodiments an automated banking machine includes components that determine whether to supply or not supply power to devices in response to requests to supply power from the devices. This determination may, for example, be based on the amount of additional power available from a power supply that supplies power to the devices.

In still other exemplary embodiments reliability of an automated banking machine can be increased by assuring that configuration files and other information included in a database that operates in connection with a terminal processor of the machine can be recovered in the event of a malfunction.

In further exemplary embodiments the automated banking machine includes a controller with a processor that operates to carry out instructions in a first data store when the machine is in normal operation. These instructions include application instructions that are operative to cause the banking machine to carry out transactions. The exemplary embodiment further includes a further data store in operative connection with the at least one processor. This further data store includes exception instructions. The exception instructions are executed by the at least one processor in an out-of-band environment such as for example when the banking machine has been disconnected from its normal power source and/or network connection. The exception instructions may be operative for example, in circumstances that suggest that the banking machine has been taken by thieves and is being moved from its original location for purposes of accessing the interior thereof.

In still other example embodiments the banking machine may include a wireless receiving device. The receiving device may receive wireless signals from a remote source such as an entity monitoring the banking machine. Such received signals may cause the execution of certain exception instructions. Such received signals may also cause the output of status data regarding the status of devices and/or the output of wireless signals including image data.

In still other exemplary embodiments the exception instructions which may be executed in an out-of-band environment may operate to provide other capabilities for the automated banking machine. These may include diagnostic capabilities as well as recovery capabilities from malfunctions or other problems that arise. Such capabilities may also include operation in a mode to reduce energy consumption. Of course these approaches are exemplary.

DETAILED DESCRIPTION OF EXEMPLARY EMBODIMENTS

Figure 1:
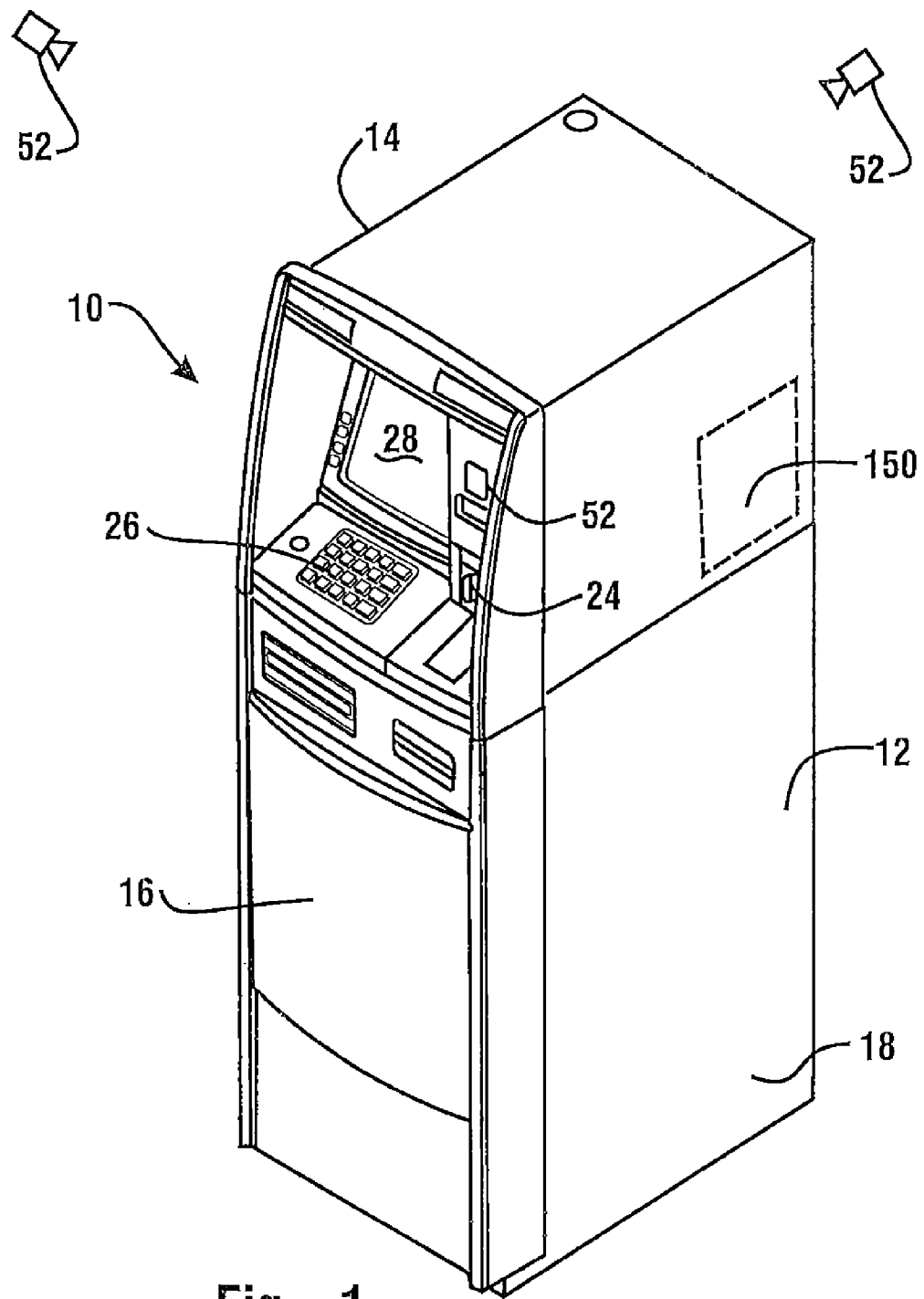
FIG. 1 is a schematic representation of an exemplary automatic banking machine.

Referring now to the drawings and particularly to FIG. 1 there is shown therein an exemplary embodiment of an automated banking machine that operates to cause financial transfers using information read from data bearing records in the form of user cards generally indicated 10. In the exemplary embodiment automated banking machine 10 is an ATM, however the features described and claimed herein are not limited to any particular type of automated banking machine. The exemplary machine includes a housing 12. In the embodiment shown, housing 12 includes an upper housing area 14 and a lower housing area 16 including a secure chest portion 18. Access to an interior area of the chest portion 18 is controlled by a chest door 20 (see FIG. 2) which when unlocked by authorized persons, enables gaining access to the interior area 22 of the chest area. In an exemplary embodiment, access to the upper housing area 14 may be made through an appropriate opening in the housing 12. The opening to the interior area of the upper housing portion may also be controlled by a movable door. In exemplary embodiments, the opening may be in a front, rear or side of the housing. In other embodiments, the housing may include several openings to the interior area. In an exemplary embodiment, the chest door 20 may be situated at the front of the housing, for so called "front-load" machines or at the rear of the housing for "rear-load" machines. Examples of banking machine housing structures are shown in U.S. Pat. Nos. 7,156,296; 7,156,297; 7,165,767; and 7,004,384 the disclosures of which are incorporated herein by reference in their entirety.

An exemplary embodiment includes devices and methods operable as a video and audio system to support service personnel in servicing a machine, as explained in further detail below. In an exemplary embodiment, the machine 10 includes a number of transaction function devices that must be serviced from time to time. These transaction function devices are associated with components of the machine such as a card reader 24 and a keypad 26. The card reader and keypad serve as input devices through which users can input instructions and information. It should be understood that as referred to herein the keypad may include function keys or touch screen areas which may be used in example embodiments to input data into the machine. Machine 10 further includes a visual display 28 generally operative as an output device to provide information to users of the machine. The information provided may include information concerning cash dispensing transactions. The card reader is used to read data from user cards that can be used to identify customer financial accounts to the machine. In some embodiments the card reader may be a magnetic stripe type reader. In other embodiments the card reader may be a smart card reader, a contactless reader such as a radio frequency identification (RFID) reader, an NFC reader or other wireless communication port.

Figure 2:
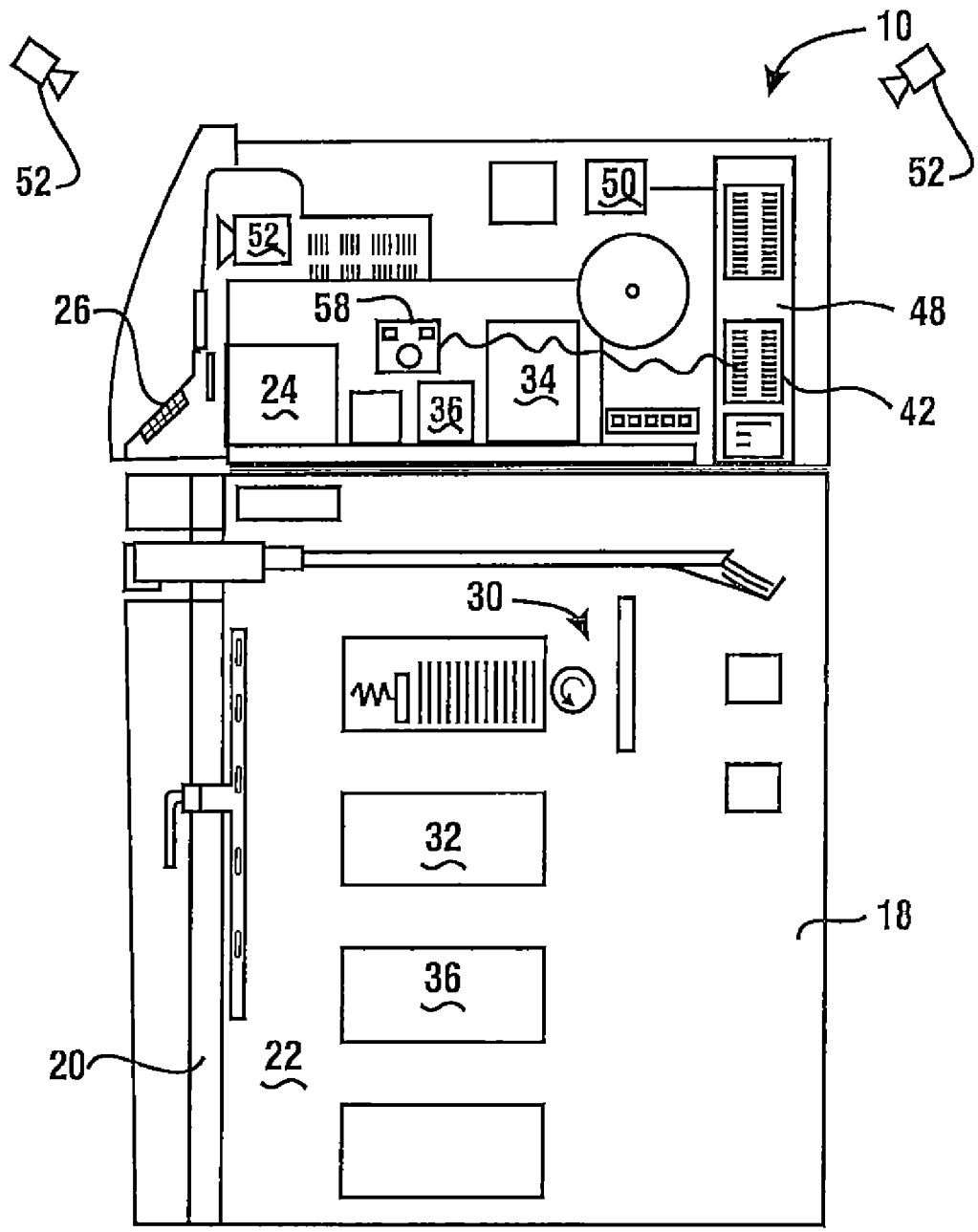
FIG. 2 is a schematic side view of the exemplary automatic banking machine of FIG. 1.

FIG. 2 shows a schematic view of an exemplary hardware configuration of an exemplary machine. Machine 10 includes additional transaction function devices. Such transaction function devices may include a document dispensing mechanism, including a dispenser, schematically indicated 30, which operates to cause sheets such as currency bills or other documents of value stored within the machine to be delivered from or otherwise made accessible from outside the machine to a machine user. Such mechanisms are referred to herein as a cash dispenser. Examples of such cash dispensers are shown in U.S. Pat. Nos. 7,121,461; 7,131,576; 7,140,537; 7,140,607; 7,144,006; 7,000,832; and 8,052,044 the disclosures of which are incorporated herein by reference in their entirety.

The exemplary machine 10 further includes a depository 32. The depository 32 accepts deposits such as cash or other instruments such as checks from customers. It should be understood that in other example embodiments other types of depositories which accept various types of items representative of value may be used. Examples of depository devices are shown in U.S. Pat. Nos. 7,044,366; 7,156,295; 7,137,551; 7,150,394; 7,021,529; 8,052,046; and 8,061,591 the disclosures of which are incorporated hereby by reference in their entirety. Exemplary machines may also include a note acceptor of the types described in the incorporated disclosures. The exemplary embodiments may include a printer 34 operative to print customer receipts related to the transaction. The example embodiments may include other transaction function devices, such as a coin dispenser, coin acceptor, currency stacker, ticket accepting devices, stamp accepting devices, card dispensing devices, money order dispensing devices, and other types of devices which are operative to carry out transaction functions. Some of these devices may be located in the upper or lower housing areas, all generally schematically represented as 36. It should be understood that the machine shown in the drawings is merely illustrative and automated banking machines of various embodiments may include a variety of transaction function devices and component configurations.

Figure 3:
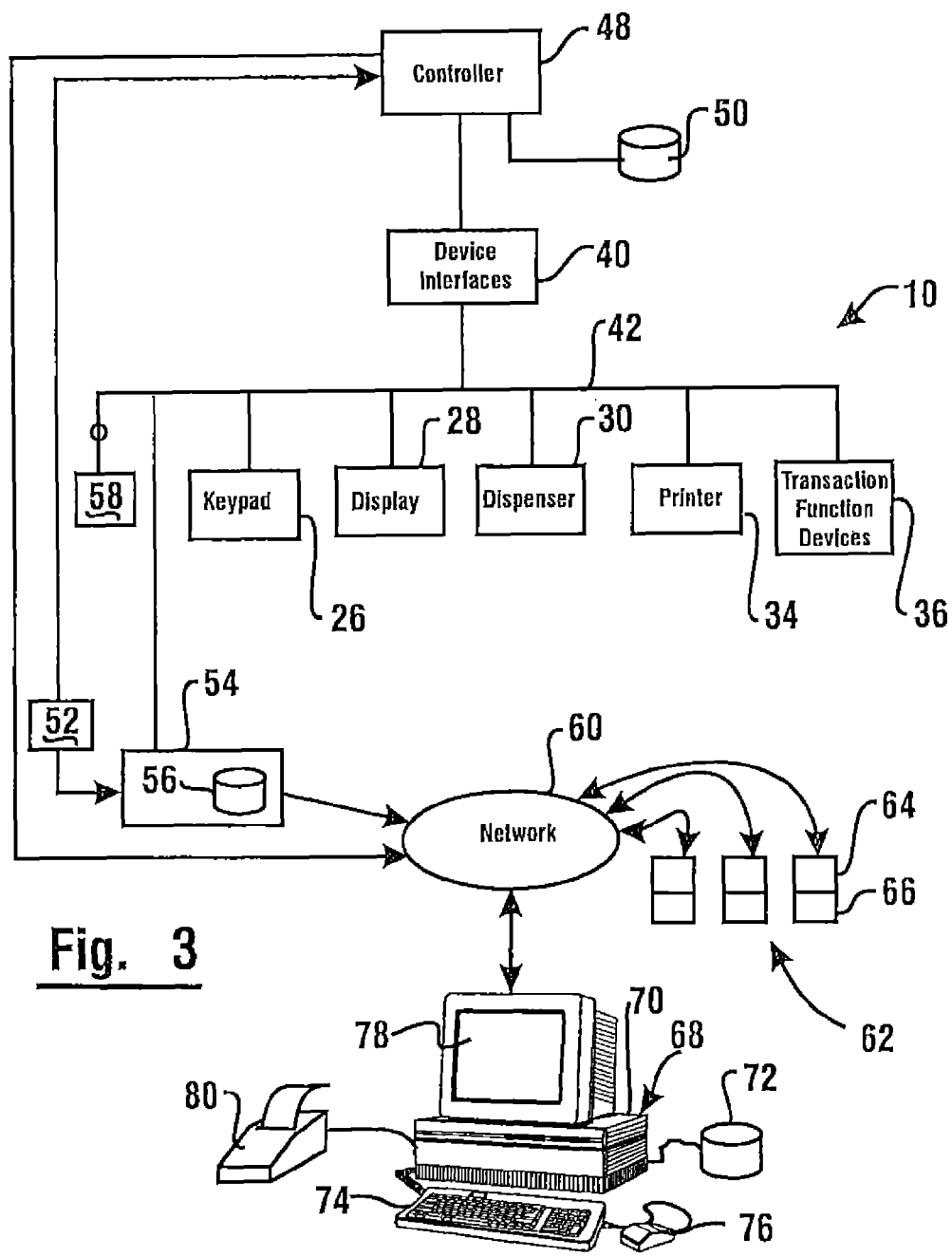
FIG. 3 is a schematic view of a control system for devices within an automatic banking machine.

In an exemplary embodiment, one or more of the transaction function devices, i.e., keypad 26, display 28, dispenser 30, printer 34, or other devices 36 communicate through and are operated responsive to signals passed through device interfaces schematically represented as 40 (see FIG. 3). The device interfaces communicate with the transaction function devices on an interface bus 42 which in exemplary embodiments may be a universal serial bus (USB). The messages which control operation of the various transaction function devices are communicated through the interface bus 42. At least one computer which is also referred to as a terminal controller or processor 48 operates the machine by communicating messages to the device interfaces to control the transaction function devices.

For purposes of simplicity, this example embodiment will be described as having a single controller 48 which controls the operation of devices within the machine. However, it should be understood that such reference shall be construed to encompass multicontroller and multiprocessor systems as may be appropriate in controlling the operation of a particular machine. For example some embodiments may operate using principles described in U.S. Pat. No. 6,264,101 or 6,131,809 or U.S. patent application Ser. No. 13/066,272 filed Apr. 11, 2011 the disclosures of which are incorporated herein by reference in their entirety. The controller is alternatively referred to herein as a terminal processor. As schematically represented, the controller 48 is in operative connection with one or more data stores 50. Such data stores may include for example, articles bearing computer executable instructions such as hard drives, flash memory, firmware or other data storage devices. Such data stores 50 in exemplary embodiments are operative to store computer executable program instructions, values and other information used in the operation of the machine.

With reference to FIGS. 1 and 2, the exemplary embodiment may further include image capture devices such as cameras 52 which provide camera signals representative of what is observed within the field of view of the respective camera. The image capture devices such as cameras 52 may be arranged so as to capture images of portions of the machine, portions of users of the machine, portions of servicers of the machine, or portions of the environment around the machine. For example, an image capturing device 52 may be mounted in supporting connection with the housing of the machine with a field of view encompassing a machine user's face. Another image capturing device may be mounted relative the machine with a field of view of the environment immediately behind a machine user. The field of view of other image capturing devices may encompass areas of the machine accessed by service personnel within the respective fields of view of the devices. It should be understood that the camera configuration shown is exemplary. It should further be understood that embodiments may include analog cameras, digital cameras, iris scanners, fingerprint scanners or other types of devices from which data corresponding to images may be acquired and/or reproduced. Some embodiments may operate in a manner that employs the principles described in U.S. Pat. No. 7,147,147 or U.S. patent application Ser. No. 13/068,592, the disclosures of which are incorporated herein by reference in their entirety.

The images captured by camera(s) 52 may be used, for example, to verify identity and/or provide security for the machine or users thereof. In an exemplary embodiment, the data store 50 may include data corresponding to images of unauthorized users of the machine. In an exemplary embodiment, the controller 48 is able to compare data corresponding to the images captured by camera(s) 52 with data in the data store corresponding to unauthorized users. If the data generated by camera(s) 52 corresponds to unauthorized user data in the data store, the controller is operative to carry out instructions, such as to activate an indicator which indicates the presence of the unauthorized user. The indicator may be an audible alarm, a message to a remote entity, a machine shutdown operation, or any other action able to indicate attempted use of or access to the machine by an unauthorized user. Alternatively, in some exemplary embodiments the data store may be located at the machine or accessed through communications to one or more computers at remote locations. In other embodiments the stored data may correspond to authorized users. Determining through operation of one or more controllers that image data corresponds to an authorized user may permit such authorized users to carry out certain operations. Of course these approaches are exemplary.

In the exemplary embodiment, machine 10 also includes a movable image capture device 58 such as a camera, in operative connection with interface bus 42. When the machine is in an operational mode, movable device 58 may be housed within the upper housing area. Alternately, a movable device may be housed within the lower housing area. Alternatively in some embodiments, the image capture device may be brought to the machine by a servicer and operatively connected to at least one controller, such as by plugging in a cable connected to a camera to a USB port. After a servicer attains access to the interior of the machine housing, the movable device 58 may be utilized to aid servicing of machine components as described in greater detail below.

As schematically illustrated in FIG. 3, in some exemplary embodiments, signals from the camera 52 may be sent to an image recorder device 54 which is connected to the interface bus 42. Image recorder device 54 includes a computer which includes at least one server operating therein, and further includes at least one data store 56. It should be understood that some embodiments may include devices which in addition to image data, acquire sound data, infrared signal data, and other types of data which can be sensed by sensing devices, stored, recovered, and analyzed by the system. This may include for example, sensing images which indicate the relative temperatures of various portions of parts, which temperatures may correspond to abnormal conditions. Image recorder device 54 may also receive inputs from devices such as sensors which can generally sense actions or conditions directly. Image recorder 54 may also receive signals representative of conditions or instructions sent as signals to other devices such as signals on the interface bus 42, timing signals, or others signals usable to operate the image recorder responsive to programmed instructions, time parameters, user inputs, or other conditions or signals. At least one server software function associated with the image recorder device 54 may be in communication with at least one electronic communications network schematically indicated 60. The server may operate to provide at least one uniform resource locator (URL) or other system communication address. Thus, the server may be accessed by other terminals connected to the network. The server may also selectively deliver messages to other network connected computers. The camera signals may alternately, or additionally, be sent to controller 48.

In an exemplary embodiment, terminal controller 48 is in communication with at least one network 60 and is able to be accessed by other terminals connected to the network, as well as able to deliver messages including data corresponding to visual images generated by camera 52 and movable image capture device 58 to connected terminals.

Network 60 may include a local area network such as an intranet or may be a wide area network such as the Internet. Network 60 may include a network that communicates messages in protocols such as TCP/IP. The network may be used to further communicate HTTP messages including records such as HTML, XML, and other markup language documents. Exemplary principles that may be used are described in U.S. Pat. Nos. 7,159,144; 7,162,449; 7,093,749; and 7,039,600 which are incorporated herein by reference in their entirety. Of course, in other embodiments other communications methods may be used.

In the example embodiment shown, a plurality of terminals 62 are shown connected to the at least one network 60. Terminals 62 may include user terminals which may be used to analyze, store, and recover data sent from the machine. Alternative terminals 62 may include document verification terminals for verifying the authenticity of documents, identifying user data or for carrying out other functions. Typically terminals 62 include computers including a browser software component 64 such as Mozilla Firefox™, Mozilla Thunderbird™, Microsoft Internet Explorer™, Google Chrome™ or other types of browsers. Terminals 62 also include other software and hardware components schematically indicated 66 suitable for processing image data, transaction data, and other data that may be obtained by accessing the machine.

Exemplary terminal 68 may be a user terminal, document verification terminal, data storage terminal, data analysis terminal, or other type of terminal for inputting instructions or analyzing data available in the system. Exemplary terminal 68 includes a computer schematically indicated 70 which includes at least one processor and an associated data store schematically indicated 72. The computer 70 may be located within the machine. Alternatively, the computer may be located in a server or other device remote from the machine. For example, the computer may be located in a server that is operatively connected to the machine and also to other machines. For example in some embodiments the server may operate a virtual machine that communicates with devices in the machine to control operation of such devices in the manner of the incorporated disclosure.

Exemplary terminal 68 may be in operative connection with the computer 70 and input devices 74 and 76 which include a keyboard and mouse respectively in the embodiment shown. Of course in other embodiments other types of input devices may be used. Exemplary terminal 68 further includes output devices. The output devices in the example embodiment shown include a monitor with a display 78 and a printer device 80. Of course in other embodiments of terminals other types of output devices may be used. The exemplary terminal 68 includes a computer with a browser component as previously described. The browser in the terminal communicates with the machine through the network 60. Terminal 68 may also have server software operating therein as well as other software components.

It should be understood that in some embodiments the machine may communicate with other computers and entities and through various networks. For example, the machine may communicate with computers operated by service providers through network 60. Such service providers may be entities to be notified of status conditions or malfunctions of the machine as well as entities who are to be notified of corrective actions. This may be done, for example, in the manner similar to that described in U.S. Pat. Nos. 7,036,049 and 7,003,492 the disclosures of which are incorporated herein by reference in their entirety. Other third parties who may receive notifications from exemplary machines include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
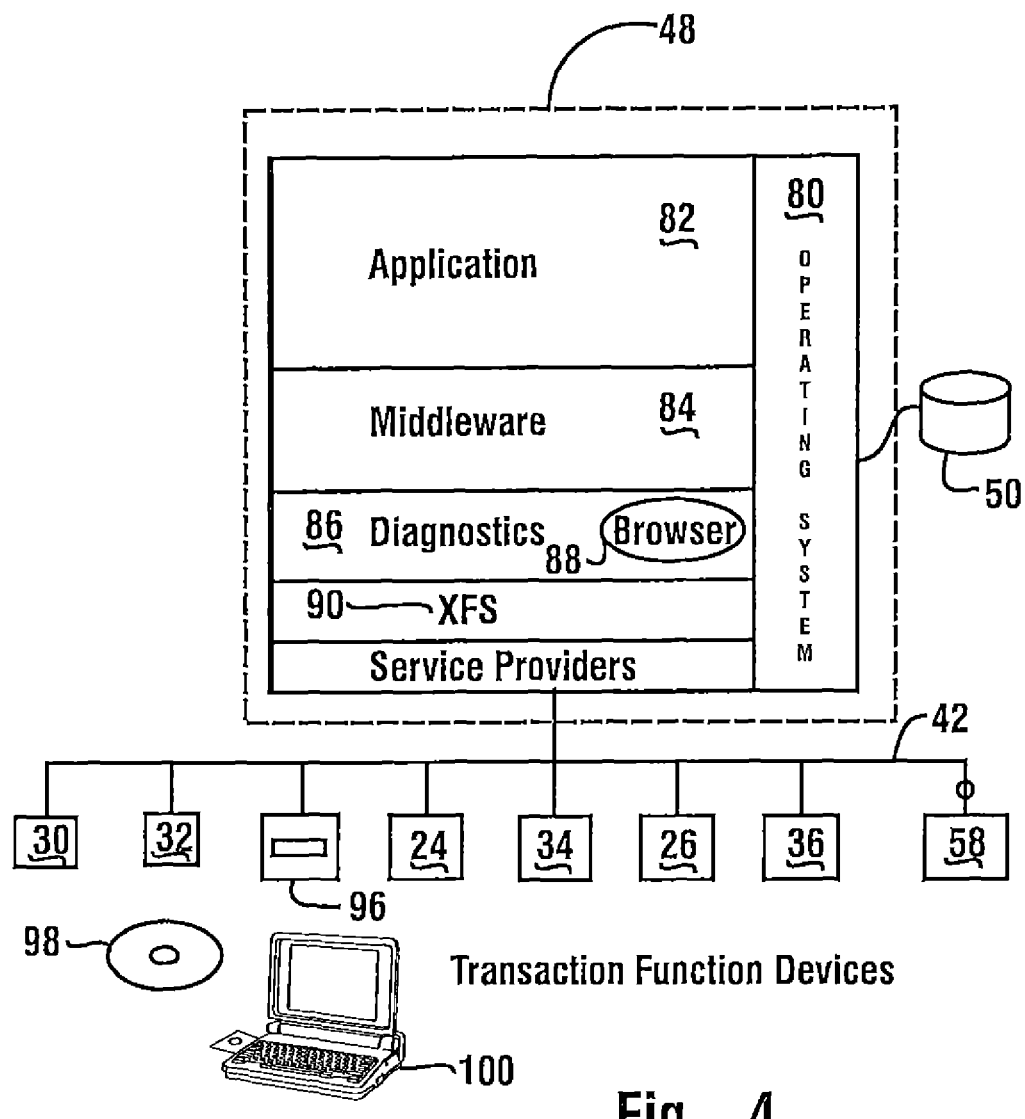
FIG. 4 is a schematic view showing an exemplary software architecture.

FIG. 4 shows schematically an exemplary software architecture which may be operative in the controller 48 of the machine. The exemplary software architecture includes an operating system 80 such as for example Microsoft® Windows, IBM OS/2® or Linux. The exemplary software architecture also includes a banking machine application 82. The exemplary application 82 includes the instruction for the operation of the automated banking machine and may include, for example, an Agilis® 91x application that is commercially available from Diebold, Incorporated. The exemplary software application operates machines, and may in some embodiments include a cross vendor application that is suitable for use in multiple brands of automated banking machines.

In an exemplary embodiment, a middleware software layer schematically indicated 84 is operative in the controller 48. In the exemplary embodiment, the middleware software layer 84 operates to compensate for differences between various types of automated banking machines and transaction function devices used therein. The use of a middleware software layer 84 enables the more ready use of an identical software application on various types of banking machine hardware. In the exemplary embodiment the middleware software layer 84 may be Involve® software produced by Nexus Software or Kalignite which is a product of Korala Associates Ltd. of Scotland.

The exemplary software architecture further includes a diagnostics layer 86. The diagnostics layer 86 is operative to enable accessing and performing various diagnostic functions of the devices within the banking machine. In the exemplary embodiment, the diagnostics layer 86 operates in conjunction with a browser 88. The diagnostics layer may be in operative connection with various components which enable diagnostic functioning of the various transaction function devices. Other exemplary embodiments may include diagnostic applications as described in more detail in U.S. Pat. Nos. 7,104,441; 7,163,144; 7,093,749; and 6,953,150 the disclosures of which are incorporated herein by reference in their entirety. For illustrative purposes, the exemplary embodiment is described in terms of a software diagnostic layer 86 as schematically represented in FIG. 4. In the exemplary embodiment, at least one data store 50 is in operative connection with the controller 48 such that one or more data stores include status data which is associated with the status or conditions of serviceable components and/or diagnostic data associated with conditions or properties of at least one serviceable component. In an exemplary embodiment, the diagnostic data may be accessed when a diagnostic article 98 is placed in operative connection with the banking machine as explained in further detail below.

As schematically represented in FIG. 4, controller 48 is in operative connection with at least one interface bus 42 which may be a universal serial bus (USB) or other standard or nonstandard type of bus architecture. The interface bus 42 is schematically shown in operative connection with one or more transaction function devices. The transaction function devices may include, for example, the currency dispenser 30, depository 32, card reader 24, receipt printer 34, keypad 26, as well as numerous other devices, generally designated 36, which are operative in the machine and controlled by the controller 48 to carry out transactions. In the exemplary embodiment, an image capture device 52 such as a charge-coupled device (CCD) camera is operatively connected to interface bus 42. In the exemplary embodiment one of the transaction function devices in operative connection with the controller is a diagnostic article reading device 96 which is operative to read a diagnostic article 98 used in servicing the machine. In an exemplary embodiment, the diagnostic article 98 comprises a CD which can be read by reader 96, and can also be read by a computer device 100 which is not generally associated with the operation of the banking machine. Of course in other embodiments the diagnostic article may include local or remote items that can provide computer readable instructions, such as, for example, flash memory cards, smart cards, RFID cards, tokens or other articles.

In the exemplary embodiment, the diagnostics layer 86 is operative to perform various diagnostic functions with the transaction function devices, i.e., 24, 26, 30, 32, 34, 36, 96 which are operative in the banking machine. In the exemplary embodiment, the diagnostic layer 86 is enabled to perform manipulations and diagnostic testing of the transaction function devices. In an exemplary embodiment, the diagnostic layer works in conjunction with the diagnostic article 98. The manipulations and/or diagnostic tests may include for example outputting an audible tone, turning on a motor, simulating inputs through a keypad, printing a test receipt, operating the cash dispenser and the like.

Figure 5:
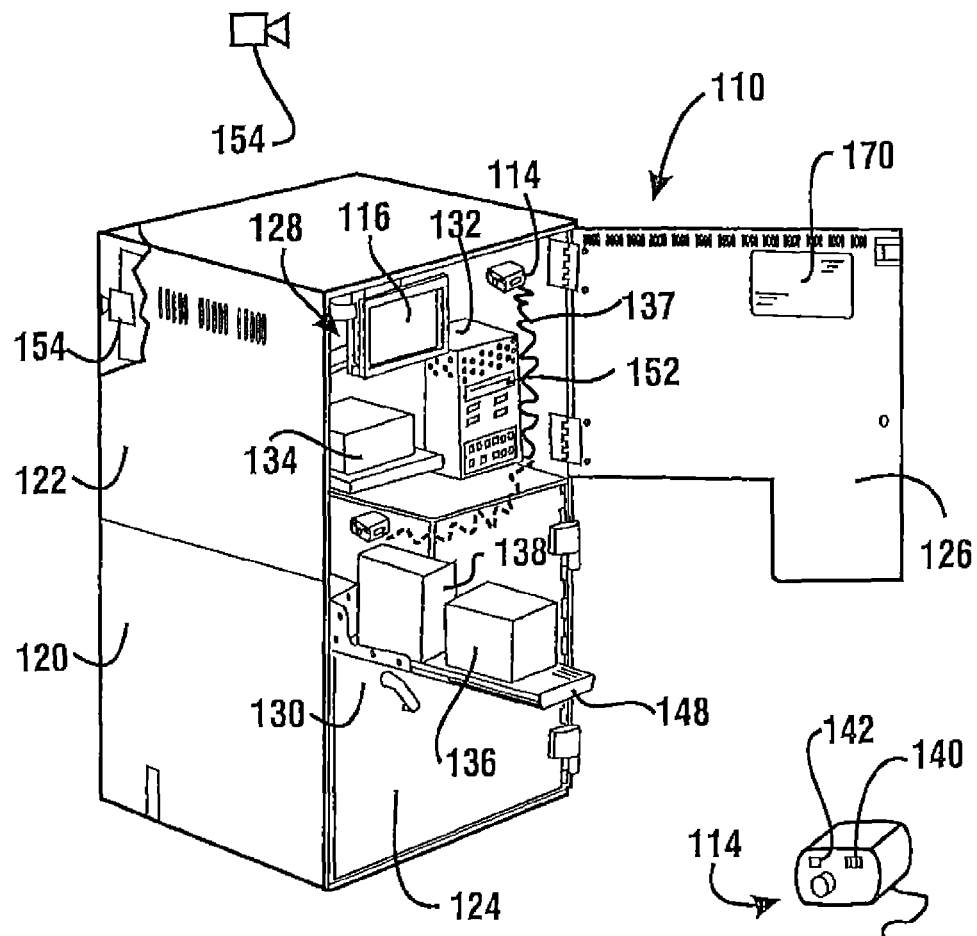
FIG. 5 is a schematic view of an exemplary automatic banking machine.

In an exemplary embodiment, shown in FIG. 5, there is provided an alternate embodiment of an automated banking machine 110 amenable to on-site or remote servicing and diagnosis. In particular, the exemplary machine utilizes one or more movable image capture devices 114 in operative connection with one or more visual display devices to enable improved servicing capabilities. The exemplary embodiment illustrated in FIG. 5 shows a rear-load machine 110 having a service display 116.

Exemplary machine 110 may be similar in many respects to the exemplary machines previously described herein. Machine 110 includes housing 120 which may include an upper housing area 122 and a secure chest portion 124 in a lower portion of the housing, although exemplary embodiments are not so limited. Access to the upper housing area for service may be provided through movement of an access door 126 away from an opening 128 in housing 120. Access to the interior of secure chest portion 124 may be provided through movement of the chest door 130.

As schematically represented in FIG. 5, example machine 110 includes one or more internal controllers 132. Such controllers 132 may be in operative connection with one or more data stores as previously described. In some embodiments controllers may be located on certain devices within the machine so as to individually control the operation thereof. Various transaction function devices, schematically represented 134 and 136 in FIG. 5, may be in operative connection with the controller 132 through a USB or other connection as previously described.

In an exemplary embodiment, the image capture device 114 may be mounted in operatively supported connection with the upper housing area 122 when the machine is in an operational condition. In other embodiments, the image capture device 114 may be mounted in the secure chest portion 124. In yet other embodiments, the image capture device may be carried to the machine by service personnel and operatively connected to the controller once access to the housing interior is gained.

In the embodiment shown, the image capture device 114 is in operative connection with the controller 132 through cable 137 connected through a USB connection or port. The cable may include a suitable plug-in or other type connector. Machine 110 includes at least one serviceable component schematically represented as 138. The serviceable component may include any of the aforementioned input devices, output devices, transaction devices, or any other component operable with respect to the machine which requires inspection and/or service. The serviceable component 138 may include at least one region which is not directly visually observable to a servicer of the machine attempting to view the component through an access opening of the housing. For example, the region may be disposed within the housing of the machine at a location that is awkward or impossible for a servicer to view directly.

Figure 6:
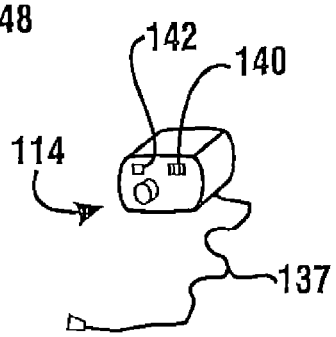
FIG. 6 is a schematic representation of an exemplary moveable image capture device.

In order to facilitate servicing of the component 138, an image capture device 114 may be utilized. With reference to FIG. 6, in the exemplary embodiment, the image capture device 114 may include a digital camera. The exemplary image capture device 114 is able to be moved toward and away from a region of interest to service personnel. In some embodiments the image capture device may be permanently or releasibly attached to a rigid or flexible wand or similar supporting device that can be used to extend the camera to have a field of view that includes the regions of interest to the service.

A microphone 140 or other sound sensing device may be mounted in operative supporting connection with the image capture device 114 and movable therewith. The microphone 140 may be disposed within a housing of the image capture device, or mounted in connection with a common support such as the wand. The microphone in the exemplary embodiment is in operative connection with a controller, and is operative to produce sound data that corresponds to sounds sensed by the microphone. Additionally, a radiation source 142 may be mounted in supporting connection with the image capture device 114 and movable therewith. The radiation source may emit visible light. In other embodiments, the radiation source may emit non-visible light, such as radiation emitted by an infrared LED. Thus, the obscured region may be illuminated to provide an enhanced visual image. In still other embodiments, thermal images may be sensed.

In alternate embodiments, one or more microphones 140 may be mounted in fixed relationship to housing 120 in positions adjacent the transaction function devices to produce sonic information related to such devices. Additionally, in alternate embodiments, one or more radiation sources 142 may be positioned so as to illuminate areas of the transaction function devices to enable enhanced images to be captured.

In the exemplary embodiment, the image capture device 114 is enabled to be moved toward and away from regions of interest to the servicer. Thus, the field of view of the image capture device 114 is changeable and able to encompass various locations within and outside the housing 120. The exemplary image capture device 114 in conjunction with the controller is operative to generate image data corresponding to a visual image of the region of interest. The controller 132 is operative to cause output of an image corresponding to the visual image data to a visual display. This may be done in response to one or more inputs by a servicer through one or more input devices connected to the machine or in response to instructions executed by the controller.

The visual display may be the display such as display 28 (FIG. 1) which additionally serves as an output device to a user at the customer interface of the machine. In other exemplary embodiments, the visual display may be a service display 116 (FIG. 5) mounted in a rear of the machine housing that may be viewed by a servicer having access to the rear of the machine. Alternately, or additionally, the image data may be transmitted to a remote computer including an operatively connected display 78 through network 60 (FIG. 3). In yet other exemplary embodiments, the visual display component may include a device separate from the machine such as a computer screen, laptop, cell phone, hand-held device, and the like. Thus, viewing images on the display enables a servicer to indirectly view obscured areas of components requiring service.

An exemplary machine having a service display located within the housing is described with greater specificity in U.S. Pat. No. 7,156,296, which is incorporated herein in its entirety. As disclosed more fully in the incorporated document, the service display 116 may be movable relative to the housing for the convenience of the servicer. The service display may be incorporated as part of a second user interface disposed from the user interface previously described.

As illustrated in FIG. 5, in an exemplary embodiment, one or more serviceable components are supported on a rollout tray 148 that is movable between a retracted position generally disposed within the machine housing, and an extended position. In the extended position the rollout tray extends through the opening 128 in the housing. In other embodiments, the serviceable components may be accessed by opening or removing one or more service doors or panels 150 (illustrated in phantom in FIG. 1). In yet other embodiments fascia components may be moved to provide access to serviceable components.

In an exemplary embodiment, a diagnostic article reading device, schematically indicated 152, is in operative connection with the controller 132. The diagnostic article reading device is operative to read computer executable instructions from a diagnostic article, such as article 98, when it is placed in operative engagement with the diagnostic article reading device. As previously described, the status data and/or diagnostic data may be communicated to a remote computer through a network such as network 60. Thus, a user of a remote computer may access status and/or diagnostic data relevant to the component to be serviced, including images captured by the image capture device 114. In addition in some embodiments data corresponding to sound data and/or temperature data may be sent through operation of the controller to a remote computer. As a result a remote computer may be connected to speakers or other sound output devices so a person at the remote computer can hear the sounds picked up by the microphone 140. In some embodiments the controller in the banking machine and/or the remote computer may be operative to analyze the sound and/or temperature data, and provide one or more outputs that correspond to information about the condition of one or more transaction function devices. Further, in some embodiments the images captured by the image capture device 114 may be stored as diagnostic data in an image recorder device such as device 54 as previously described.

Exemplary embodiments may have one or more additional image capture devices schematically represented by device 154. As will be appreciated, a number of devices may be positioned within and/or near to machine 110 for purposes of capturing image data related to users, documents, surroundings, or other types of visual images that may be desirable to capture and analyze. In addition to capturing images or other data from one or more automated banking machines, the image capture device 154 may also be operative to monitor one or more other transaction devices, as well as to monitor and record activities which occur within a facility. An additional image capture device 154 may be mounted in fixed supported relationship with the machine housing. For example, an image capture device may have a field of view that includes the vicinity in front of the user interface of the banking machine. Thus, a servicer located at the rear of the machine can view images of activity or persons in front of the machine in a service display 116. In other exemplary embodiments, an image capture device may be used to monitor activity behind a servicer performing service at the front of the machine. Thus, the servicer can be alerted about the approaching presence of a potential machine customer, or other person.

In some embodiments the data obtained by the image capture device 154 may be used to identify a physical feature of a machine user, as set forth, for example, in U.S. patent application Ser. No. 09/991,748, filed Nov. 23, 2001 or U.S. patent application Ser. No. 13/199,518 filed Sep. 1, 2011 the disclosures of each of which is incorporated herein by reference in its entirety. The images may be used for other purposes as well. For example, the facial features of criminals, missing persons, or other individuals of interest may be stored in connection with the data store. The system may operate so that images captured may be analyzed so that the facial features of persons in images are compared to images stored in one or more local or remote data stores. Responsive to finding a match the system may operate in response to programmed instructions to cause a processor to execute a sequence of activities which may include capturing additional images, sounding alarms or sending messages electronically to selected individuals or entities.

Some example embodiments may use voice recognition software to detect sounds from the microphone representative of words or the stress levels of sounds emanating from persons near the automatic banking machine. Such voice or sound data may be used in combination with images or other data to further detect and evaluate conditions at or near the automated banking machine.

An exemplary embodiment may include sensing devices for detecting the opening of doors, windows, ventilation ducts or other activities for which it is desired to capture images. The exemplary system may include alarm devices. Alarm devices may take various forms and may include sequences of inputs to computer terminals or other devices.

Sensing devices used in connection with the exemplary systems may include photosensors, infrared sensors, radiation beams, weight sensors, sonic detectors, ultrasonic detectors or other types of detectors. Such detectors may be used to sense when a person or item passes or occupies a particular space or area. For example, a detector may detect when an invisible beam type sensor is interrupted. As a result, a signal may be given to cause a computer to capture images in response to each occurrence of something interrupting the beam.

Figure 7:
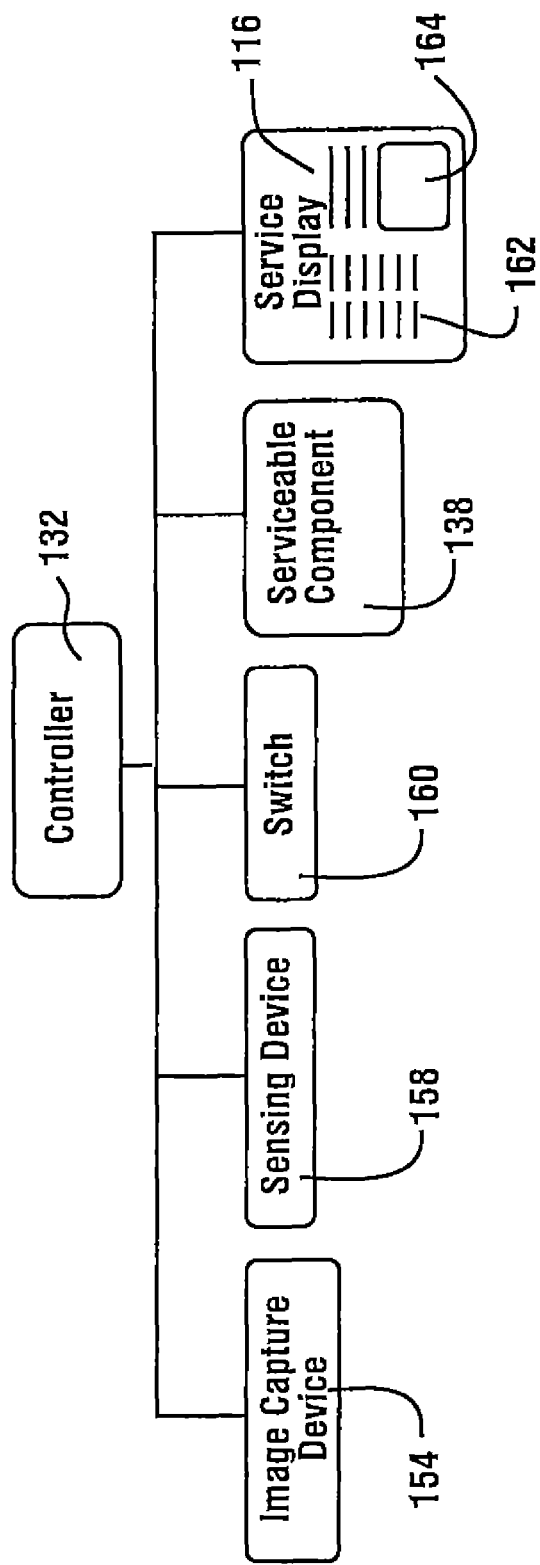
FIG. 7 is a schematic representation of a system for servicing an automated banking machine.

The relationships of some of the components of an alternative exemplary embodiment are schematically represented in FIG. 7. An exemplary embodiment may include sensing devices 158 which detect or receive indications of activity and provide appropriate electrical outputs to controller 132. These devices may include for example heat sensors, infrared sensors, weight sensing pads, electronic beams or other types of sensors which can detect conditions for which an operator of the system may wish to capture images or other data. Sensing devices may be utilized to sense activity in the vicinity of the machine or activity associated with one or more machine components.

In an exemplary embodiment, the data corresponding to visual images generated by the image capture devices 154 may be analyzed for certain image conditions. Image conditions may include for example, a lack of contrast in an image, brightness or darkness beyond selected limits signaling a lack of useable video. Alternatively, image conditions may include the presence within a field of view of persons with particular clothing or features, the presence of persons with certain body orientations, the presence of a particular individual based on facial features or other features, the presence of certain objects such as weapons or the presence of particular types of colors or arrangements of colors.

In an exemplary embodiment, the machine is selectively operable in an operational mode and a service mode. When the machine is in the operational mode, machine users are generally able to complete transactions of value at the machine by inputting information to one or more input devices at the user interface and receiving outputs from one or more output devices. This may include for example, users inputting a card and personal identification number (PIN). The data read from the card or data which is a function thereof is then compared to stored data usually by communication to a remote host computer and comparing the card data to data in the host computer's data store. The data corresponding to the input PIN or data which is a function thereof is also compared for correlation to stored data corresponding to the card data. If the comparison indicates that the card and PIN data correspond to an authorized user the machine operates to carry out transactions involving the customer's account.

At times, service providers must interact with automated banking machines to perform routine maintenance, replenish supplies, or otherwise service a machine component. In an exemplary embodiment, a service activity may be performed on the machine by an on-site service provider, by a remote service provider, or a combination of an on-site service provider is communication with a remote entity or system.

The exemplary machine is enabled to operate in a service mode so that such service activity can be completed. The service mode may be initiated by an on-site service provider performing an action such as opening the machine housing to access a serviceable component. In other exemplary embodiments, the service mode may be initiated by sending a signal to a controller in the machine through an input device that is located either on-site or remotely.

At least one controller 132 in operative connection with the serviceable component 138 is able to provide status data relating to the status of the serviceable component. For example, the status data may include information about a malfunctioning component or a maintenance history.

In an exemplary embodiment, a service provider may utilize one or more image capture devices 154 during performance of the service activity. Exemplary image capture devices 154 may be able to generate data corresponding to visual images within a predetermined vicinity of the machine. Other exemplary image capture devices may be able to generate data corresponding to various regions within and outside the machine housing. The image capture devices 154 may be mounted in fixed relationship to the machine housing, may be a moveable device that the servicer may selectively position, or may be mounted within the vicinity of the machine, all as previously described.

The visual images corresponding to the generated data may be displayed on an output device. In an exemplary embodiment, the visual images are output to a service display 116 which is disposed away from a user interface intended for use by machine customers. In an exemplary embodiment, the service display 116 is mounted at the rear of the machine housing. The service display is in operative connection with the controller 138. In an exemplary embodiment, the service display is enabled to display visual images from the image capture devices 154. This may be done in some embodiments responsive to one or more inputs by a servicer through one or more input devices in operative connection with the controller. In an exemplary embodiment, the service display is also able to display indicia corresponding to status data about one or more serviceable components.

For example, the machine may be mounted through a wall or other structure which may prevent a servicer at the rear of the machine from directly viewing activity in the vicinity of the machine. This may be done in a manner like that described in U.S. Pat. No. 7,163,613 the disclosure of which is incorporated herein by reference in its entirety. The servicer is enabled through the image capture devices, microphones, and service display to indirectly perceive activity at the front of the machine.

In the exemplary embodiment, a switch 160 which serves as an input device in operative connection with the controller 160 enables the visual images captured by one or more image capture devices 154 to be selectively output on the service display 116. The switch 160 may include one or more locations on the service display responsive to tactile input from a machine servicer. Alternately or additionally, the switch may be responsive to one or more sensing devices 158 able to detect movement and/or sound in and around the machine, as previously described. The exemplary banking machine may include speakers or other sound output devices at the rear of the exemplary banking machine so a servicer may hear activity in the area at the front of the machine.

The information displayed on the service display 116 may alternate between status data and visual images captured by the image capture device 154 responsive to the controller. In an exemplary embodiment, an event sensed by the sensing device 158 (such as a camera or microphone) may cause the display 116 to switch from displaying status and/or diagnostic information, to displaying visual images obtained by one or more image capture devices 154. Thus, a servicer viewing status data related to one or more serviceable components may be alerted to the approach of a potential machine user by a change in the output on the service display 116. Alternatively the service display may change its outputs responsive to servicer inputs to one or more input devices.

In other exemplary embodiments, the service display 116 may simultaneously display status data and visual images. In an exemplary embodiment, the service display 116 includes a primary field area 162 and a secondary field area 164. The exemplary switch 160 may incorporate technology, such as picture-in-picture, to allow information displayed in the primary field to be switched with information displayed in the secondary field. In other embodiments status data may be superimposed on the screen in front of output images. Of course these approaches are exemplary.

In an exemplary embodiment, the image capture device 154 has an area in front of the machine within its field of view, which is not directly viewable by a servicer of the machine located at the rear of the machine. A sensing device 158 operative to sense movement and/or sound caused by a potential user of the machine, may alert the servicer of the presence of the potential user. In response to the sensed presence of the potential user, the output on the service display 116 may switch from displaying status information in the primary field, to having visual images generated by the image capture device displayed in the primary field. If practical, a servicer may then provide one or more inputs operative to cause the controller to change the mode of the machine from a service mode to an operational mode to accommodate the potential machine user. The servicer may alternatively provide one or more inputs through an input device that causes the controller to cause the output of an indication on the display of the user interface that the machine is out of service. Of course these approaches are exemplary.

In an exemplary embodiment, a servicer at the rear of the machine is enabled to view the service display without opening the machine housing (see FIG. 5). A viewing window 170 may be provided in a wall portion of the machine housing. In some cases the wall portion may be a part of a movable door. Of course this approach is exemplary. Thus, in some embodiments certain service activities may be performed without the need to move any portion of the machine housing. For example, a routine maintenance check of various serviceable components in the machine can be conducted by providing inputs that result in switching the machine from an operational mode to a service mode and directing the controller to run diagnostic tests as discussed above. Status information about the transaction function devices of the machine can be output on the service display responsive to operation of the controller. If further service is not required, the machine can be readily returned to an operational condition. Alternately, if a potential user is sensed at the front of the machine, again, the machine can be readily returned to the operational condition. If however, the diagnostic tests reveal a problem that requires more extensive service, the housing of the machine can be opened and the component of interest may be serviced.

In an exemplary embodiment, a method includes generating data corresponding to a visual image of a serviceable component of an machine with a movable image capture device. The serviceable component may include a region that is not directly visually perceivable by a machine servicer, but which may be placed within the field of view of the image capture device. A visual image of the obscured region may be displayed on a display, in supporting connection with the machine and/or disposed from the machine at a remote location.

In an exemplary method, a microphone in operative connection with the image capture device is utilized to generate data corresponding to sonic information. The visual and/or sonic information may be used as diagnostic information about a serviceable component or may include information about activity in the vicinity of the machine. The data corresponding to the visual images and the sonic information may be output responsive to operation of the controller through a display, speakers or other output devices at the machine location, and/or may be transmitted responsive to operation of the controller to a remote computer.

In an exemplary method, a radiation source in operative connection with the image capture device is utilized to direct radiation onto the region that is within a field of view of the image capture device. The radiation source may in some embodiments produce visible light, visible light within a particular region of the visible spectrum and/or nonvisible radiation. The radiation source may be utilized to illuminate the region of interest and enhance the visual images captured by the image capture device.

Figure 8:
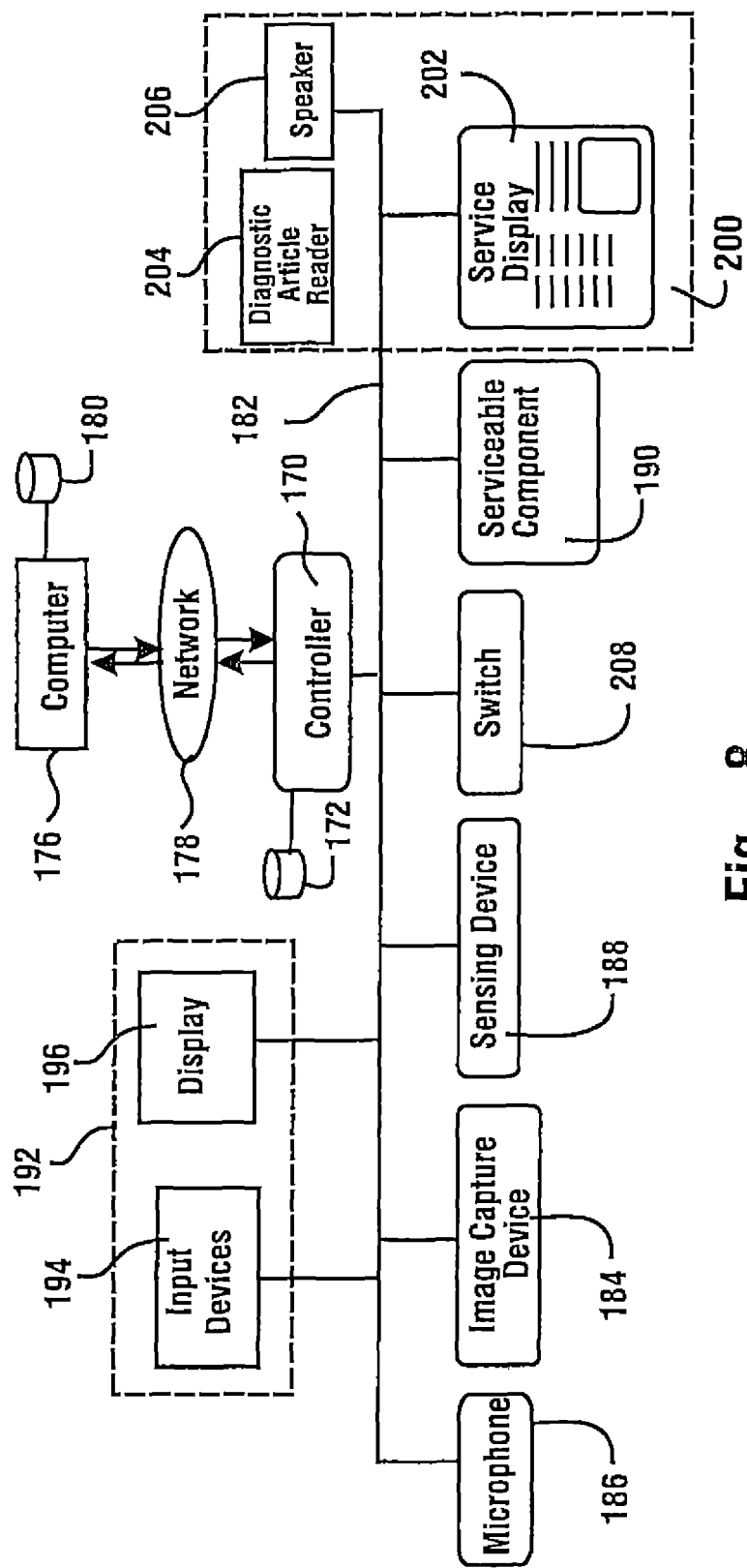
FIG. 8 is a schematic representation of a system for servicing an automated banking machine.

A further exemplary embodiment is schematically represented in FIG. 8. The exemplary embodiment includes an on-site controller 170 in operative connection with at least one data store 172. The controller 170 may be enabled to communicate with a remote computer 176 through a network 178. The remote computer may be in operative connection with one or more data stores 180.

Various devices in the machine are operatively connected to controller 170 through USB 182. Some exemplary devices include one or more image capture devices 184 (fixed or movable), microphones 186, sensing devices 188, and one or more serviceable components 190 such as that previously described.

The exemplary embodiment includes a first user interface 192 which may include input devices 194 and a display 196. The exemplary embodiment includes a second user interface 200 which includes a service display 202 such as that previously described. The second user interface may also include a diagnostic article reading device 204 and one or more speakers 206.

In an exemplary embodiment, data from the image capture device may be displayed as visual images on display 196, service display 202, and/or transmitted to one or more remote computers 176.

The service display 202 is generally accessible to service personnel. In an exemplary embodiment, one or more microphones 186 are able to pick up sounds associated with activity in the vicinity of the machine. The microphone 186 may be associated with one or more image capture devices, or may be a separate component. In the exemplary embodiment, the microphones may be in operative connection with one or more speakers 206 which are able to provide audible outputs associated corresponding to the audio input. In an exemplary embodiment, the speakers 206 are located at the rear of the machine and may be part of the second user interface 200. Thus, a servicer at the rear of the machine can indirectly monitor activity within a vicinity of the user interface of the machine through visual images output on the service display, and audible outputs provided by the speakers. In still other embodiments an image capture device and microphone may be positioned at the rear of the machine housing, and outputs corresponding to the visual images sensed and sounds sensed selectively output through the display and speakers of the customer interface at the front of the machine.

In an exemplary service activity, a first servicer may be positioned at the front of the machine and a second servicer may be positioned at the rear of the machine. The audio/visual components allow the two servicers to communicate. This may be done in some embodiments responsive to operation of the controller responsive to one or more inputs from the servicers through input devices at the respective user interface. Of course this approach is exemplary.

As earlier discussed, status data related to one or more serviceable components 190 may be obtained from a data store 172 in operative connection with the controller 170 or from distributed data stores associated with processors on respective transaction function devices. Diagnostic data which can be used to determine information about features or conditions of devices which can be used to diagnose properties or conditions that indicate causes of status data or conditions that may result in a future status or fault can also be accessed from one or more data stores. Such diagnostic data in the exemplary embodiment is generally not accessible to servicers except responsive to instructions and/or data included on a diagnostic article, e.g., 98, which can be read when placed in operative connection with the controller through a diagnostic article reading device 204. Alternatively the diagnostic article may be used to permit access to diagnostic data from a computer at a remote location. Diagnostic data associated with the serviceable component may be transmitted to the remote computer. Such permitted access to diagnostic data may be permitted through operation of the controller responsive to the instructions read from the diagnostic article. Access may be permitted by the controller responsive to receipt of locally provided or remotely communicated inputs. The serviceable component may be subjected to a diagnostic test, responsive to operation of the at least one controller. For example, such diagnostic tests may include printing of a test receipt, directing a document along a document path, moving gate members, producing audible tones, picking cash, presenting cash, and other device operations. Visual images of the progression of the diagnostic test, and associated sonic information may be output through visual and audio output devices to an on-site servicer and/or an entity at a computer at the remote location. The generated data may be saved to the diagnostic article or a data store in the machine and/or at a remote computer. The generated data may also be sent to an image recorder device as previously described.

In other exemplary methods, the diagnostic article may be engaged with an appropriate reading device at a remote location from which data that permits access to diagnostic information can be transmitted to the machine. The remote computer may also be used to provide inputs that permit access to diagnostic data stored at the machine. An on-site servicer can utilize the image capture device and/or microphone to monitor progress of diagnostic tests. The data corresponding to visual information, sonic information and/or thermal information can be transmitted for analysis to the computer at the remote location. The computer at the remote location may be in connection with a display and/or audio output devices so a remote servicer can perceive the operation of the machine and identify condition. Alternatively or in addition the remote computer may operate in accordance with its programming to analyze one or more of the status data, diagnostic data, image data and/or sound data to produce outputs indicative of problems and/or desirable service activities for the machine.

In an exemplary method, a servicer at the machine location may communicate with an entity at a computer at a remote location. The communication may be accomplished though a network 178, such as the Internet, or through other communications network. For example, a service person or computer at a remote location can perceive data generated by the image capture device 184 and/or microphone 186 at the remote location and transmit diagnostic instructions or service information to the on-site servicer.

In an exemplary method, one or more additional image capture devices 184 may be utilized to generate visual image data of other regions within or outside the machine. For example, an additional image capture device may be mounted in fixed relationship to the machine housing and include a substantially constant field of view. Data generated by the fixed image capture device may be displayed through an on-site display screen, or at a remote location. Sensing devices 188 are enabled to sense activities in and around the machine. For example, one or more sensing devices may be operable to sense the approach of a potential machine user. A switch 208 may be used to selectively change the output on display 196, service display 202, and/or computer 176. For example in some embodiments the servicer may provide at least one input that allows the machine to carry out transactions for the consumer, and thereafter provides a further input to allow continued service activity. Alternatively the servicer may provide at least one input through a servicer accessible input device that is operative to cause the controller to cause an output through the consumer display indicating that the machine is not in service. Of course these approaches are exemplary.

In an exemplary method, a servicer may perform a service activity on at least one serviceable component of an machine, such as a currency dispenser. For example, a common service activity includes testing the operation for dispensing currency from the currency dispenser. Alternatively in some embodiments the service activity may include adding or removing currency from the currency dispenser. Access to the serviceable component may be made through a rear access opening of the machine after opening an associated door. The service display, located at the rear of the exemplary machine housing, is able to display status and other data of interest to the servicer, as noted above responsive to operation of the at least one controller. Additionally, an image capture device in operative connection with the service display generates data corresponding to a plurality of visual images of objects within a region of the machine which may not be directly viewable by the servicer. For example, the generated visual images are able to indicate if a potential machine customer is at the user interface. In an exemplary method, a sensing device senses the presence or absence of a potential machine customer within the predetermined vicinity. If a potential machine customer approaches the machine, the data displayed on the service display may change responsive to a signal from the sensor. Thus, in the exemplary embodiment instead of displaying the status information, the service display may display the generated visual images.

In an exemplary method, the service display may operate to display both status information and visual images in two separate field display areas. A first field display area may be larger than a second area and be considered a primary field. The second area may be a smaller, secondary field, such as a picture-in-picture. When the servicer is performing a service activity, if the sensor senses the absence of a potential customer adjacent the machine, then indicia corresponding to status data may be displayed in the first area, and visual images generated by the image capture device may be displayed in the second area. In an exemplary method, if the sensor senses the presence of a potential customer within the predetermined area, a signal is sent to the controller, which operates in accordance with its associated programming to switch the output on the service display so that the visual images are displayed in the first area and the status information is displayed in the second area. The servicer can make a determination about whether to provide inputs to switch the machine into operational mode, so as to not disappoint the potential customer, or to retain the machine in the service mode so that the service activity may be completed. Of course this approach is exemplary and in other embodiments other approaches may be used. This may include, for example, superimposing the output status text or other data on images corresponding to the field of view of the camera responsive to operation of the at least one controller of the machine.

An exemplary service activity may require that the interior of the housing be accessed. In an exemplary method, the serviceable component is accessed through an access opening in the housing of the machine. Additionally, the serviceable component may be supported on a rollout tray. In an exemplary method, the serviceable component is accessed by extending the rollout tray through the access opening to a service position.

In an exemplary method, a diagnostic article is placed in operative connection with the machine controller. The controller is able to permit access to diagnostic data stored in the machine concerning serviceable components. Indicia related to the diagnostic data may be output through the service display. This may be done responsive to operation of the at least one controller in response to local and/or remote inputs through input devices.

In another exemplary method, a service activity may be performed on a serviceable component responsive to inputs to a computer operatively connected to the machine, but operating at a remote location.

Figure 13:
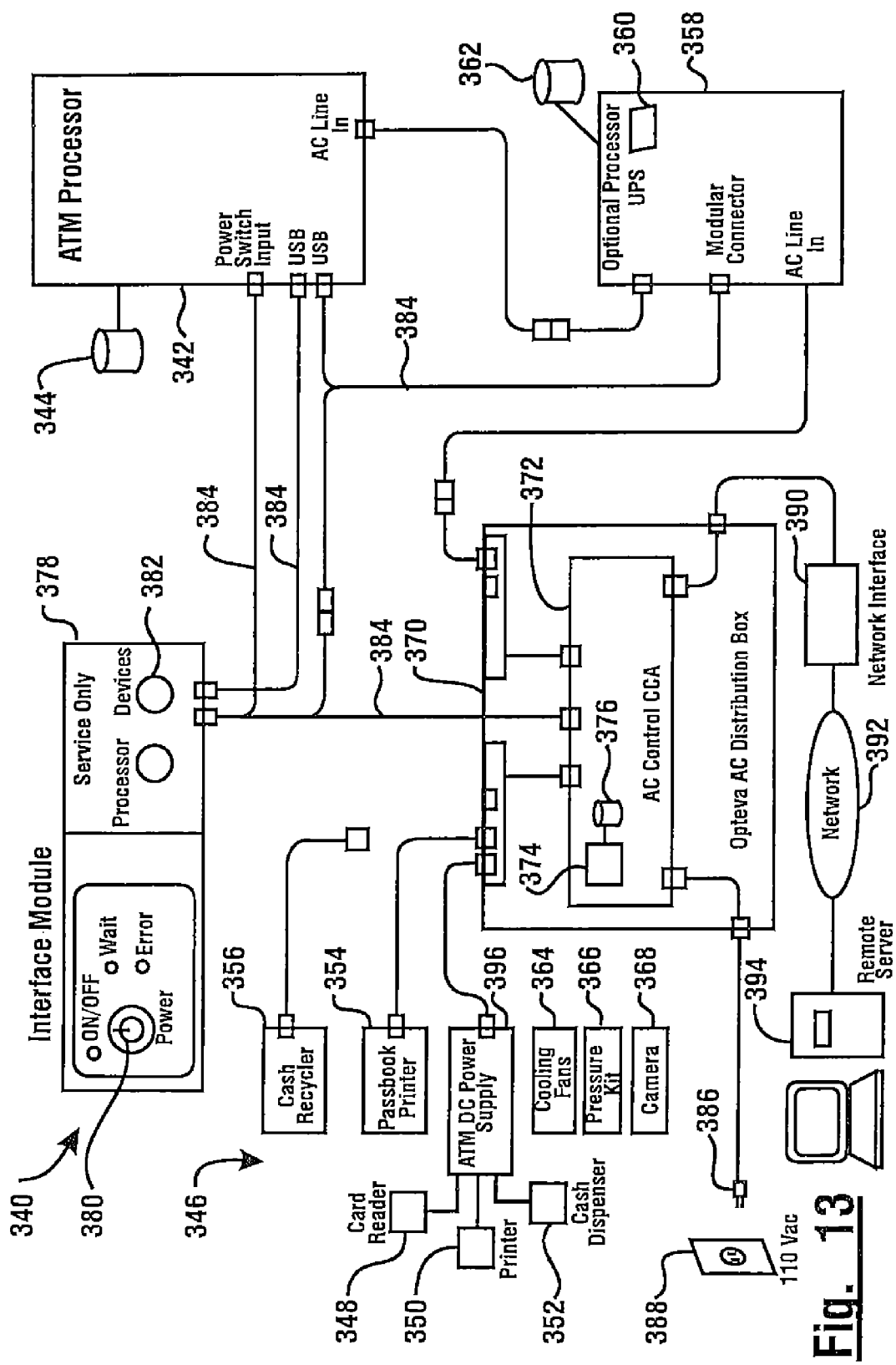
FIG. 13 is a schematic representation of a power control system for use in an exemplary automated banking machine.

The schematic representation of components included in an exemplary automated banking machine 340 are represented in FIG. 13. The components of the automated banking machine 340 represented in FIG. 13 specifically correspond to components used for providing and shutting off electrical power to devices within the machine. The components of the exemplary embodiment are also used in connection with coordinating electrical power supply functions within the machine as well as providing remote status notification and remote control of power functions. Of course it should be understood that this embodiment is exemplary.

Automated banking machine 340 includes a controller or terminal processor 342. The terminal processor is in operative connection with one or more data stores schematically represented 344. Although the exemplary embodiment is described as used in connection with a single terminal processor, it should be understood that the principles described may be used with automated banking machines having multiple terminal processors or other processors. The automated banking machine also includes a plurality of transaction function devices schematically represented 346. Exemplary transaction function devices include a card reader 348, a printer 350 and a cash dispenser 352. Other exemplary transaction function devices shown include a passbook printer 354 and a cash recycler 356. Other exemplary transaction function devices include a note acceptor which may be of the type described in the incorporated disclosures. It should be understood that these transaction function devices are exemplary, and in other embodiments other or different types of transaction function devices may be included in the banking machine.

As can be appreciated, in the exemplary embodiment the terminal processor 342 executes software instructions included in the at least one data store 344 related to the conduct of financial transactions. The terminal processor is operative to cause operation of the transaction function devices to carry out such transactions. The terminal processor communicates through a suitable control bus or other communications methodology with devices within the machine in the manner described.

The exemplary automated banking machine further includes an uninterruptible power supply (UPS) 358. In the exemplary embodiment the UPS includes a processor 360 which is in operative connection with a data store 362. The UPS operates to supply power when power from an external source is otherwise not available. The exemplary automated banking machine further includes other devices which utilize electrical power. In this exemplary embodiment devices such as cooling fans 364, air pressure control devices 366 and cameras 368 are shown. It should be understood that these devices are merely exemplary of numerous devices that consume electrical power that may be included in the exemplary banking machines.

The exemplary embodiment further includes a power controller schematically represented 370. Power controller 370 includes control circuitry 372. The control circuitry includes at least one processor 374. Processor 374 is in operative connection with at least one data store 376. The automated banking machine further includes a power interface module 378. Power interface module 378 includes one or more input devices schematically represented 380. In the exemplary embodiment the at least one input device 380 includes a rotatable switch. The switch enables a user to provide inputs which correspond to selectable conditions. Of course it should be understood that in other embodiments other approaches may be used. The power interface module further includes output devices 382. In the exemplary embodiment the output devices are operative to indicate status information related to the power control system.

As can be appreciated, in the exemplary embodiment the terminal processor interface module, power controller, UPS and transaction function devices are all within the housing of the automated banking machine. Further the power controller interface module, terminal processor and UPS are operative to communicate within the housing through communication lines schematically indicated 384. In the exemplary embodiment, Universal Serial Bus (USB) communications are used. Of course this approach is exemplary.

In the exemplary embodiment the power controller is in operative electrical connection with an electrical connector or other device for receiving electrical power which extends outside the housing of the automated banking machine. This electrical connection is schematically represented by a plug or a connector 386. In the exemplary embodiment the connector 386 is releasibly connectable with a source of AC power schematically indicated 388. In the exemplary embodiment the source of AC power comprises an electrical outlet which provides 110 volts of alternating current. However, it should be understood that this approach is exemplary and in other embodiments other approaches may be used.

In the exemplary embodiment the power controller 370 is also in operative communication with a network interface schematically indicated 390. In the exemplary embodiment the network interface is a suitable communications card, modem or other device within the machine that is operative to enable the communication of messages between the automated banking machine and remote devices. It should be understood that although the network interface is only shown in operative connection with the power controller, in exemplary embodiments the network interface is operative to provide communications with other components of the machine. This may include for example the communications that relate to the conduct of transactions using the machine as previously discussed. Of course this configuration is exemplary and in other embodiments other approaches may be used.

In the exemplary embodiment the network interface of the machine is in operative connection with at least one external network schematically indicated 392. Network 392 may be one or more suitable public or private networks which enable communications between the automated banking machine and one or more remote servers 394. Further it should be understood that in some embodiments the network may include the Internet or other data or telecommunications network.

Figure 14:
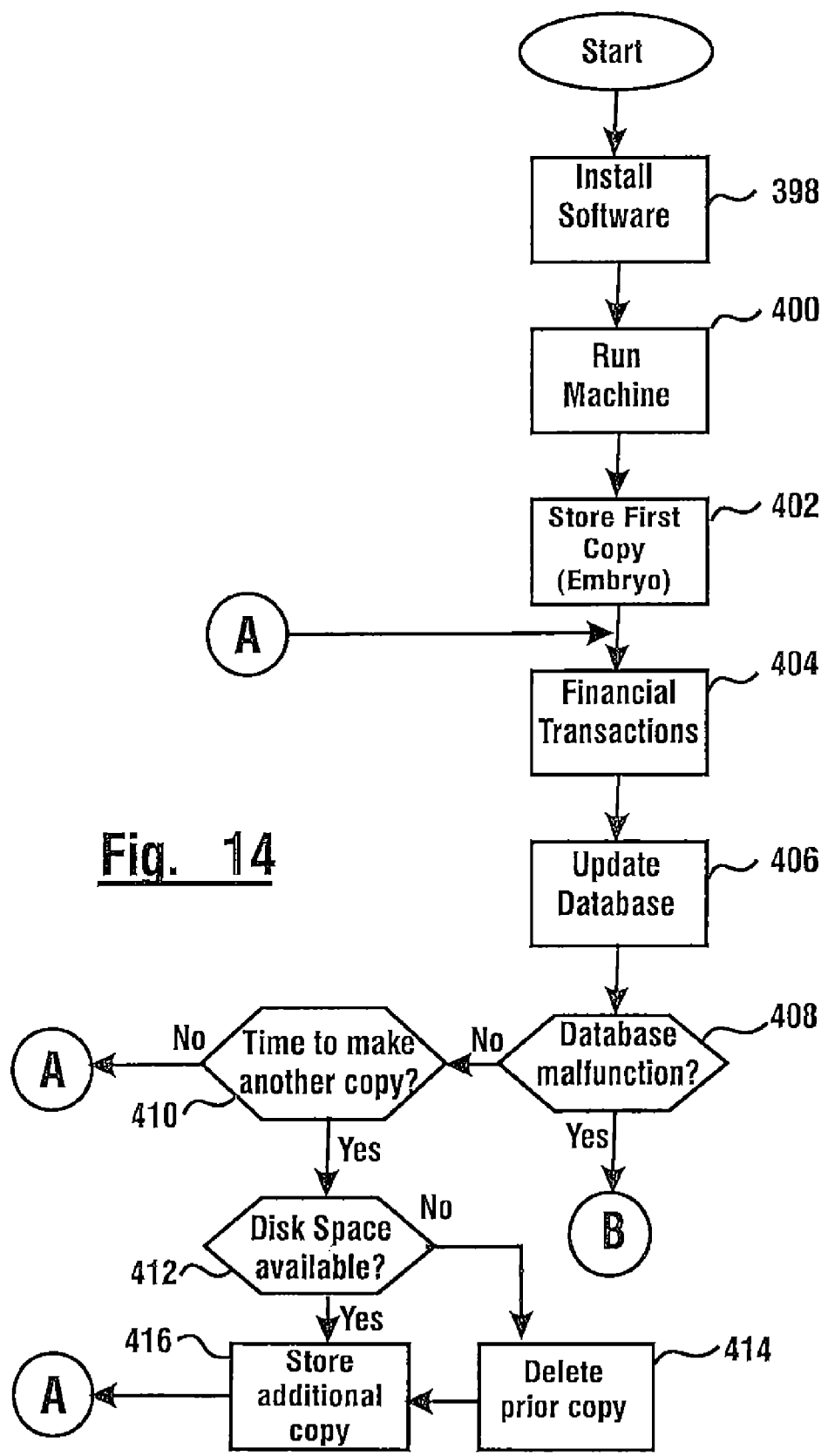
FIGS. 14 and 15 are a schematic representative of an exemplary logic flow used for database data set recovery and maintenance in an exemplary automated banking machine.

The exemplary embodiment of the power control components shown in FIG. 14 may be used advantageously in connection with exemplary automated banking machines to reduce damage that may result due to a failure to appropriately apply power to start, shutdown and/or shut off devices with the machine. For example recommended practice is often to avoid shutting off power to the terminal processor without going through the proper shutdown sequence. A failure to shut down the processor properly may result in corrupted data, or other problems which inhibit reliable operation of the machine. Further turning off power to transaction function devices at inappropriate times may result in malfunctions or damages which require repair. Further in some embodiments of automated banking machines benefits may be derived from conducting power related activities in a particular order. In addition the ability to remotely monitor and/or remotely control the power status of various components within an automated banking machine may prove helpful for numerous activities.

In the exemplary embodiment power from the AC power source 388 is controlled and distributed in the exemplary machine through operation of the power controller 370. As can be seen in FIG. 13 the power controller is operative to provide AC power to the UPS 358. The UPS is operative to provide AC power that is input to the terminal processor 342. The power controller 370 is also operative to supply power to the transaction function devices. As indicated schematically, power to the transaction function devices may include providing power to a power supply suitable for the particular device. This may include for example supplying power to a DC power source 396. The DC power source may then be operative to provide suitable DC power to transaction function devices that utilize DC power in their operation. Further it should be understood that although certain devices in the machine are not shown schematically connected to the power controller, in exemplary embodiments such devices are appropriately connected to receive power therefrom. Further it should be understood that although only a single DC power supply is shown, embodiments may include multiple DC power supplies or other types of power supplies suitable for the particular types of devices used in the machine.

In an exemplary embodiment inputs provided through the input device of the interface module are operative to cause the power controller 370 to carry out a series of steps in accordance with programmed sequences. These programmed sequences generally include supplying and shutting off power to the devices within the automated banking machine. For example if the automated banking machine is in an unpowered state, a user such as a service technician may provide one or more inputs to the interface module indicating that the automated banking machine is to be started. In response to such an input to the interface module, the power controller is operative responsive to communication with the interface module to execute a sequence which places the banking machine in operational mode. This may include for example operating to cause AC power to be supplied to the UPS 358 which delivers AC power to the terminal processor. The sequence may also include causing power to be delivered to the transaction function devices in the machine. In exemplary embodiments power may be supplied to the transaction function devices so that such devices may operate to carry out their initialization routines in accordance with their imbedded software instructions. This may be done so that the devices are in a ready condition so that they can be recognized as present in the machine by the terminal processor as the terminal processor operates to start and place the automated banking machine in a normal operational mode.

In accordance with the programmed instructions which cause the power controller to carry out the sequence, the power controller may thereafter cause one or more messages to be sent to the terminal processor which causes the terminal processor to start. In response thereto the terminal processor begins executing its programmed instructions, communicates to recognize the devices that are connected thereto, and verifies that the processor can carry out an appropriate terminal startup sequence. As a result in the exemplary embodiment if there are no malfunctions, the terminal processor will operate in accordance with its instructions to bring the automated banking machine into an operative condition to carry out financial transactions.

Further in the exemplary embodiment the power controller may operate in response to at least one input to the interface module 378 to take the terminal to a shutoff condition. This may include for example, responsive to receiving at least one input through the interface module, causing the power controller to send at least one message to the terminal processor, instructing the terminal processor to shut down. In response to such message the terminal processor will then go through a shutdown sequence. In the exemplary embodiment during this time period the power controller maintains power supply to the transaction function devices. This may be done in some exemplary embodiments so that an indication is maintained of the presence and operational status of such devices as the terminal processor is shutting down. As can be appreciated removal of power from the devices may result in indications being provided of a malfunction of the devices which the terminal processor may react to in accordance with its programming before it is fully shut down.

In the exemplary embodiment after the terminal processor is shut down the power controller operates in accordance with the program sequence to cause power to be shut off to the transaction function devices. As can be appreciated, in some embodiments this may be done simultaneously or sequentially as would be appropriate for the most reliable shutdown. Further in some exemplary embodiments the power controller may operate to control the UPS to shut off the supply of AC power to the terminal processor. Of course it should be understood that these approaches are exemplary and in other embodiments other approaches may be used.

In the exemplary embodiment other inputs to the interface module may be useful for conducting diagnostic activities. In an exemplary embodiment the power controller is operative responsive to one or more inputs to the interface module to cause power for one or more of the transaction function devices to be shut off while at the same time maintaining power to the terminal processor. This may be useful for example in situations where a servicer wishes to perform activities that require operation of the terminal processor or where operation of transaction function devices may not be desirable. This may include for example certain diagnostic and test activities.

Further in the exemplary embodiment one or more inputs to the interface module are operative to cause the power controller to send a message that is operative to cause a shut down of the terminal processor. In response to such messages the terminal processor shuts down while power is maintained to the transaction function devices. This may be appropriate for example when the devices are to be tested or diagnosed using inputs or other test data that is supplied by a technician or from a device other than the terminal processor. Of course it should be understood that these approaches are exemplary and in other embodiments other approaches may be used.

Further in the exemplary embodiment the power controller is operative to determine through its associated programming when the terminal processor is instructed to shut down but does not do so. This may happen in some situations where processes are executing in ways that cannot be terminated through the shutdown command. In the exemplary embodiment when the terminal processor fails to respond to such a shutdown command the power controller is operative to control of the UPS to shut off AC power to the terminal processor. While this condition is generally not desirable, it is sometimes necessary in order to bring the automated banking machine back into operation. Of course these approaches are exemplary and in other embodiments other approaches may be used.

In still other exemplary embodiments the power controller is operative to cause messages to be sent though the communication device 390 to the remote server 394. The messages are indicative of the power status of the various devices. Thus for example for purposes of remote monitoring and control of the automated banking machine the remote server may be operative to monitor the status of the terminal processor, UPS and each of the transaction function devices and other devices in the machine. In the event of a malfunction the device may cease to draw electrical power or may experience an electrical short or other condition which is detected through operation of the power controller. Appropriate messages can then be sent to give notification of this condition to a servicer or other entity associated with the remote server. In addition the power controller may operate in accordance with its programming to attempt to recover from such malfunctions. Of course this approach is exemplary and in other embodiments other approaches may be used.

In other exemplary embodiments the power controller may operate devices in the machine to change their power or operational status in response to messages received from a remote computer. This may include for example a situation where a malfunction is detected in operation of the automated banking machine which is preventing machine operation. Such a malfunction may be determined for example, using principles described in U.S. Pat. No. 7,036,048 the disclosure of which is incorporated herein by reference in its entirety. Responsive to the automated banking machine giving an indication of a malfunction that might be remedied by restarting the terminal processor, one or more messages may be sent from the remote server to the machine. In response to one or more messages the power controller 370 may operate in accordance with its programming to cause the terminal processor 342 to restart. This may include for example causing the terminal processor to operate in accordance with stored instructions associated with its operating system to shut down and then start. Such a restart in exemplary embodiments, causes the terminal processor to go through loading its various software instructions and initializing communications with the various devices in the machine. Such activity will in many instances remedy the condition that is causing the malfunction. As can be appreciated this capability avoids the need for a service technician to visit the machine.

In still other embodiments a condition with a particular transaction function device may be indicated. This condition could be of the type that may be remedied by taking action such as turning the electrical power to the device on and off so as to reinitialize operation or to reset operating parameters. In some exemplary embodiments messages from the remote server are operative to cause the power controller to shut off power to the affected device and to thereafter resupply power. In some situations this may be done to a single device while in other situations it may be accomplished by shutting off power to a power supply which supplies power to a plurality of devices. Further in some embodiments power may be shut off and resupplied to devices in a particular order or time sequence so as to facilitate the reinitialization or operational status thereof. This is accomplished in accordance with the computer executable instructions carried out by the power controller and/or messages received by the machine from one or more remote servers. Of course these approaches are exemplary and in other embodiments other approaches may be used.

In still other situations the exemplary embodiment may facilitate operational capabilities of the automated banking machine. For example the terminal processor may be operated in accordance with instructions to download software patches, software upgrades, additional programs or other instructions from a remote source through a communications device on an automated banking machine. Once these computer executable instructions have been downloaded it may be necessary to cause these instructions to be effectively implemented in the permanent configuration of the machine by shutting down and then restarting the machine. In the exemplary embodiment the power controller is operative responsive to one or more messages received through the network interface to cause the terminal processor to shut down, after such instructions have been received. Thereafter once the processor has been shut down the power controller operates to supply power and restart the terminal processor, thus effectively installing the software changes. Of course these approaches are exemplary and in other embodiments other approaches may be used.

In still other embodiments messages received by the automated banking machine may be operative to cause the power condition of devices to be changed. This may be done for example at times when it is desirable for the automated banking machine to be inoperative. Thus for example, if the automated banking machine is located in a shopping mall that is closed during the night for a period of time, messages may be sent from the remote server to the automated banking machine which cause the power controller to execute one or more sequences of program instructions which cause the machine to shut down. Thereafter at a time before the facility in which the machine is located is to open, one or more messages may be sent to the machine from the remote server which will be operative to cause the machine to execute one or more sequences of program instructions to cause the machine to start up. Alternatively or in addition, in some embodiments messages may be sent to the machine to cause power to be shut off to devices while maintaining the processor in operating condition. This may be done for example during time periods when no transactions are to be carried out such as when the facility where the machine is installed, is closed. In this status the processor would continue operating but devices for carrying out transactions will be inoperable until further messages causing the restoration of power to those devices are received. Such approaches may be useful for purposes of conserving electricity during times when transactions cannot be conducted. Alternatively or in addition in some embodiments power may be turned on or shut off to various devices for purposes of providing additional or different security features depending on the local circumstances associated with the machine. This might include for example, turning on devices operatively connected with the machine so as to sense activity occurring in proximity to the machine during hours when no one is supposed to be present and giving notification thereof remotely and/or operating other connected systems such as sounding alarms. Numerous other or different approaches may be taken depending on the particular automated banking machine and its capabilities.

Figure 16:
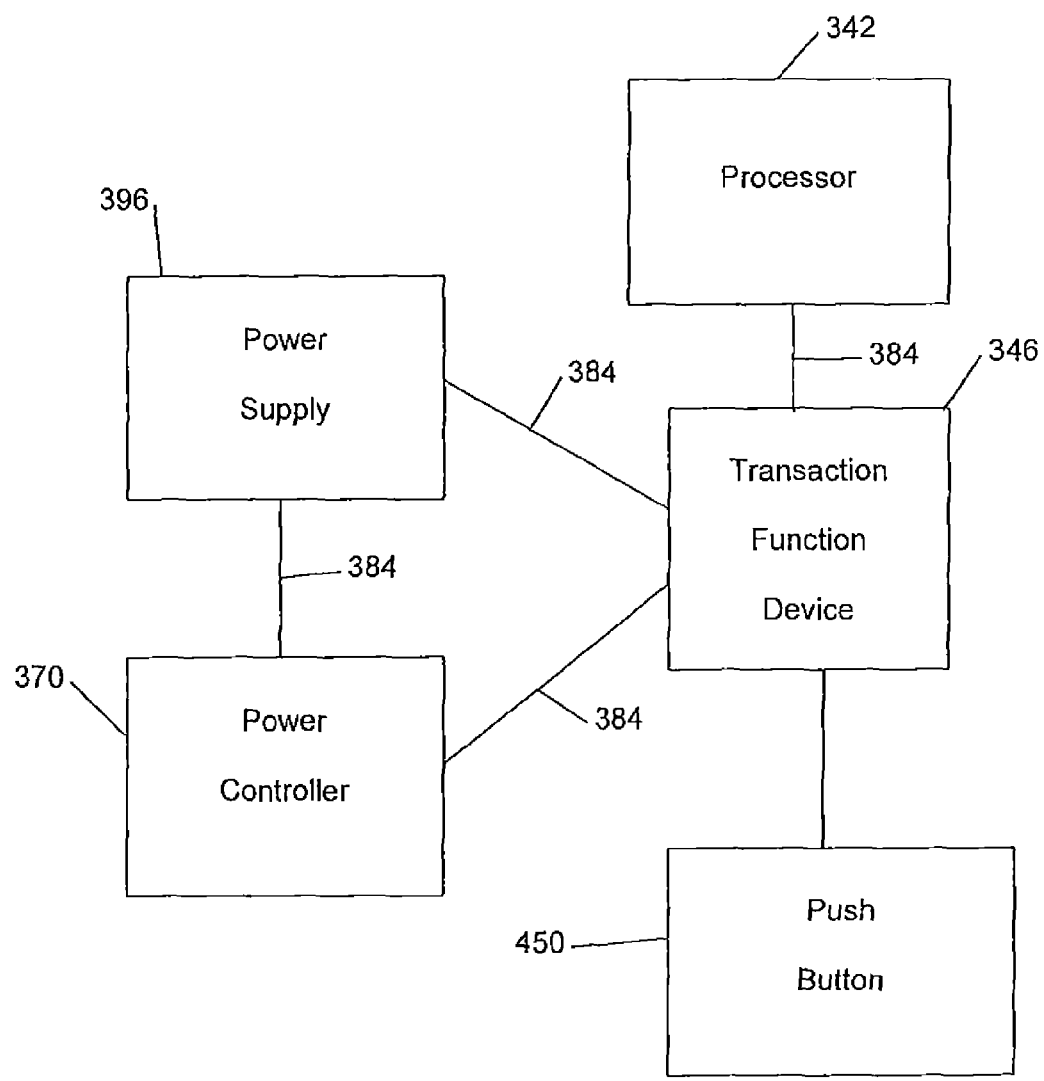
FIG. 16 is a schematic view of a portion of a power control system that allocates power to components in an automated banking machine of another exemplary embodiment.
Figure 17:
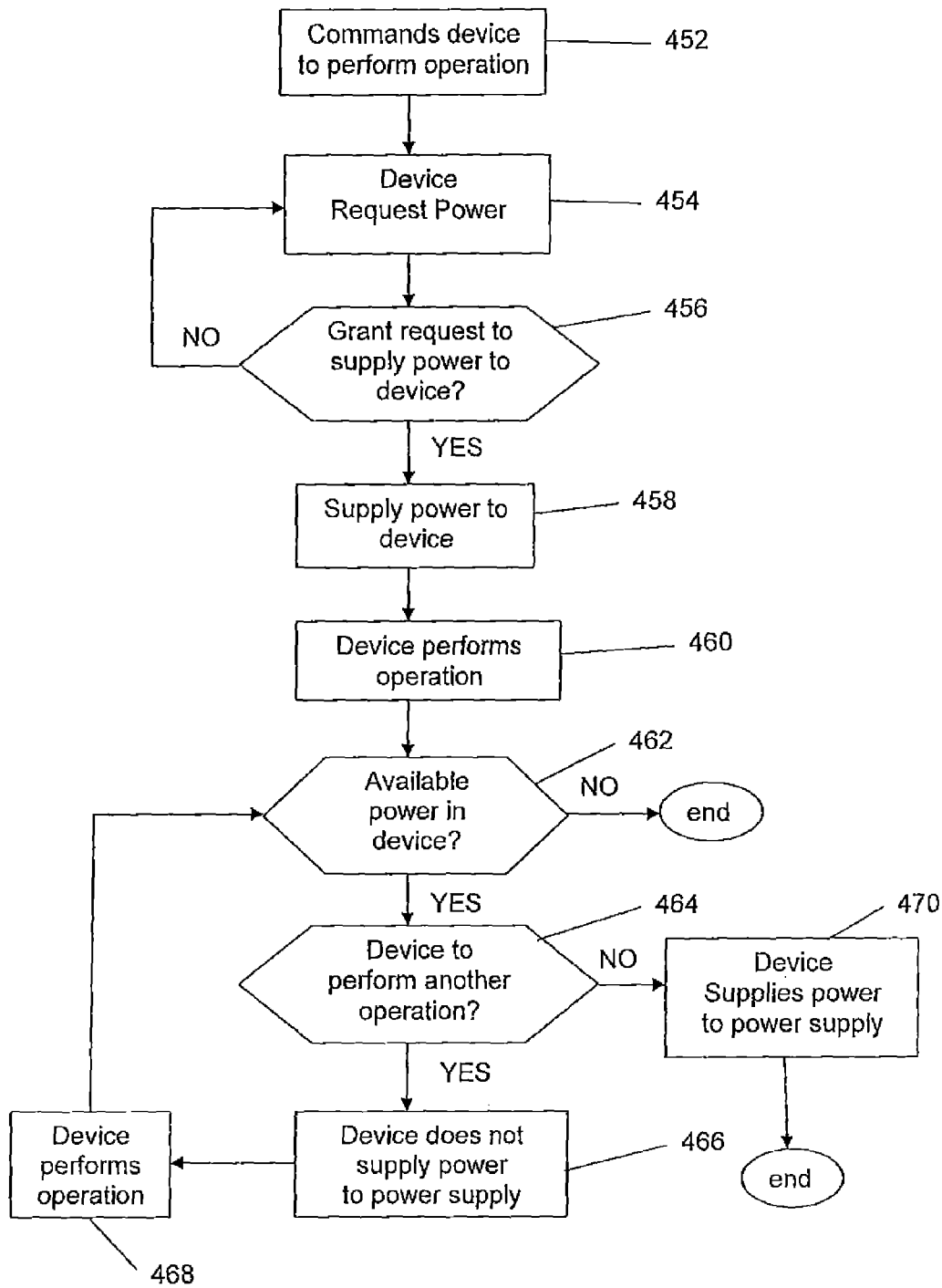
FIG. 17 is a schematic representation of steps for an exemplary process carried out by the power control system of FIG. 16.

In other exemplary embodiments, an automated banking machine may include a power control system that operates to monitor available power from a power supply 396 and to allocate that power on an as-needed basis to transaction function devices 346 that are instructed to operate in the machine. As schematically represented in FIG. 16, an exemplary power controller 370 is in operative communication with a power supply 396 and a plurality of transaction function devices 346, one of which is schematically represented in FIG. 16. The transaction function devices 346 may include, for example, a card reader, a note acceptor, a check acceptor, a cash recycler, a printer, a cash dispenser or other types of devices that operate and consume electrical power in an automated banking machine. For purposes of this disclosure, a transaction function device will be construed as any device that consumes power in its operation and whose operation is controlled in the course of operation of the automated banking machine. It should be understood that transaction function devices may include particular components or modules. In other cases, transaction function devices may include subsystems associated with particular power consuming components of devices or modules. The exemplary power controller 370 is operative to monitor the amount of power that is being consumed by each operating transaction function device. It should be understood that in exemplary embodiments, each of the power supply and transaction function devices include processors that are operative to determine power consumption features and to communicate messages indicative thereof. Messages are communicated via USB bus 384 between the power controller, the power supply and the transaction function device. Of course, this approach is exemplary and in other embodiments, other approaches may be used.

In the exemplary embodiment the at least one terminal processor 342 is operatively connected to the USB bus. The at least one processor is enabled to communicate with each of the transaction function devices as well as with the power supply and power controller. In operation of an exemplary embodiment, the processor 342 executes programmed instructions which may indicate that a particular transaction function device is to operate. In response to such instructions, the at least one processor 342 is operative to cause at least one message to be sent to the transaction function device that instructs the device to perform an operation. This is one manner in which transaction function devices of the exemplary embodiment may be instructed to operate. Further, in some exemplary embodiments, transaction function devices may include push buttons or other actuators that may be manually or automatically actuated which can selectively cause the transaction function device to perform operations. Such a push button 450 is schematically represented in FIG. 16. However, it should be understood that in other exemplary embodiments other types of device actuation inputs may be used.

FIG. 16 schematically represents a process by which an exemplary embodiment of an automated banking machine operates to assure that the power delivery capabilities of a power supply in the machine are not exceeded which would cause a machine malfunction. In this exemplary process in a step 52, the at least one terminal processor 342 operates to send a message to transaction function device 346. The at least one message comprises an instruction for the device to perform at least one operation. The exemplary transaction function device operates to receive the message and in response thereto resolves the type of operation that the device will perform in response thereto. This is done through operation of at least one processor in or associated with the transaction function device. In step 354, the transaction function device operates to send at least one message to the power controller 370. This at least one message is indicative of the operation or operations that the transaction function device is currently being instructed to perform. This message is also indicative of an amount of power needed to perform the operation. For example in some embodiments, the transaction function device may send a message that includes data that is indicative of the power that will be required to perform what the device has been instructed to do. Alternatively in other embodiments the message may include data regarding the device and the nature of the operation, and the power controller may operate to resolve the amount of power required to perform the activity based on its programming and stored data.

In the exemplary embodiment the at least one processor associated with the transaction function device is operative to send at least one message to the power controller indicating the device and the function that the device has received an instruction to perform. The power controller then operates in accordance with its programming and data stored in at least one data store associated with at least one processor associated with the power controller, to resolve the amount of power required to perform the requested function. The power controller also operates in accordance with its programming and data corresponding to the current level of power being drawn on the power supply by other transaction function devices connected in the machine, to determine whether the power supply can deliver the additional power that would be required to perform the operation that is being requested of the device at the present time. This is represented in a step 456. In the exemplary embodiment if the power controller determines that the additional power is available, the power controller operates to cause at least one message to be sent to the transaction function device. This is represented by a step 458. Responsive to the at least one message from the power controller, the at least one processor of the transaction function device operates in accordance with its programming and the instructions it has received to perform the function to carry out the function as instructed. This is represented in a step 460.

However, if the power controller determines that the additional power required by the transaction function device to perform the function is not currently available from the power supply in step 456, the at least one power controller may operate in accordance with its programming to not cause a message to be sent to the device to cause it to operate. This may be done, for example, by the power controller not responding to the messages from the transaction function device. In such embodiments the transaction function device may continue to send messages requesting authorization to operate until it receives at least one message authorizing the operation from the power controller or until a programmed time period has elapsed. In such case the device sends at least one message the terminal processor 342 indicating that it is not authorized operate and the transaction cannot be conducted. Alternatively in other embodiments, the power controller may operate to send at least one message to the transaction function device indicative that the operation cannot be authorized at the current time. Such a message may cause at least one processor in the transaction function device to operate in accordance with its programming to submit the request again at a predetermined time and/or to repeat the process a number of times until the transaction is either authorized or such time has elapsed and it is determined that the transaction cannot be performed. Alternatively in some embodiments the processor 342 may communicate with the power controller so that the processor can cause additional instructions to be sent to the transaction function devices or to the power controller to attempt additional operations in response to the inability of the device to operate due to unavailable power. Alternatively or in addition, the at least one processor may operate in accordance with its programming to determine what devices in the machine that are currently operating might be turned off or operated at a reduced power level in order to free up power that can be allocated to the operation of the transaction function device that is to operate. Of course these approaches are exemplary and in other embodiments, other approaches may be used.

In response to receiving at least one message which causes the transaction function device 346 to operate in response to the at least one message that it has received from the terminal controller, the transaction function device operates. In exemplary embodiments the operation of the transaction function device causes the at least one processor associated therewith to cause one or more messages to be communicated to the power controller. Such messages may include, for example, messages that indicate device operation or the particular stage of device operation. For example, if a device has been instructed to perform an operation that involves several steps and which steps involve consuming varied levels of power, the transaction function device may send messages to the power controller which are indicative of the operations that are or have been performed by the device. The power controller may operate in accordance with its programming to monitor the progress of these operations and to determine if the device has completed such operations to the extent that the amount of power that the device has been allocated will no longer be further needed by the device. If so, the device ceases to require such power and the power controller operates to determine that the power that the device was consuming can be released for other uses. Alternatively the messages from the device indicating the status of its operation may indicate that the device still needs to perform further significant power consuming operations. If so, the power controller continues to allocate the power for the device operation. This is represented in a step 462.

For example, in some embodiments during operation of the device, the messages from the device to the power controller indicating the status of device operation may be indicative that there will be a need for additional cycles or other actions which will require consumption of power. This determination is represented by step 464. In response to this determination the power controller continues to allocate the power for the device as represented in step 466 and the device continues to perform its operations as represented in step 468. Alternatively if in step 464 the power controller determines that the device has completed its operations associated with the particular instruction, then the power controller operates to determine that the power is no longer required and the power controller can operate in accordance with its programming to release the power that it was allocating to the transaction device and apply it to other functions or devices that may be waiting to operate. This is represented in a step 470.

An example of such an operation in an automated banking machine may be associated with operation of a cash acceptor. The at least one terminal processor of the machine may cause the cash acceptor to receive a "cash in" command from the banking machine software after a user has deposited bank notes in a cash accepting area of the banking machine. The command may cause the cash acceptor device to operate to begin moving, separating and analyzing the bank notes in the course of performing a cash accepting transaction function by the machine. Such activity may represent a high power consuming activity. In the exemplary embodiment, the cash acceptor may only commence the analysis of the bank notes after receiving at least one command from the power controller to proceed with the cash analysis. Thereafter upon performing a first portion of the cash analysis, communications from the cash acceptor may indicate to the power controller that the cash acceptor has received and evaluated all the bank notes. In response to receiving the at least one message that the cash acceptor has progressed in its operation to this extent, the at least one power controller may operate in accordance with its programming to determine that the current amount of power needed for operation of the cash acceptor is now lower than that required when it was processing the received notes in the processing activity that has already occurred. As a result, the power controller may operate in accordance with its programming to reallocate some of the power previously allocated to operation of the cash acceptor if power is currently required for other operations. However, to the extent the cash acceptor has accepted the bills, there may be rejected notes or other conditions that require additional steps the cash acceptor still needs to perform as part of the instructions that it was originally commanded to perform by the banking machine software. As a result the power controller may continue a sufficient allocation of power for the cash acceptor device in order to perform these additional operations. For example, these additional operations such as returning unidentifiable sheets to a location where they can be retrieved by a user, may involve a lower power consumption than the initial note analysis operations. The power controller operates to continue the allocation until it receives at least one message from the cash acceptor indicating that any additional steps required have been completed. Responsive to receiving one or more messages indicating that the operation of the transaction function device has now been completed causes the power controller to operate in accordance with its programming to resolve that power originally required for operation of the device can be reallocated for other operations and to do so, if required.

Figure 18:
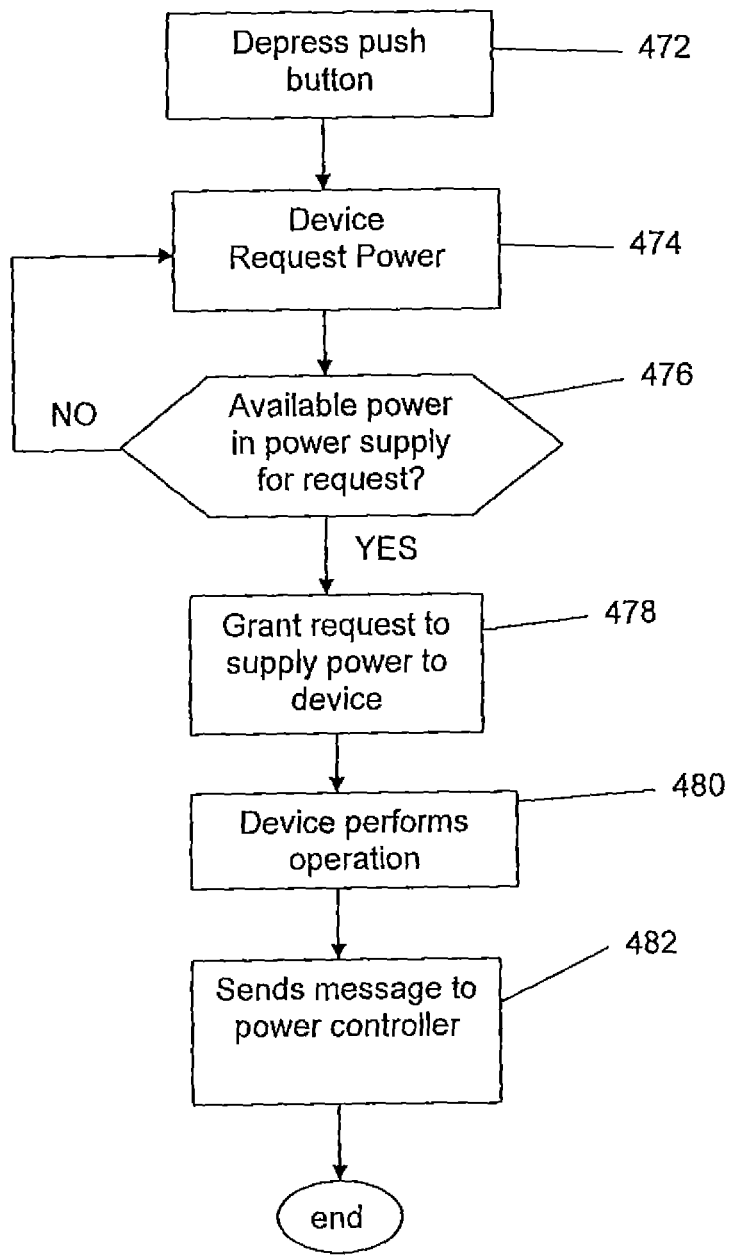
FIG. 18 is a schematic representation of steps for another exemplary process carried out by the power control system of FIG. 16.

Another alternative exemplary operation of a device is represented in FIG. 18. For example, a transaction function device may be operated responsive to inputs such as the push button actuator 450 previously discussed. The operation of a device in response to such a manual input is represented schematically in FIG. 18. In this example, manual actuation of the button on a transaction function device so as to request operation of that device is represented by step 472. In response to the receipt of the input, the at least one processor of the device operates to cause at least one message to be sent from the processor associated with the device to the power controller, in order to request authorization to operate in accordance with the received request. As previously discussed in some embodiments the at least one message sent to the power controller may indicate the amount of power needed based on data stored in the at least one device. Alternatively in other embodiments the at least one message to the power controller may be indicative of the device and the function that the device has been instructed to perform. The power controller may then resolve the amount of additional power needed to have the device perform the function. Of course these approaches are exemplary. The request by the transaction function device requesting power is represented schematically by step 474.

Responsive to the messages from the transaction function device the power controller is operative in accordance with its programming to make a determination if there is currently power available within the capability of the power supply for the device to perform the requested function. This is done in the exemplary embodiments by the power controller monitoring the level of power being drawn on the power supply at the current time, as well as the power controller analyzing in accordance with its programming, the operations it has authorized or will need to authorize based on requests from other transaction devices, the terminal controller or other sources. In response to conducting this analysis the power controller makes a determination as to whether or not the operation of the device can be authorized. This is represented in a step 476. If the operation cannot be authorized, the power controller may return a message to the device indicating that the operation cannot be performed. Such a message may cause the device to operate in accordance with its programming to resubmit the message requesting authorization to operate to the power controller within a certain time, or to indicate unavailability of the function that is requested by one or more messages to the terminal controller or by providing another output indicative thereof. Alternatively the device may take other steps in accordance with its programming. In some embodiments the power controller may not return a message to the device if device operation is not currently authorized. This may cause the device to resubmit the request periodically until such operation is authorized or a timeout is reached in which the case instruction is deleted. Of course these approaches are exemplary.

If in the step 476 the power controller determines that the additional power is available to perform the function, the power controller sends at least one message to the device which indicates that the device is authorized to operate in accordance with the received instructions. This is representative in a step 478. Responsive to receipt of the authorization, the at least one processor of the device operates in accordance with its programmed instructions to cause the device to perform the operation. This is represented by a step 480. Responsive to operation of the device, the device operates to send at least one message to the power controller. In some embodiments this may be done during the operation of the device to indicate to the power controller the current state or level of completion of the performance of the function. Alternatively in some embodiments the device may send a message only to indicate completion of the particular function the device has been instructed to perform. The sending of one or more messages of this type are represented in FIG. 18 by step 42. In response to receipt of these messages which indicate that the function has been completed, the power controller may operate in accordance with its programming to no longer allocate available power to the functions and to allow other or additional functions to be performed by devices in the machine.

An example of an automated banking machine operation that is carried out in response to a manual input to a button or other input device would be an instruction to a currency acceptor or other device that has invalid or suspect sheets in storage. An authorized service person may desire to recover such invalid or suspect sheets in storage so they can be removed from the machine. To do this, the service person may actuate a pushbutton on the currency acceptor module device. The actuation of this pushbutton may cause the messages to the power controller to determine if there is currently available power for the module device to operate its power consuming components so as to unload the stored sheets so that they can be taken by the authorized service person. If the power is available or becomes available, the at least one controller operates to cause the device to carry out the requested function. Of course this is only one example of an operation of a transaction function device in response to the specific manual input and in other embodiments, other such functions may be carried out by other types of devices.

In other exemplary situations, power may need to be allocated when a transaction function device encounters an error or other abnormal condition and needs to perform at least one operation to recover from the error. In some cases such recovery actions may require more power than when the device is operating normally. An example of this might be the situation where a sheet jam occurs in a sheet transport or other sheet handling device. In these situations one or more motors or other drives may need to operate in ways that are different than during normal operation. This might include, for example, the motor in the device operating at a higher speed than in normal operations. It might also include operating a motor to make a number of reversals in direction to try to clear a jammed sheet or other condition. When such an abnormal condition is detected, the transaction function device may indicate to the power controller the operation that it is being instructed to perform. This enables the power controller to determine if the amount of power needed to carry out the recovery operation is available. The power controller can then authorize the recovery operation if the power needed is available from the power supply, or not authorize and defer the recovery operation until such time as power consumption of other devices is reduced to the point where the power supply can deliver the needed power for the recovery operation.

Figure 19:
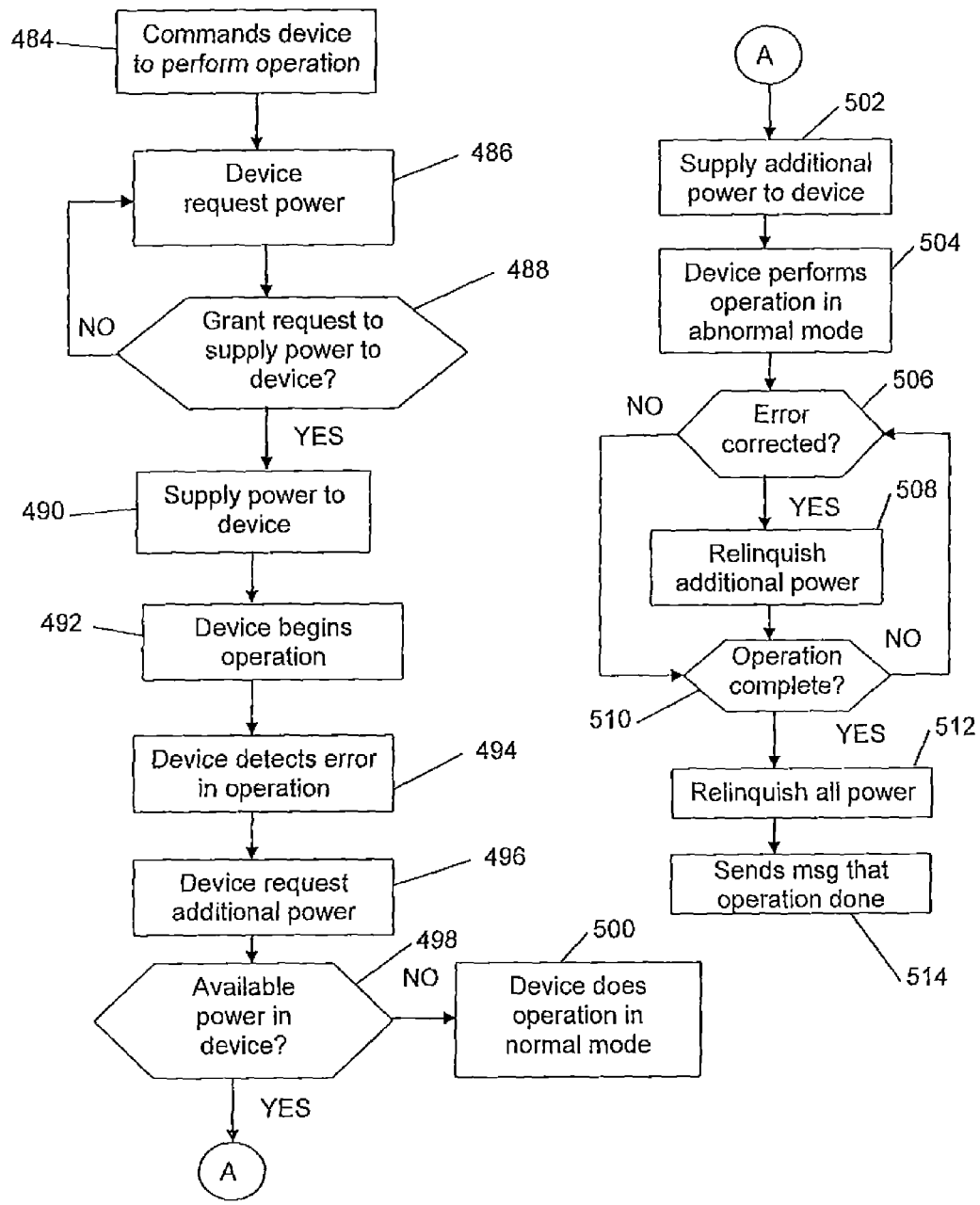
FIG. 19 is a schematic representation of steps for still another exemplary process carried out by the power control system of FIG. 16.

FIG. 19 shows an example of the process associated with a situation where a device encounters an error in operation and needs additional power to execute a recovery activity. As represented in step 484, the terminal processor 342 sends a message instructing the transaction function device 346 to perform an operation. In step 346, the at least one processor associated with the transaction function device operates in accordance with its programming to send a message to the power controller 370. The at least one message sent to the power controller indicates that the device has been instructed to operate in the particular manner. Alternatively, as previously discussed, in some embodiments the transaction function device messages may include an indication of the amount of power required by the device to perform the requested operation. As represented in step 488, the at least one processor associated with the power controller 370 operates responsive at least in part to the at least one message to determine whether the power supply can make available the additional amount of power to the transaction function device at the then current time. The at least one processor of the power controller may make this determination based on a number of different criteria. This may include, for example, the level of power being drawn on the power supply 396 at the present time. It may also include executing instructions that evaluate the current power allocations made by the power controller to different devices for their then current operations or operations that are then expected to soon occur based on data stored in at least one data store associated with the power supply which indicates the level of power needed for such devices throughout their operations. Of course this approach is exemplary.

If the additional power that would be required to operate the transaction function device is determined through operation of the power controller to then be available as represented in a step 488, one or more messages are sent through operation of at least one processor associated with the power controller to the transaction function device to instruct the device to operate. This is represented in step 490. Alternatively if in step 488 the power controller is operative to determine that the additional power that would be required to operate the device is not currently available, the at least one processor associated with the power controller does not send a message to the device to instruct it to operate. Rather in some embodiments the at least one processor associated with the power controller may send no responsive message to the transaction function device. The transaction function device may then send subsequent messages responsive to its programming so as to repeatedly request power until a timeout or other event associated with no longer requesting the operation occurs. Alternatively in some embodiments the at least one processor associated with the power controller may send one or more messages to the device. Such one or more messages may be operative to cause the device to operate in accordance with its programming to defer operation, and to request authorization to operate again at a later time. Alternatively in some embodiments the message to the at least one device may include instructions to cause the transaction function device to operate at a later time. This might be done, for example, in cases where the power controller determines that another device which is currently operating will cease operation within a given time period, and thereafter the device currently requesting power to operate may begin operating without exceeding the capabilities of the power supply. Of course these approaches are exemplary and in other embodiments other approaches may be used.

In response to messages from the power controller and the messages including instructions originally received from the terminal processor 342, the transaction function device 346 begins operation as represented in a step 492. In this example the particular device operates to perform actions in accordance with instructions stored in at least one data store associated with the processor of the device. In this example operation, the at least one processor detects that the device encounters an error in operation. This is represented by a step 494. This error in operation may correspond to a sheet jam in the machine of the type previously discussed or another abnormal condition which corresponds to one or more conditions for which the at least one processor in the device includes associated programming to which the transaction function device can react by executing an error recovery routine.

In response to determining that the device has sustained a particular error or anomaly in its operation which can be identified, the at least one processor of the transaction function device of the exemplary embodiment sends at least one message to the power controller. The at least one message is indicative of the recovery operation that the device is requesting permission to perform. Alternatively in some embodiments, the message may include data corresponding to the additional amount of power that the transaction function device will need to perform its recovery operation. This is represented in step 496.

Responsive to receipt of the at least one message regarding the recovery operation from the transaction function device, the at least one processor associated with the power controller operates in accordance with its programming as well as the data that it receives from the power supply to determine if the amount of additional power that would be required for execution of the recovery operation is available. This is represented in a step 498. In some embodiments this may include, for example, the at least one processor of the power controller operating in accordance with its programming and data stored in associated therewith to determine the amount of additional power that would be required to perform the recovery operation.

Responsive to a determination by the power controller that the additional power required for the recovery operation is not available, the at least one power controller acts so as to not authorize the recovery operation. This may include, for example, sending at least one message to the at least one processor of the transaction function device indicating that the recovery action should not be performed at the current time. Alternatively one or more messages from the power controller may indicate that the recovery action can be commenced at a later time based on when other power consuming operations are completed and power will be available. Alternatively the power controller in some embodiments may send no messages and wait for a subsequent request sent from the transaction function device. In such case, the device continues to operate in accordance with its programming in the mode with the error encountered but no recovery attempted. This is represented by a step 500. In the circumstances this may include, for example, the device suspending operation or attempting to operate in another or different manner in accordance with its programming. This will depend on the particular transaction function device, the nature of the problem encountered and the programming associated with the at least one processor in the device.

If in a step 498 it is determined through operation of at least one processor associated with the power controller, that the power supply can provide the additional power associated with the recovery operation, the at least one processor is operative to send at least one message to the transaction function device indicating that the recovery operation may proceed. This is represented by the step 502. Responsive at least in part to the one or more messages from the power controller, the transaction function device then proceeds to operate in the recovery mode in an attempt to clear the particular problem or anomaly that was detected. This is represented in step 504. This might include, for example, operating in a high power consuming mode in which the transaction function device operates motors at higher speeds, moves solenoids or other power consuming devices in rapid repeated and/or reversing fashion in order to try to correct the anomaly.

In response to operating the power consuming devices of the transaction function device in the recovery mode, the at least one processor associated with the device operates in accordance with its programming to determine if the error or anomaly has been corrected. This is reflected in a step 506. In some embodiments, the at least one processor of the device may operate in accordance with its programming to test whether a transport path or other area or device is clear of a problem through execution of programmed instructions. If the problem is indicated to still exist, to repeat the attempted corrective action. Step 506 represents the determination made through operation of the at least one processor of the device to determine if the condition has been corrected.

Responsive to the determination by the at least one processor of the transaction function device, if the error has been corrected, the at least one processor of the device operates to cause at least one message to be sent to the power controller. This at least one message is indicative that the transaction function device no longer needs to operate in the higher power consuming recovery load. This is represented by a step 508. Responsive to receipt of this at least one message, the processor associated with the power controller operates to determine that the additional higher level of power for the recovery operation in the device is no longer required. The power controller may then operate in accordance with its programming to be able to reallocate available power to other operations.

The at least one processor of the transaction function device further operates in accordance with its programming to make a determination if the particular function as originally instructed by the processor 342 has been completed. This is represented in a step 510. If the original operation that stopped due to the error has not been completed, the at least one processor of the device continues to operate in accordance with its programming to carry out the originally instructed function. As can be appreciated, during this time the power controller maintains the power allocation for operation of the transaction function device at its normal operating level or levels. Further in some embodiments communications may occur between the at least one processor of the transaction function device and the controller so as to cause the power controller to be operating to monitor the status of completion of the particular operations. This may enable the power controller to determine a future time, for example, when the operation will be complete so that the power controller may send instructions to other devices to begin operating at a particular future time. Of course these approaches are exemplary and in other embodiments other approaches may be used.

Upon completion of the operation by the transaction function device, the transaction function device communicates that the instructed operation has been completed. This is represented by the step 510. Responsive to receipt of the at least one message from the transaction function device which is represented in the step 514, the at least one processor associated with the power controller operates to adjust its operation in accordance with its programming because the power previously needed for operation of the device is no longer required. This is represented by a step 512. The at least one processor associated with the power controller may then operate in accordance with its programming to allocate available power from the power supply by authorizing other operations that could not be performed with the power available when the transaction function device was operating. Of course it should be understood that this approach is exemplary and in other embodiments, other approaches may be used.

It should be understood that in some alternative embodiments the central terminal processor that controls the operation of the transaction function devices will operate to send messages that notify the power controller of desired device operation that the terminal processor intends to instruct a device to carry out in the near future. The power controller will operate to determine based on stored data, the amount of additional power required to operate the device in the manner the terminal processor has indicated will occur. The power controller will also determine the available power based on the power allocations that the power controller has made to various devices at the present time. The power controller will then operate in accordance with its programming to determine a total of the power that has been currently allocated to various device operations and compare the total to the capable total power output of the power supply. The power controller will then operate to determine if power for the intended operation is currently available. The power controller will then operate to communicate one or more messages to the terminal processor which are indicative of whether operation of the device can immediately commence as intended, or must be deferred until power is available to perform the desired device operation.

If the power is currently available, the terminal processor will then operate responsive at least in part to the messages received by the power controller to cause one or more messages to be sent to the transaction function device which cause the transaction function device to operate. The terminal processor may control and monitor device operation and may send one or more messages to advise the power controller when the device operation is completed. Alternatively the terminal processor and/or the power controller may determine when the operation will be completed. The power controller may then operate responsive at least in part to such messages indicating that device operation is completed or will be completed at an end of a given period to cause the power allocated to the device operation when it has been completed, to be released so that it can be reallocated when future requests are received.

In circumstances when the power controller determines that operation of the transaction function device that is currently being requested cannot be carried out because insufficient power is available, the at least one processor associated with the power controller may send at least one message to the terminal processor indicative that the needed additional power is not available. The terminal processor may operate responsive to such messages in accordance with its associated programming to send one or more messages to instruct one or more devices to operate in a lower power mode. Alternatively or in addition the terminal processor may operate to determine if currently operating devices can be shut down or their operation curtailed so as to make additional power available. This may include, for example, the terminal processor operating to determine what devices are currently operating. In some embodiments it may also include the terminal processor requesting messages including data from the power controller to indicate the nature of the power allocations that the power controller has currently made. It may also include the terminal processor requesting data from one or more processors associated with the power supply regarding current load levels. The terminal processor may operate in accordance with its programming to determine based on the required data, that certain device operations that may be suspended, deferred or terminated so as to make additional power available. Responsive to such a determination the at least one terminal processor may operate to issue one or more messages to one or more transaction function devices so as to terminate or suspend power consuming operations of that device. The at least one processor may then operate to send one or more messages to the power controller so as to indicate that such power consuming activities are no longer being conducted.

In this exemplary embodiment the terminal processor may then operate to send a further message to the power controller to determine if the power is available to immediately operate the transaction function device to perform the indicated operation. Alternatively in some embodiments the power controller may operate to notify the terminal processor that the previously unavailable power has become available. In either event the power controller having determined that the requested operation of the transaction function device is possible, then operates in accordance with its programming to allocate power to the device operation by storing in at least one data store, the information regarding the device and the amount of the allocation responsive to the terminal processor being informed through the messages from the power controller that the needed power for operation of the device is now available. In some embodiments the at least one processor of the power controller may operate to issue one or more messages to the transaction function device so as to cause the device to operate. Alternatively in other embodiments, device operation is authorized solely by messages from the terminal processor. Of course these approaches are exemplary of numerous approaches that may be used.

In some exemplary embodiments, the power controller may operate to include in a data store such as a volatile or nonvolatile memory, data corresponding to devices that are currently authorized to operate and the power allocated to each. In such exemplary embodiments, the power controller may operate in response to a request to allocate additional power, to calculate the needed power for the additional request based on data stored in a data store including such information. The power controller may then operate in accordance with its programming to calculate a total of the then currently allocated power amounts and to compare this total plus the power required to fulfill the current request to the amount of power that the power supply may provide. If the current request can be fulfilled, the power controller will operate to store data corresponding to the device and the power allocated to it, and may maintain such a record until the power controller receives messages indicating that the allocated power is no longer required and can be released. This may correspond to a message indicating that device operation has been completed, such as that previously discussed. As can be appreciated, this approach enables the power controller to operate and maintain a plurality of records related to allocated power for a plurality of corresponding transaction function devices and to release such allocations on a real time basis in response to messages indicating that the power allocations are no longer required.

In some exemplary embodiments, the power controller may operate in accordance with its programming to monitor device instructions issued by the terminal processor to the various devices. The at least one power controller may operate in accordance with its programmed instructions and stored data to determine the level of remaining available power from the power supply based on given conditions. Alternatively or in addition, the power controller may also monitor load factors occurring at one or more of the power supplies to evaluate the current state of power draw. The at least one processor associated with the power controller may operate in accordance with its programming to send one or more messages to the terminal controller and/or processors associated with devices to indicate that certain operations cannot be commenced because of the then current power draw. The at least one terminal processor, for example, may operate in accordance with its programming to defer issuing such instructions to devices that cannot carry out operations at the current time based on the messages from the power controller. Alternatively or in addition, one or more processors associated with devices may defer taking certain steps based on the messages from the power controller indicating that the transaction function device cannot then take those particular steps. In such exemplary embodiments, the at least one power controller may update the status information by sending messages to the terminal processor and/or the processors associated with the transaction function devices periodically so that when the power allocation changes so that additional power can be utilized, the instructions associated with operations that are being deferred due to lack of available power capacity can then be carried out. Of course these approaches are exemplary.

In some exemplary embodiments like those previously discussed, the transaction function devices may include associated processors or other circuitry that communicate status data to the power controller. In such embodiments, the device may be instructed to operate by the central terminal processor that controls the overall terminal operation. Such instructions from the central terminal processor causes the circuitry in the device and the at least one processor therein to communicate with the power controller. The messages operate to notify the power controller of the instructions to operate. The power controller then makes a determination as to the availability of the power required by the device to perform the indicated operation and communicates with the device to cause the device to either operate or defer operation until power can be reallocated and made available. Likewise in such embodiments the circuitry associated with the device may communicate with the power controller to indicate status data such as completion of tasks which allow release of the power allocation for the device by the power controller. In such embodiments the power controller operating to not allow operation of the device may also cause the processor associated with the power controller or a processor associated with the device to communicate with the terminal processor to indicate that the device operation is not being allowed due to lack of available power. Alternatively in some embodiments the power controller may operate to issue messages to the processor included in the device circuitry which in turn notifies the terminal processor of the operation of the power controller not allowing device operation. In response to such messages, the terminal processor may take additional steps such as changing the operation of the machine. For example, the terminal processor may operate in accordance with its programming to determine devices that are operating and to shutdown or change operation of such devices or otherwise take steps in accordance with its programming so as to adjust the operation of the machine to reduce power consumption. Of course it should be understood that in still other embodiments, the machine may operate so that the power controller may communicate messages with both the terminal processor and the circuitry associated with the devices so as to coordinate operations thereof so that the terminal processor does not cause more devices to attempt to operate than can be operated with the available power.

Alternatively or in addition such arrangements may also include sensors which operate to monitor power draw associated with certain transaction function devices. Such sensors may be in operative connection with the one or more processors of the power controller through appropriate interfaces. Such systems may operate to monitor the associated actual power draw during device operation. Such power draw may be compared through operation of one or more processors associated with the power controller or other device to the stored data that corresponds to the allocation of power to the operation of the particular device. A power draw which exceeds the allocation may result in an adjustment of the allocated amount of power by the power controller to that device operation. Further in some example embodiments such monitoring may result in the power controller operating in accordance with its programming to send one or more messages to the terminal processor if the adjusted power allocation is approaching or has reached the point of exceeding available power. In such circumstances the terminal processor may operate in accordance with its programming to cause the shutdown or reduction in power draw from other devices that are then currently operating in the machine or take other programmed steps to modify machine operation.

Alternatively or in addition if sensors operating to sense power draw of transaction function devices are operative to determine that the power draw associated with a particular device is higher than the stored allocation data associated with the corresponding operation of that respective device in the at least one data store associated with the power controller, the at least one power controller may operate in accordance with its programming to change the stored data associated with that transaction function device. Such modification would then result in a higher level of power allocation being for the operation of that device in cases when the power controller receives a request to allow that particular device to operate Likewise, when that device ceases to operate, the at least one power controller will operate to release a higher amount of power associated with that allocation so that it is available for use by other devices during operation of the machine. In addition or in the alternative, in some embodiments, a sensed variation from the allocated power amount which was originally established may be indicative of a malfunction. For example the substantially higher power draw or a substantially lower power draw may be associated with a malfunction condition. Upon the detection of such variations which are outside of given limits or beyond one or more programmed thresholds, the at least one power controller may operate in accordance with its programming to send one or more messages to the terminal processor or to other devices or systems so as to cause an indication of a probable malfunction at the machine. Of course these approaches are exemplary and in other embodiments, other approaches may be used.

It should be understood that exemplary automated banking machines may include numerous transaction function devices which consume power in their operation. Details and operations of such devices may include, for example, check accepting devices, envelope processing devices, processor devices, sheet moving devices, sheet stacking devices, sheet picking devices as well as the motors, actuators, solenoids, relays, integrated circuits, displays, illumination devices and other types of power consuming devices associated therewith. Such devices may include those shown in U.S. Pat. No. 7,819,309; U.S. Pat. No. 7,815,105; and U.S. Pat. No. 7,798,395, the disclosures of each of which are incorporated herein by reference in their entirety.

In some example embodiments, the amount of power allocated to the transaction function devices 346 may be monitored and changed through operation of the machine in real time. For example, if the amount of power being used by the transaction function devices 346 is determined to be greater than the power allocated, the devices will be controlled so operations performed by the transaction function devices 346 will be stopped or reduced. A message or messages requesting additional power to run the operations will be sent to the power controller 370. If the power controller 370 grants the request, the original or more power consuming operations can resume. If the power controller 370 denies the request, the system will defer and not resume the original or more power consuming operations until the system can allocate the needed power to the device.

Figure 20:
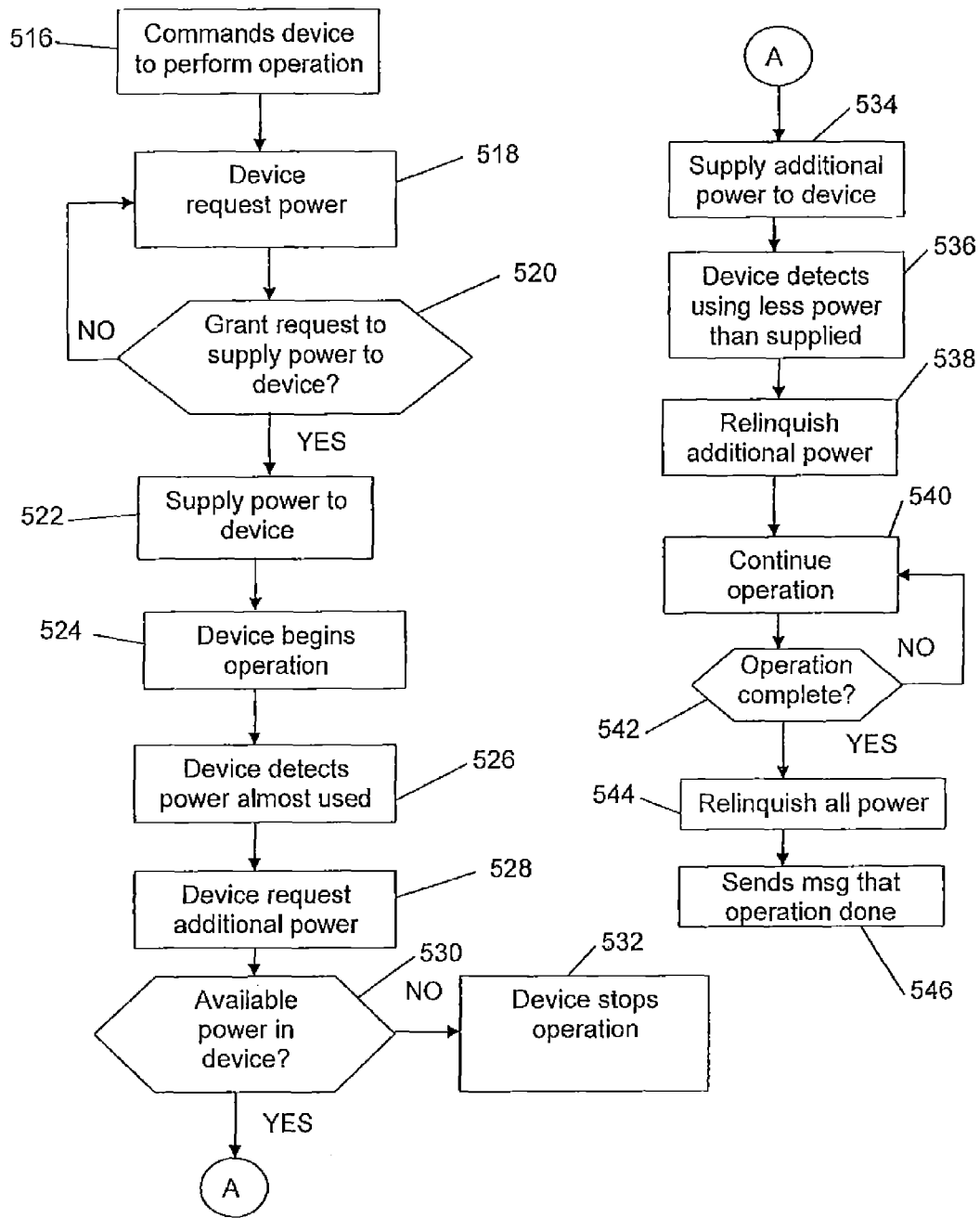
FIG. 20 is a schematic representation of steps for still another exemplary process carried out by the power control system of FIG. 16.

One example schematically representing this process is illustrated in FIG. 20. As represented in step 516, terminal processor 342 sends a message to the transaction function device 346 to perform an operation. In step 518, the transaction function device 346 sends a message to the power controller 370 that corresponds to an indication that it has been instructed to perform the operation which corresponds to a request for a predetermined amount of power needed to perform the operation. In step 520, the power controller 370 determines whether the power supply 396 can supply the predetermined additional amount of power needed to operate the transaction function device 346. This determination may be made based on a number of criteria. For example, the power controller 370 may grant the power request if the available power from the power supply 396 is more than or equal to the predetermined additional amount of power needed by the transaction function device 346, and deny the power request if the available power from the power supply 396 is less than the predetermined amount of power corresponding to the request to operate the transaction function device 346. In some embodiments if the power request is denied, the transaction function device 346 may repeat step 518 until the request is granted. If the request is granted, the power controller 370 enables the operation by sending one or more messages to the processor in the circuitry associated with the device, the terminal processor or both, and the requested power is allocated by the power controller for use by the transaction function device 346 as represented by step 522. The transaction function device then begins performing the requested operation as represented by step 524.

As represented in step 526, the transaction function device 346 processor or power controller 370 detects that the transaction function device 346 is using an amount of power that is almost all the power that is allocated (i.e., getting close to using all the power that it was allocated). In response to this determination, the processor associated with the transaction function device 346 or in some embodiments another processor associated with a monitoring function, causes at least one message to be sent to the power controller 370 indicating a need for additional power to perform the operation as represented by step 528. In step 530, the power controller 370 determines whether the remaining available power from the power supply 396 is more than or equal to the additional amount of power needed to operate the transaction function device 346. If the available power in the power supply 396 is less than the additional amount of power needed by the transaction function device 346, the power controller 370 operates to deny the request. In some embodiments the power controller may issue one or more messages that cause suspension of operation of the device. The processor associated with the power controller will not send messages causing the device to perform the original or more aggressive operations until the power can be allocated as represented by 532.

If the power available from the power supply 396 is more than or equal to the additional amount of power needed for operation of the transaction function device 346, the power controller 370 operates to authorize the operation. The power supply 396 is able to supply the additional amount of power to operate the transaction function device 346, as represented by step 534. In exemplary step 536, the processor associated with the transaction function device 346, processor associated with the power controller 370 or other monitoring processor detects that the transaction function device 346 is using an amount of power that is significantly less than power allocated to it. The processor of circuitry associated with the transaction function device 346 or other processor then sends a message to the power controller 370 indicative of reduced need for power as represented by step 538. This condition may cause the power controller to allocate some of the now unneeded power to authorizing other device operations. The operation of the device continues as represented by 540. In step 542, a determination is made whether the operation is completely performed during the abnormal mode. If the operation is not completely performed, the process goes back to step 540. If the operation is completely performed, the processor in the circuitry associated with the transaction function device 346 or the other processor associated with power monitoring sends a message to the power controller 370 as requested in step 546 that it is done performing the operation. Also as schematically represented in FIG. 20, the device may send one or more messages to the power controller indicative that the power allotment associated with the activity is no longer required. In some embodiments, this may correspond to the sending of the messages indicative of the completion of the operation while in other embodiments it may correspond to separate messages. The exemplary processor associated with the power controller then operates in accordance with its programming to resolve that the power associated with the operation of the device is no longer needed. This enables the exemplary power controller to reallocate the power that was previously used for operation of the device.

In other embodiments, exemplary power controllers may operate to closely monitor device operation and monitor power consumption so that selected portions of device operation are authorized separately. This may occur, for example, when the device commanded to perform an instruction by the terminal processor and the function performed may involve operation of power consuming devices within the transaction function device at various levels over the course of performing the function. Thus, for example, each portion of the command being executed may require an authorization from the power controller device in order to proceed with that particular portion. This may be done, for example, by the at least one processor associated with the device operating in accordance with its programming to send at least one message to the power controller indicating the next portion to be performed and/or a level of power associated therewith. The at least one processor associated with the power controller may then determine based on available data and other power allocations to running devices, whether the next portion can then proceed. The power controller may then send one or more messages either authorizing the next portion of the function and/or deferring the portion either indefinitely or to a predetermined future time through messages sent to the at least one processor associated with the device. Alternatively in other embodiments, the at least one processor of the power controller may operate to allocate the maximum additional power required at any time during device operation to perform a given function even though the power draw during performance of that function by the device may vary. In this way, the at least one power controller may operate in accordance with its programming to assure that at least the needed amount of power is available throughout the particular device operation. Further in some embodiments the at least one power controller may operate in accordance with its programming to apply a safety factor for additional power draw associated with the device. This may include, for example, a safety factor applied to the estimated maximum power draw that is determined based on stored data likely to be encountered during device operation. Further in other alternative embodiments the safety factor may be applied to each anticipated level of additional power draw associated with each of a number of different portions of a given device operation in connection with performing a function. Of course these approaches are exemplary and in other embodiments, other approaches may be used.

In still other embodiments, the functions performed by the power controller may be integrated with the operations of the terminal controller or other one or more processors that control operation of the devices in the machine to carry out transactions. Thus, for example, different processes running in one or more terminal processors may carry out the functions previously described in connection with the power controller. It should be understood and appreciated that while the preceding embodiments have been described as including a separate power controller, a power controller as described herein shall also include a separate functional capability operated in one or more computers which serve to control and authorize the operation of devices so as to minimize the risk of malfunction due to power draw by devices that have been instructed to operate or that are otherwise operating in the banking machine, exceeding the power that is available from a given one or more power supplies.

It should be further understood that while one power supply has been discussed in connection with this particular description, embodiments of exemplary automated banking machines may include multiple power supplies. This may include, for example, power supplies associated with devices that operate a different voltage levels and/or with different AC and/or DC types of power within the machine. The principles described herein may be used to operate and control devices so as to avoid malfunctions due to exceeding the capabilities to provide power of such one or more power supplies.

It should be understood that the control and allocation of power described in the above exemplary embodiments may be useful for systems that have multiple devices attached to a single power supply, where the power supply does not have sufficient power delivery capacity to operate all devices simultaneously, or alternatively where such power supply may not have the capability to operate all such devices in all possible modes of operation simultaneously. In addition in exemplary embodiments, power from the power supply may be utilized more efficiently. This may result in a smaller and lower cost power supply being needed relative to a larger power supply that might be required so as to provide the necessary amount of power to multiple devices under a broader spectrum of possible conditions. By being able to reduce the size of one or more power supplies in the machine, the automated banking machine may be able to operate generally more efficiently, thus reducing energy consumption and prolonging the life of the power supply and/or transaction function devices within the machine.

In other exemplary embodiments, the principles described herein may be applied not only to operation of devices within the machine but also to operation of external lighting and other devices that may be associated with the automated banking machine. For example in some exemplary embodiments, automated banking machines may have associated therewith external lighting that is operative to illuminate the area of the machine and to also provide a safe operating environment for users of the machine. This may be done, for example, in a manner described in U.S. Pat. No. 6,305,02, the disclosure of which in incorporated herein by reference in its entirety.

In such example embodiments, at least one power controller may operate to determine the need for example, to activate supplemental lighting associated with customer operation of an automated banking machine. This may be done, for example, by the same or different power controller that allocates power for the operation of the automated banking machine. For example, in some exemplary embodiments, at least one separate power controller associated with controlling external lighting usage may be operated primarily to conserve electrical power as needed so as to reduce total energy costs associated with the operation of an automated banking machine in an outdoor environment. Such a power controller may operate in accordance with its programming to monitor light levels in one or more locations in an area associated with the machine. The at least one power controller for the external light sources may operate in accordance with its programming to only cause the operation of additional lighting sources when the ambient levels of lighting are below a particular level.

In some alternative embodiments, the at least one power controller may operate in accordance with its programming to detect the presence of an individual and/or their vehicle within the vicinity of a given automated banking machine. This may be done through appropriate types of sensors for persons or vehicles which are adapted to sense the presence thereof in an area indicative that the person or vehicle may be approaching the automated banking machine and/or is continuing operation of the machine. In such situations responsive to detection by the one or more sensors, the at least one power controller for the external lighting may operate in accordance with its programming to increase lighting levels in the vicinity of the machine in anticipation of future machine operation. The power controller may also operate to maintain such increased lighting levels during the time period that the machine is being operated as well as when the user of the vehicle remains in proximity to the ATM after a transaction has been conducted. For example, after a transaction is sensed as having been completed and the sensors for detection of a user or their vehicle indicate that the user has moved away from the machine, the at least one power controller may operate in accordance with its programming to reduce the lighting levels in the area of the machine so as to conserve power.

For example in some exemplary embodiments, external lighting sources may be varied in both color and/or intensity responsive to operation of the power controller associated therewith. In some embodiments, for example, multiple color light emitting diodes or other suitable multicolor lighting may be provided in the area of the machine. The power controller may operate such light sources at a low level and/or in a particular color scheme which the bank finds attractive for inducing customer operation when no customer is present. This might be for example a relatively low level of lighting in a particular color. This might further be a color that is selected based on the ability to produce light with lower power draw. Alternatively it could be a color associated with the bank's particular brand. Upon one or more sensors sensing a vehicle or a person in the area of the machine, the at least one processor could then increase light output and/or activate other light sources so as to bring the lighting intensity up to a relatively high level of white light or a mixture of light while the user conducts their transaction and until they are detected as having moved away from the machine. Thereafter the power controller may return the lighting to the prior condition. Of course these approaches are exemplary and in other embodiments, other approaches may be used.

In still other exemplary automated banking machines provision may be made for providing reduced risk of downtime due to malfunctions in database software operating in the machine. As can be appreciated, in some exemplary embodiments one or more data stores in operative connection with terminal processor within the machine include database software instructions. The database instructions are comprised of data files which include instructions used in operation of the machine. These data files include for example data concerning configuration parameters that are used in carrying out the operations of the machine. Such data files may include data in the form of XML, other markup language or other types of files which are usable to control the manner of operation of various transaction function devices. Data files may also include operating parameter data or information that is required for the automated banking machine to communicate with associated transaction function devices and to carry out transactions. Of course the database software instructions may also include stored data related to transactions that have been carried out through operation of the machine.

Figure 15:
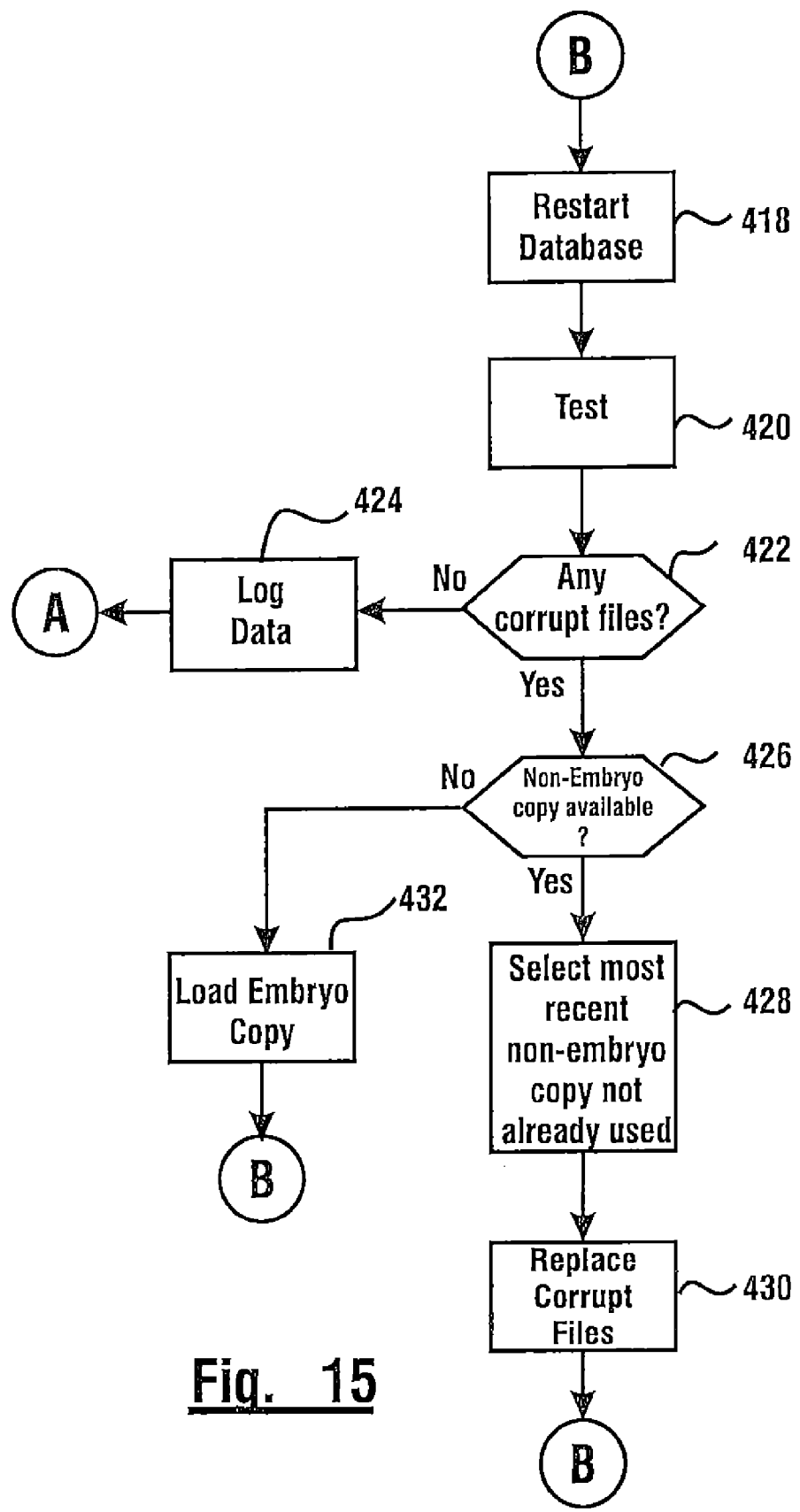

In exemplary embodiments the terminal processor within the machine operates in accordance with programmed instructions that help to assure that the automated banking machine can recover from a malfunction of the database software instructions. The software logic that is carried out by the terminal processor in an exemplary embodiment responsive to executable instructions to minimize the risk of machine failure due to a database malfunction is represented schematically in FIGS. 14 and 15.

As can be appreciated, in an exemplary embodiment the instructions corresponding to operating software is installed and stored in one or more data stores on an machine. This will include the database software instructions as well as other software instructions which cause operation of the machine. The installation of the database software instructions and other software instructions is represented in a step 398 shown in FIG. 14. Once the operating software including the database software has been installed on the machine, the machine is run in response to the installed computer executable instructions. This is represented by a step 400.

In the exemplary embodiment the computer executable instructions carried out by the terminal processor include operating the at least one terminal processor so as to produce and store an initial copy of the database software instructions in the at least one data store. This initial copy of the database software instructions as installed is resident on the associated hard drive or other data store of the machine. This initial copy referred to as the "embryo" copy, is co-resident in the at least one data store of the machine with the database software instructions that are then currently used and executed through operation of the terminal processor in operating the machine. The storage of the initial or embryo copy is represented by a step 402. It should be understood that although a hard drive is discussed as an article bearing computer executable instructions and data, other types of articles may be used, such as for example, CDs, DVDs, flash memory, or other forms of magnetic, optical or electronic storage media.

In the exemplary embodiment the automated banking machine operates in accordance with its programmed instructions to carry out financial transactions for users. This includes financial transfers such as cash dispensing transactions and other transactions that are within the capabilities of the particular automated banking machine. The operation of the machine to carry out transactions for users is represented schematically in a step 404. Further as can be appreciated the operation of the automated banking machine causes changes to the database software instructions. This includes for example updates to files and other information. It also generally includes information about changes in devices or other aspects of devices or machine parameters that are used in operation of the machine. In addition in some exemplary embodiments the database software instructions may also be changed as a result of the loading of patches, fixes, updates or other configuration data into the files of the database software instructions. This may be done locally or remotely by the entity responsible for operation of the machine or by a service provider company whose updates to the database software instructions is represented by a step 406.

As can be appreciated updates to the database software instructions are stored in the at least one data store of the machine. As the database instructions are updated the files included therein are changed. However the embryo copy of the database software instructions is also maintained in the at least one data store generally without any material change.

In operation of the machine the terminal processor operates to determine if malfunctions occur that are attributable to the database software. These may be separate instructions which are carried out by the terminal processor or may be included as part of the database software itself. The terminal processor operates to monitor for and identify such malfunctions and determines whether such a malfunction has occurred. This is represented by a step 408. If no malfunction has occurred the machine continues to operate to carry out financial transactions. However in accordance with an exemplary embodiment, software instructions are included so that on a controlled and/or periodic basis additional copies of the database instructions are produced and stored in the at least one data store. This is represented by a step 410. In some embodiments the determination on whether to store an updated copy of the database software instructions may be done on a timed basis or may be done based on the number and/or types of transactions which have been conducted at the machine. In still other embodiments the determination may be based on activity related to software downloads which reflect changes to configuration data or other data. The particular approach taken depends on the particular programming of the automated banking machine.

As represented in FIG. 14 in an exemplary embodiment before a further copy of the database software instructions is added to storage in the at least one data store, a determination is made as to whether there is adequate disk space available for such copy. This is done as represented in a step 412. In the exemplary embodiment if there is a problem with available disk space, the terminal processor operates to free up disk space to accommodate the making of the additional copy. In an exemplary embodiment this is done by the at least one processor deleting a previously stored copy of the database software instructions. This may be accomplished for example by deleting all or at least a portion of the oldest copy of the database software instructions other than the embryo copy. Of course this approach is exemplary and in other embodiments other approaches may be used. The deletion of the prior copy is represented by a step 414. Once it is determined through operation of at least one processor that there is suitable disk space for an additional copy of the database software instructions such a copy is produced and stored as represented in a step 416. The automated banking machine thereafter continues to operate with the currently utilized, most up to date database software instructions. The embryo copy and a plurality of sequentially made copies are all stored and existing in the at least one data store of the machine.

If a database malfunction is detected in step 408 the exemplary embodiment causes the terminal processor to operate in accordance with its associated instructions to attempt to recover. This is first done by operating the terminal processor to restart the database. This is represented in a step 418. Oftentimes restarting the database software will result in the correction of the particular malfunction and a return of the database software instructions to normal operation.

Once the database software has been restarted one or more tests are conducted through operation of the at least one processor to determine if it is operating properly. This is represented in a step 420. The testing to determine if the software is operating properly may include execution of instructions by the terminal processor which are part of the database software itself. Alternatively it may include the execution of other instructions to determine the presence of malfunctions in the database software.

The terminal processor then determines in a step 422 whether there are any database files that are determined to be corrupted as a result of the testing in step 420. If the restart has eliminated any corrupt files the terminal processor then operates to make a record of the particular malfunction and the data about the correction thereof. This is represented in a step 424. If the malfunction has been corrected the terminal processor then returns to normal operation.

If however in step 422 it is determined that there is still a database malfunction, a determination is then made at a step 426 whether there are retained copies of the database software instructions other than the embryo copy, that are accessible in the at least one data store. If so the processor then operates in a step 428 to select the database software instructions that has been most recently stored which has not been used for attempted recovery previously and that is stored in at least one data store. In the exemplary embodiment, by selecting the most recently stored copy of the database software instructions the system attempts to recover the stored data files that were most current at the time of the machine malfunction.

After determining the appropriate stored database software instructions, the terminal processor operates to replace the corrupted files in the operational database software instructions with data from the previously stored files that correspond to the corrupt files in the stored database software instructions. The replacement of the data in the corrupt files is represented in a step 430. This may be done through operation of at least one processor via a selected file replacement in some embodiments while in others all database instructions may be replaced. After the corrupted files have been replaced the processor operates so that the database is then restarted in a step 418 and the database is tested for any corrupt files. If the process has resulted in the repair of the database software instructions the processor operates to cause the terminal to return to service after the information concerning the malfunction has been logged. If however corrupt files continue to exist, the terminal processor then again executes steps 426 and 428. At step 428 the terminal processor will then select the next oldest stored set of database software instructions from the one that was previously used in an attempt to correct the database software malfunction. Instructions from this file set will then be used to attempt to correct the database software files. Thereafter once the data in the corrupted files has been replaced, the database has been restarted and tested again.

In the exemplary embodiment if the stored copies of the database software instructions other than the embryo file do not result in repair of the database software instructions, the terminal processor is then operative in step 426 to determine that no further copies which can be used to repair corrupt files exist. In response to this determination the terminal processor is operative to cause the database software files in the embryo copy to be used as the active copy of the database software of the automated banking machine. This is represented in a step 432. These embryo database software files are known to satisfactorily enable operation of the machine and can be utilized in most cases to return the machine to service. The machine is then operated using the files from the embryo copy. Also in exemplary embodiments the terminal processor may operate in accordance with its instructions to cause messages to be sent to an appropriate remote computer so as to advise of the malfunctions which have occurred and the fact that the automated banking machine has returned to its prior configuration. This may result in the downloading of additional software patches or other information from one or more remote computers so as to bring the configuration of the machine to the desired level.

As can also be appreciated, in circumstances where the database software files have been repaired by replacement from prior copies, the terminal processor may likewise operate to give notification to one or more remote computers. This can then result in the downloading of appropriate additional software instructions so that the operation of the machine is in accordance with desired parameters. Further in exemplary embodiments logging of the data regarding malfunctions can be analyzed for purposes of determining the type and nature of the database malfunction which has occurred. This may be done through operation of the terminal processor. Alternatively such analysis may be accomplished by the transmission of the data to a remote computer for analysis. Such analysis may be helpful in determining the cause of malfunctions. It may also be a basis for taking remedial actions either through changes to operation of the machine or modifications of computer executable instructions so as to eliminate similar future malfunctions. Of course these approaches are exemplary and in other embodiments other approaches may be used.

Figure 9:
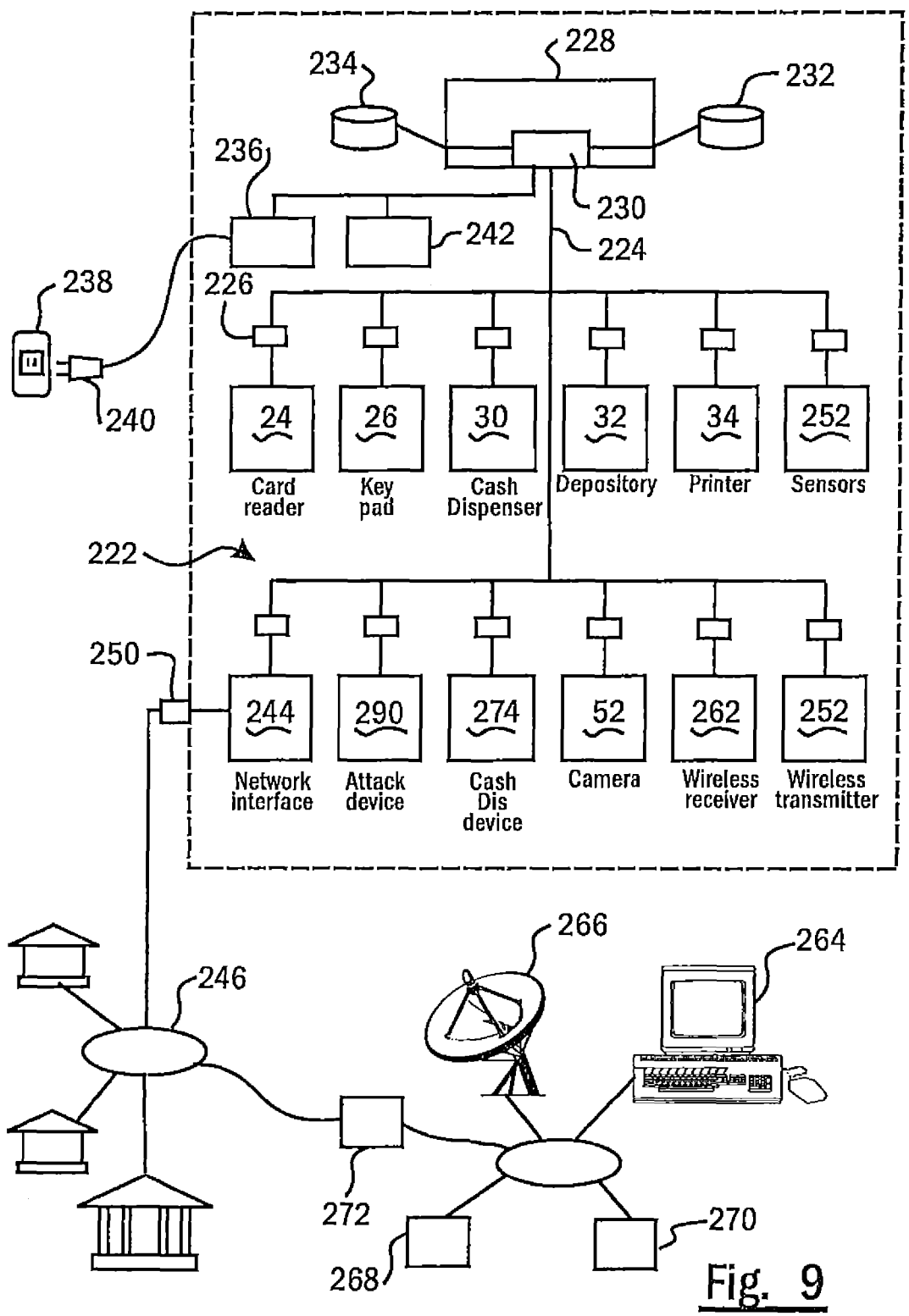
FIG. 9 is a schematic view of an automated banking machine and related systems.
Figure 10:
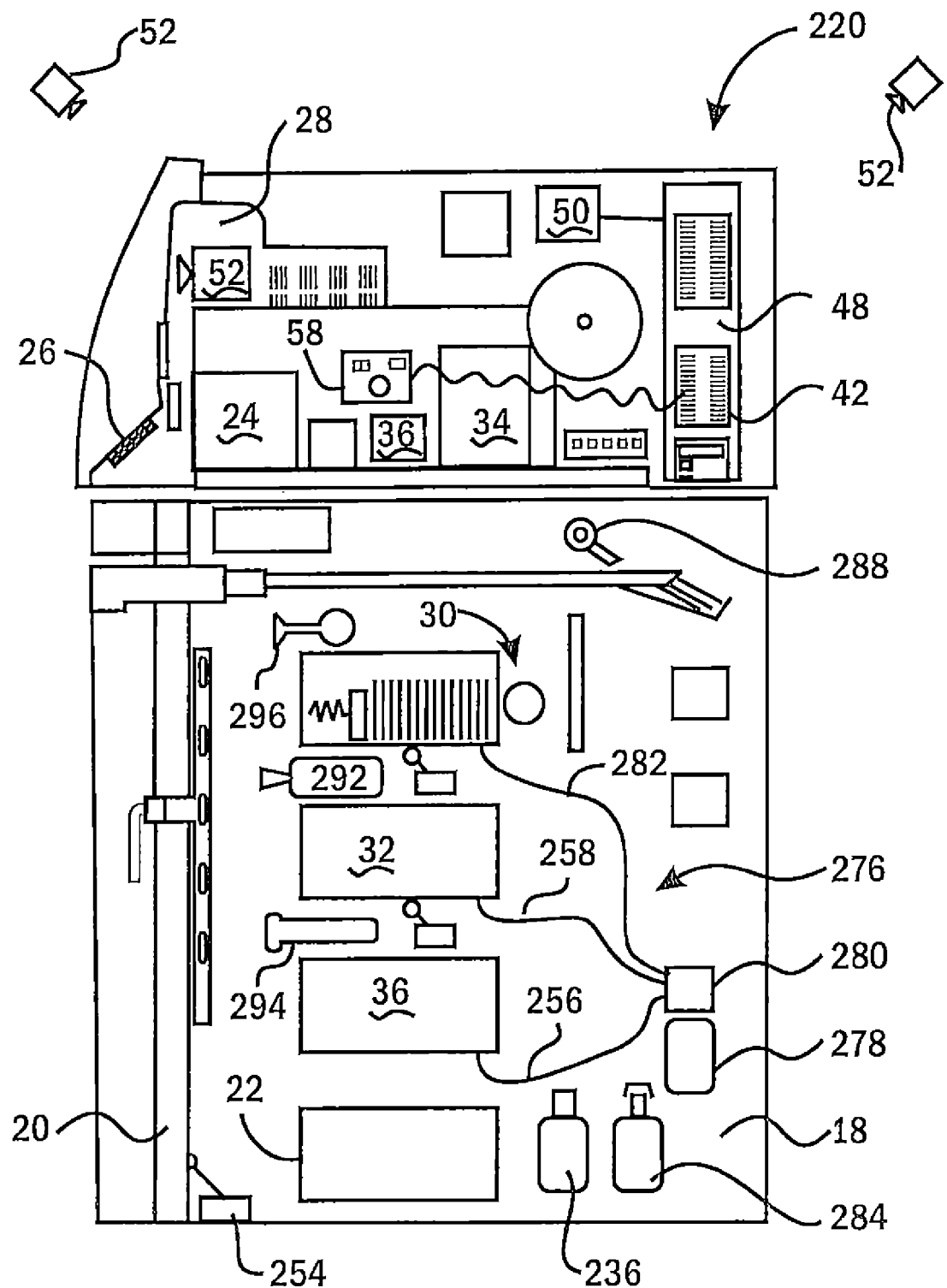
FIG. 10 is a schematic side view representation of an automated banking machine of an alternative embodiment.

A further alternative exemplary embodiment of an automated banking machine and system is represented in FIGS. 9 and 10. Automated banking machine 220 includes many of the features previously described in connection with automated banking machine 110. Common components are marked with the same reference numbers to avoid undue complexity in the description thereof. Of course it should be understood that embodiments may include different or additional devices, components and features.

The exemplary automated banking machine which comprises an automated banking machine 220 includes a plurality of devices 222. Devices 222 include some of those previously discussed. These include a card reader 24. Card reader 24 is usable for reading data bearing records in the form of user cards including indicia thereon that identifies a customer and/or their associated financial accounts. Card reader 24 in various embodiments may be a magnetic stripe reader, smart card reader, radio frequency (RF) reader, RFID reader, capacitance reader, bar code reader, or other reading device. Banking machine 220 further includes a keypad 26 for providing manual inputs. It should be understood that in some embodiments the keypad may also be provided in the form of a touch screen interface in which users can provide inputs by touching areas of the display. Of course in other embodiments other types of manual input devices may be used.

The exemplary embodiment of banking machine 220 further includes a cash dispenser 30, a depository 32 and one or more printers 34. These may be of the types previously described. It should also be understood that other embodiments may include other transaction function devices such as check acceptors, check issuers, note acceptors, money order printers, gaming material readers, coin dispensers or other devices that may be appropriate in connection with carrying out transactions. It should also be understood that each of the devices is connected through one or more connections to an internal communication system schematically represented as a bus 224. Bus 224 may be a USB type network or other standard or nonstandard communications interface. In addition each of the devices is connected through one or more respective device interfaces which are also referred to herein as drivers 226. It should be understood that the nature of the interface would depend on the nature of the device as well as the type of communications bus used within the machine.

The exemplary embodiment further includes one or more cameras 52 which may be of the types previously described. In the exemplary embodiment the machine may have one or more cameras operatively connected to the machine. In some exemplary embodiments the cameras may be located internally of the housing of the machine. The cameras may have a field of view external of the machine either at all times or only when access doors on the housing are open. The particular camera arrangement and the number of cameras used, depends on the particular machine involved and the operator of the system.

The exemplary automated banking machine further includes a controller 228. Controller 228 includes one or more processors 230. It should be understood that although one controller and processor are shown, embodiments may include multiple controllers and processors.

In the exemplary embodiment the at least one processor is in operative connection with a data store 232 and a second data store 234. Although these data stores are indicated as single data storage devices it should be understood that they may each be comprised of multiple data storage devices. As is further discussed in more detail, data store 232 includes in the exemplary embodiment, computer executable instructions that comprise application instructions that are operative to cause the automated banking machine to carry out the transaction functions for consumers as well as servicing functions. In the exemplary embodiment this may include for example, an automated banking machine application software layer, middleware, software, service provider software which includes extensions for financial services (XFS), such as JXFS or Windows XFS compatible interfaces, as well as diagnostic software. Thus in the exemplary embodiment the data store 232 contains the computer executable instructions that comprises the software that operates during normal operation of the machine, such as in carrying out transactions and as in carrying out machine servicing activities. Of course this approach is exemplary and in other embodiments other approaches may be used.

In the exemplary embodiment data store 234 includes exception software instructions. In the exemplary embodiment the exception instructions are executed during exceptional circumstances that may be encountered by the automated banking machine. As later discussed the exception instructions of the exemplary embodiment are intended to operate when the machine is subject to conditions that are indicative of a theft in which the machine is being taken from its intended operational location. This includes circumstances in which the machine has been disconnected from its normal external power source and network connection. Of course in other embodiments the exception instructions may be operative in circumstances other than a theft scenario. This may include for example, situations where the automated banking machine has undergone conditions where significant parts of its programming or programs associated with certain devices may have been corrupted or otherwise rendered inoperative and the machine needs to recover. This may include for example, circumstances where the machine has lost some or all capabilities its operating system or other instructions normally included in data store 232 and therefore the capabilities of the executable instructions in data store 232 would be unable to cause the machine to perform at least some of its normal activities. Of course these approaches are exemplary and in other embodiments other approaches may be used.

In the exemplary embodiment the at least one processor 230 is of the type that is enabled to operate in an out-of-band condition. This means that the processor is enabled to execute the instructions included in the at least one data store 234 even when the machine's operating system is not operational. This may include for example, situations where the machine has been turned off and/or has been disconnected from its normal source of electrical power. An out-of-band processor with such capabilities may include processors with Active Management Technology capabilities from suppliers such as Intel Corporation. Of course in other embodiments other approaches may be used.

In the exemplary automated banking machine 220, the machine includes a power supply 236. Power supply 236 receives power from an AC power source 238. In the exemplary embodiment the AC power source is a conventional 110 volt or 220 volt power socket as is suitable for supplying power for operation of the machine. The power supply is connected through an AC power connector 240. The AC power connector 240 may include a cord and plug type connector which is accepted in the socket of the AC power source 238. Of course these approaches are exemplary and in other embodiments other power sources may be used.

Power supply 236 provides power that is used by the processor and other devices in the machine. This may include for example a suitable power level such as a 24 volt DC source for operating motors, illumination devices and other types of devices needed in the machine. Of course the power supply may also be connected through transformers, rectifiers and/or other devices in the machine that adjust the electrical power to that specifically useful by the particular transaction function device. Of course this approach is exemplary and in other embodiments other approaches may be used.

In the exemplary embodiment a battery 242 is in operative connection with the power supply 246. Battery 242 is a rechargeable type battery which is suitable for providing power to the processor and other selected devices in the automated banking machine. Battery 242 supplies battery power at a suitable level for operation of the processor 230 in an out-of-band environment. Thus for example in an exemplary embodiment which uses Intel Active Management Technology, the battery power needs to supply at least approximately 3.3 volts DC in order for the processor to execute the exception and instructions. Of course it should be understood that in other embodiments higher battery voltages may be provided depending on the particular transaction devices that are to be operated in the out-of-band environment. In addition it should be understood that the battery 242 may also perform the function of providing a source of power to minimize the risk that processors included in the machine will lose data residing in the random access memory in the event of a power outage. Of course these approaches are exemplary and in other embodiments other approaches may be used.

In the exemplary automated banking machine 220, the at least one processor 230 is in operative connection with a transaction network interface device 244. Interface device 244 includes a suitable network interface card or similar mechanism that enables the machine 220 to communicate in a financial transaction network schematically indicated 246. In an exemplary embodiment, the network interface 244 enables communication with one or more remote computers including for example a first computer located at a bank 248. As can be appreciated in carrying out financial transactions for consumers the exemplary automated banking machine communicates messages through the network interface 244 to the appropriate host computer at a bank or other appropriate financial transaction computer, to carry out financial transactions. This may be done for example in the manner of the incorporated disclosures. In addition in the exemplary embodiment the network interface is operatively connected to the communication line or other suitable device that leads to the network 246 through a releasible connector 250. It should be understood that although in the exemplary embodiment the network connection is described as a wired connection, in other embodiments a wireless connection may be used.

In the exemplary embodiment the at least one processor 230 operates in response to the application instructions in the data store 232 to periodically send messages through the network even when the machine is not operating to perform a transaction. Likewise the network periodically sends a message to the banking machine to which it responds to indicate that the banking machine remains working and connected to the network. In this way the at least one processor 230 is enabled to determine whether the banking machine is in operative connection with the network. Of course this approach for determining if the machine remains connected to the network is exemplary, and in other embodiments other approaches may be used. In addition in the exemplary embodiment, computer executable instructions which can be carried out to determine if the banking machine remains connected to the network may also be included with the exception instructions stored in the data store 234. Of course this approach is exemplary.

Banking machine 220 further includes a plurality of sensors schematically represented 252. Sensors 252 may be of various types such as contact sensors, photo sensors, magnetic sensors or other types of sensors suitable for determining the presence or condition of various types of devices or features. For example as shown in FIG. 10, the sensors may include a sensor 254 which is operative to sense whether the chest door of the machine is in an open or closed position. In addition in some embodiments sensors may include sensor 256. Sensor 256 is operative to sense whether a deposit holding container associated with the depository is still in position. Also in some embodiments a sensor 258 may be included. Sensor 258 is operative to sense whether a cassette which holds currency bills that are picked and dispensed through operation of the cash dispenser is in place. Of course as can be appreciated numerous other types of sensors may be included within the machine. Sensors of this type may be useful in connection with determining the status of various devices of the machine, particularly in connection with a theft situation as later discussed. For example sensor 254 may be useful in providing signals indicative of whether the chest door is open or closed. Likewise sensor 256 may provide signals indicating whether the container holding deposits or other valuable items is in position in the machine or has been removed. Sensor 258 may be operative to provide signals indicating whether cassettes holding cash or other valuable items within the machine have been removed. It should be understood that these sensors are exemplary and in other embodiments numerous types of sensors indicating status, position, actuation or other conditions associated with devices in the machine may be used.

The exemplary machine 220 further includes a wireless transmitter 260. Wireless transmitter 260 is operative responsive to the at least one processor 230 to send signals from the machine. The exemplary machine further includes a wireless receiver 262. The wireless receiver 262 of the exemplary embodiment is operative to receive signals. The wireless receiver 262 is in operative connection with the at least one processor. Of course it should be understood that this arrangement is exemplary.

As schematically represented in FIG. 9 the wireless transmitter and receiver may be operative to communicate wireless signals with one or more remote computers schematically represented 264. The wireless signals may be communicated through a wireless network 266. The wireless network 266 may include for example a cellular network, satellite network, wi-fi or other suitable wireless communication connection for communicating with one or more remote computers. It should be understood that multiple remote computers represented schematically as servers 268 and 270 may be operative to communicate with the wireless transmitter and receiver of the machine. Such servers and computers may be operated for example by persons providing services associated with monitoring the condition of the banking machine. Alternatively or in addition such computers may be operated by persons owning the machine, persons responsible for valuables within the machine or law enforcement personnel. Further as schematically represented in FIG. 9 the computers which wirelessly communicate with the machine may also be operatively interconnected with the network 246 through a suitable server 272 or other interface device. Of course these approaches are exemplary and in other embodiments other approaches may be used.

The exemplary machine further includes a cash destruction device schematically indicated 274. For purposes of this disclosure the cash destruction device shall be considered as any device that is capable of destroying or rendering unusable valuable items or information included in the machine. Further it should be understood that cash destruction devices of multiple types may be included within a given automated banking machine.

An exemplary type of cash destruction device shown in FIG. 10 comprises a staining system 276. Staining system 276 comprises a liquid material source of a staining substance such as an ink or other substance which renders valuables such as cash, checks or other items, unusable. The exemplary ink stain system includes a source 278 of such material that in the exemplary embodiment includes a reservoir of pressurized material. An actuator 280 when tripped in response to suitable signals is operative to cause the material from the source to be delivered through hoses 282 or other suitable conduits, to the areas of the valuable items such as cash, checks, mechanisms or other valuables so as to mark such items and render them unusable. Of course this approach is exemplary.

Additionally or alternatively some embodiments may have a cash destruction device which includes a dispenser of odoriferous substances schematically indicated 284. The odoriferous substance dispenser may be in connection with a suitable actuator that operates in response to appropriate signals to cause the substance to be dispensed in the area of valuable items. Such odoriferous substances may be of a type that is highly undesirable and saturates the valuable items included in the banking machine, making them unsuitable for redemption or use. It should be understood that in some embodiments the odoriferous substances may be conducted to various areas through hoses or other conduits in a manner similar to the ink staining substances previously mentioned. Alternatively the odoriferous substances may be of the type that is dispensed generally into an area within the housing of the automated banking machine. The substance may be sufficiently penetrable so as to render the valuable items unsuitable generally due to the confined nature of the material release. Of course these approaches are exemplary and in other embodiments other approaches may be used.

Alternative exemplary devices which may be used as cash destruction devices include a combustion initiator schematically indicated 286. The combustion initiator 286 may include a suitable flammable substance or substances, and an ignitor. The ignitor may operate to release the substances and ignite them in response to suitable signals. The combustion initiator may be operative to provide the material to within the interior area of the chest and cause the destruction of valuable items, mechanisms and information stored within the machine. As a result the combustion may provide suitable flames and/or temperatures to destroy valuable items within the machine so as to prevent a thief from obtaining any benefit therefrom.

In still other embodiments cash destruction devices may include a sheet cutter schematically indicated 288. In the exemplary embodiment the sheet cutter is operative to move to selectively engage cash, currency bills or other items that are moved in a transport within the machine. As a result the sheet cutter may operate to shred certain items within the chest of the banking machine. The shredded items become unsuitable for use by criminals. Of course it should be understood that while blade shredders are schematically represented in FIG. 10, in other embodiments other types of shredding devices, cutters and mechanisms which physically destroy sheet continuity may be used.

Of course cash destruction devices of other or multiple types may be included in exemplary embodiments. These include for example, devices that operate using mechanisms, heat, flame, magnetic radiation, laser emissions or other destructive features.

Exemplary banking machine 220 further includes one or more attack devices schematically indicated 290. Attack devices 290 may have various forms depending on the nature of the automated banking machine and the measures being taken to deter the theft thereof. Exemplary attack devices may include for example, devices which dispense responsive to suitable signals, chemical disabling agents. Such a device is schematically represented 292 in FIG. 10. Chemical dispenser 292 is operative responsive to appropriate signals and the operation of the at least one processor 230 to cause a material that is disabling to humans to be dispensed. This may include for example, materials such as tear gas or pepper spray. Of course in other embodiments other materials may be used.

In other embodiments an attack device may include an electric shock device. Such a device is represented in FIG. 10 by electric shock device 294. Electric shock device 294 may in some embodiments be a device that is actuated responsive to operation of the at least one processor 230. The electric shock device may be operative to cause a shock to a criminal when contacting those areas of the machine that need to be contacted to remove valuable items therefrom. Alternatively or in addition, the electric shock devices may include devices that are operative to shoot electrodes outward from the machine. Such electrodes may be operative to cause a shock to an individual who is standing adjacent to the open chest door of the banking machine. Of course these approaches are exemplary and in other embodiments other approaches may be used.

In still other embodiments attack devices may include sonic output devices that are operative to output sonic signals that cause pain to persons in proximity thereto. This may be done for example, by providing sonic outputs at suitable frequencies and decibel levels so as to provide a painful and/or disabling sensation to individuals in proximity thereto. Such a sonic output device is represented schematically by output device 296 in FIG. 10. Of course these attack devices are exemplary and in other embodiments other types of devices may be used.

In operation of an exemplary embodiment the at least one processor 230 operates to execute the application instructions in data store 232. During normal operation the machine operates responsive to AC power source 238. The at least one processor executes the application instructions to carry out transactions for users through communication with remote computers through the network 246. In the exemplary embodiment the application instructions are executed by the at least one processor 230 to enable the banking machine to carry out transactions as well as other functions that are carried out during the normal course of machine operation. While the automated banking machine runs in this mode, the battery 242 is charged from the power supply 236. In the exemplary embodiment the exception instructions 234 are executed in a standby mode. Of course it should be understood that in other embodiments exception instructions may be carried out to a greater extent during normal operation of the banking machine.

Figure 11:
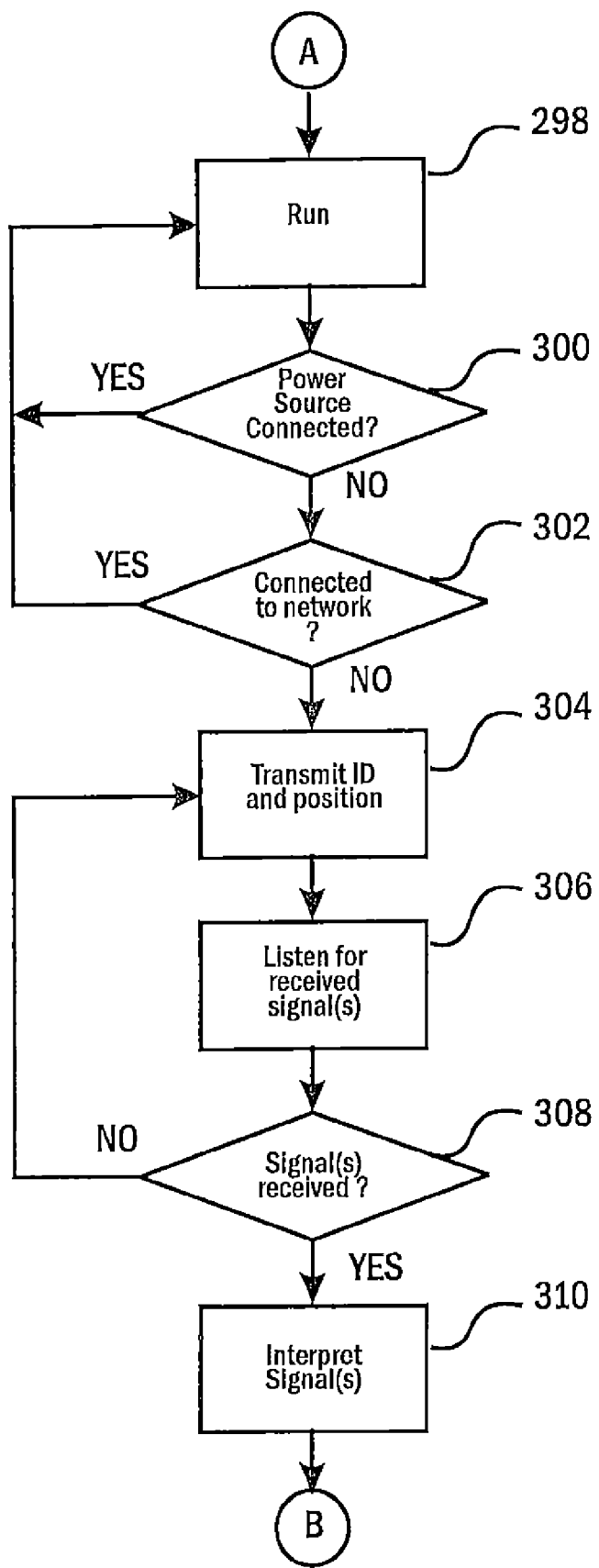
FIGS. 11 and 12 are a schematic representation of an exemplary logic flow carried out through operation of at least one processor in the exemplary machine shown in FIGS. 11 and 12.
Figure 12:
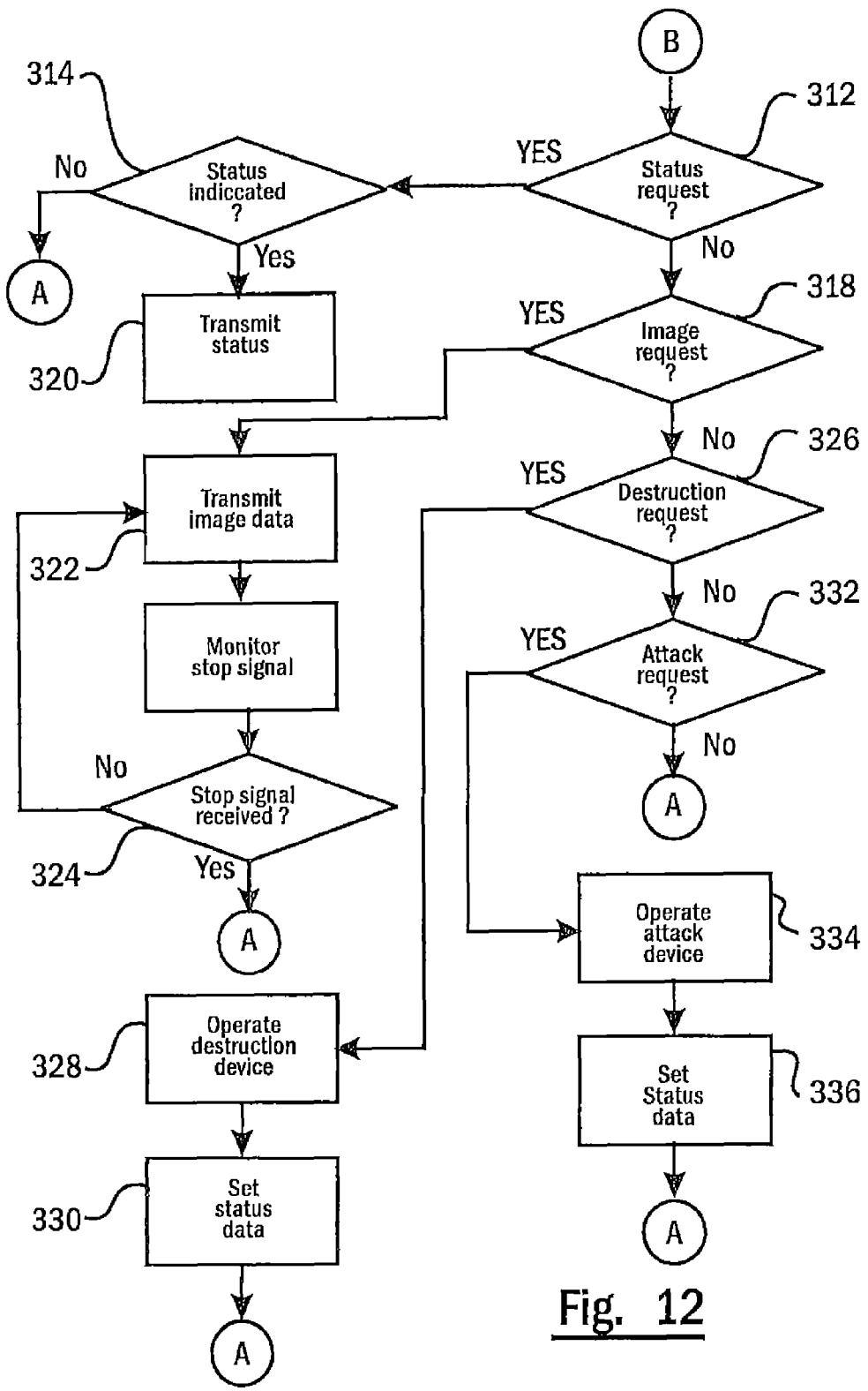

Referring to FIGS. 11 and 12 the exemplary logic executed in response to the exception instructions is schematically represented. The at least one processor 230 executes in a standby mode as represented in a step 298. In the exemplary embodiment the exception instructions are intended for execution in circumstances that correspond to thieves taking the automated banking machine from its original mounting location. This may occur for example in a situation where several thieves sever a machine from its mounting structures and place it in a vehicle or other device so that it can be taken to a remote location. Generally in the remote location the thieves will work at their leisure to open the chest of the machine to access the cash, checks and other valuable items therein. Of course as can be appreciated, when a machine is taken in this manner its connections to the AC power source as well as to the transaction network will be severed. The exemplary system operates in response to the disconnection of the machine from these two connections to cause the execution of several steps which prevent the thieves from receiving any benefit from their theft activity. It should be understood however that basing the decision to carry out the exception instructions on these two parameters is exemplary. In other embodiments additional parameters or different parameters may be used.

As represented in FIG. 11, the at least one processor operates responsive to the exception instructions to decide whether the banking machine is connected to the power source 238. This is done in a step 300. If the machine remains connected to the power source, then the processor continues to maintain the standby mode with regard to the exception instructions and normal machine activity occurs. If however in step 300 it is determined that the machine is disconnected from the power source, an inquiry is next made as to whether the machine is still connected in the network 246. This is done at a step 302. This may be done in the manner previously discussed by sending and receiving messages from the network unrelated to transactions. Alternatively it may involve testing for continuity through the network interface or the connector 250. In still other embodiments the determination of whether there is a connection through the connector may be made other ways. If in step 302 it is determined that the machine is still connected to the network then the processor maintains the standby mode with regard to the exception instructions and no further steps are taken in response to the exception instructions.

If however it is determined that the banking machine is disconnected from both its AC power source and network connection, then the at least one processor 230 executes the exception instructions in a manner like that schematically indicated. In the exemplary embodiment the processor 230 operates using the battery power supplied by the battery 242. In the exemplary embodiment, the banking machine outputs at least one wireless signal in a step 304. In the exemplary embodiment the at least one wireless signal includes at least one identifying signal which identifies the particular banking machine. The at least one wireless signal is output through operation of the wireless transmitter 260 responsive to the at least one processor. In the exemplary embodiment the at least one wireless signal also includes a position indicating signal. The position indicating signal is usable to indicate the current location of the banking machine. In an exemplary embodiment the position indicating signal includes a global positioning system (GPS) signal that may be used to determine the then current location of the banking machine.

In alternative embodiments other types of signals may be output in response to determining a condition in which the exception instructions are executed. These additional signals may also indicate other aspects or conditions of the machine. For example the signals may indicate the status of various devices such as the chest door, the status of the various cassettes, the status of other devices or other information about the machine. Alternatively or in addition the determination of an exception condition may cause the output of image data corresponding to images captured by the cameras on the automated banking machine. Of course these approaches are exemplary and in other embodiments other approaches may be used.

In the exemplary embodiment the wireless signals are enabled to be received through the wireless network 266 by one or more computers such as the remote computer 264. In response to programmed instructions and/or user inputs to the computer 264, the exemplary system operates to send a message back to the automated banking machine that is received through operation of the wireless receiver 262. This is represented in a step 306. As represented by a step 308 the exemplary exception instructions operate to cause the at least one processor to continue to transmit the banking machine ID and position data until a signal is received from the appropriate remote computer. Of course it should be understood that these signals may be encrypted or otherwise masked so that they are not readily understood or intercepted by thieves who may then be able to falsely indicate the position for the machine. Of course these approaches are exemplary and in other embodiments other approaches may be used.

Upon receiving signals from the remote computer 264 the at least one processor 230 carries out certain of the exception instructions as necessary to interpret the signals. This is represented in a step 310.

As represented in FIG. 12 the exemplary embodiment operates to carry out certain of the exception instructions responsive to the received wireless signals. These instructions include responses to requests for status information, requests to transfer image data, requests to destroy the contents of the machine and requests to operate attack devices in the machine. Of course it should be understood that these options are exemplary, and in other embodiments other or different requests may be received and instructions carried out. In the exemplary logic flow the at least one processor 230 operates responsive to the exception instructions to determine if the received signals are a status request. This is done as represented in a step 312. It is determined whether one or more statuses are currently indicated in a step 314. If no statuses are indicated, the logic returns to step 298. This is done to determine whether the machine may have been inadvertently temporarily disconnected from its AC power source and the network, for example.

Alternatively, if in step 314 the statuses have been indicated, they are determined and data corresponding thereto is transmitted through the wireless transmitter. This is represented in a step 316. In an exemplary embodiment the statuses transmitted include statuses that reflect the open or closed condition of the chest door. This is done based on sensor 254. Likewise statuses include signals corresponding to the status of cash holding cassettes, deposit holding cassettes or other containers holding valuable items in the machine. In still other embodiments status data may include information that indicates the condition of various cash destruction devices or attack devices in the machine. Of course these statuses are exemplary. Also it should be understood that in other exemplary embodiments statuses may be selectively delivered responsive to wireless signals received through the wireless receiver. In the exemplary embodiment after the appropriate status information is transmitted in a step 316, the logic flow of the exception instructions returns to step 298.

It should be understood that in exemplary embodiments the status of the machine may also be checked relative to the network by communications through server 272. Thus for example, the at least one remote computer 264 may operate to test whether the automated banking machine is actually connected to the network by causing messages to be sent to the machine to check whether it can be reached through the network. This can be done either directly in some embodiments or by communications through other financial transaction computers that would attempt to operate the machine. In this manner some exemplary embodiments may check whether a malfunction has caused the machine to carry out the exception instructions. Alternatively or in addition, the remote computer 264 may operate in a manner similar to the incorporated disclosure to contact appropriate personnel and notify them about the status of the machine. This may include personnel at the facility where the machine is located. It may also include contacting persons responsible for maintenance of the machine either at the facility which includes the machine, or remotely. Such persons can be contacted to determine whether there is any improper activity occurring at the machine or at the facility where the machine is located. This may help to identify erroneous signals and/or avoid taking action in situations where a disconnection or movement of the machine is being carried out for a legitimate purpose.

Returning to the logic schematically indicated in FIG. 12 when the wireless signal that is received is determined not to be a status request, a determination is made thorough a step 318 as to whether the received wireless signal represents a request to transmit images. If so the at least one processor 230 carries out the exception instructions to cause image data to be transmitted. The image data corresponds to images captured by one or more cameras 52. This is represented by a step 320. The at least one processor operates in accordance with the exception instructions to continue to transmit images until a wireless signal is received to discontinue such transmission. This signal is monitored in a step 322. As indicated in step 324, if the signal indicating that the banking machine should stop transmitting images is received, the logic flow in the exception instructions returns to step 298. Of course as can be appreciated the ability of the exemplary embodiment to transmit image data may enable authorities to remotely capture images regarding the perpetrators of the illegal activity and may also enable remote personnel to control selectively the cash destruction devices and attack devices as appropriate in response to activities being carried out at the machine. Of course these approaches are exemplary.

As represented in FIG. 12 if the at least one wireless signal received by the banking machine through the wireless receiver corresponds to a cash destruction request, this is determined in a step 326. As previously discussed, instructions to operate cash destruction devices may include one or more types of activities that destroy cash as well as other items within the banking machine. In addition in some embodiments where multiple cash destruction devices are present, the exception instructions may provide for the selective operation of such devices responsive to the received wireless signals. In the exemplary embodiment the receipt of a destruction request causes the at least one processor 230 to carry out a portion of the exception instructions which cause operation of the destruction device. This is represented by a step 328. The operation of the destruction device is further indicated through operation of the at least one processor by setting status data to indicate that the particular device has operated. This is represented in a step 330. After the destruction device is operated and the status data set, the logic flow returns to step 298.

In the exemplary embodiment if the received signals correspond to an attack device request this is determined in a step 332. The determination that an attack device operation request has been received causes the execution of some of the exception instructions that cause the attack device to operate. This is represented by a step 334. As can be appreciated, in some embodiments particularly those with multiple attack devices, the received signals may enable the attack devices to be selectively operated in response to received signals. Thus for example the at least one processor 230 may operate in response to signals received from computer 264 to cause the attack devices to deploy at an appropriate time. This might include for example deploying the tear gas or pepper spray shortly after the chest door is sensed as being open. Alternatively and for example, this may include actuating the electric shock device responsive to a currency holding cassette being sensed as being removed from its normal position. The attack devices may be operated in some embodiments responsive to certain programmed sequences including instructions included in the exception instructions. Alternatively or in addition, in some embodiments the attack devices may be operated in response to wireless signals received by the machine in response to manual inputs provided at the remote computer 264. Thus for example in some embodiments the attack devices may be selectively discharged based on conditions sensed at the machine, image data or other information that is available either at the banking machine or at the remote computer. Of course these approaches are exemplary and in other embodiments other approaches may be used.

In the exemplary embodiment after operation of the attack device, the at least one processor 230 operates in response to the exception instructions to cause to be set, status data. This status data is indicative of the actuation of the attack device. This is represented schematically by a step 336. After execution of the step 336 the logic flow returns to step 298.

It should be understood that this logic flow is schematic and merely exemplary of capabilities that may be carried out by an automated banking machine through operation of the exception instructions. Additional features, functions and other capabilities may be provided in other embodiments.

It should also be understood that the capabilities provided through the exemplary embodiment may also be used for other purposes, including those not related to deterring the theft of an automated banking machine. For example in some embodiments the exception instructions may be operative to enable communications between the at least one processor and remote systems in circumstances where the operating system of the machine is not fully operational. Thus for example, if the machine has sustained a malfunction the exception instructions may include the capability to connect the at least one processor to a remote computer from which a patch and/or a complete new copy of the operating system may be downloaded. In other exemplary embodiments the exception instructions may include the embryo copy and/or other archive copies of instructions usable for recovery purposes. Also in other embodiments the exception instructions may be operative to receive repair data, copies of additional applications or other information that can be transmitted even at times while the automated banking machine is not operational.

In still other embodiments the exception instructions may be operative even when the processor is operative, to provide certain functions or to prevent certain activities. This may include for example, having instructions that operate to cause the machine to report on the status of certain devices or conditions at the machine. This may include for example, reporting on the status, type and/or version level of one or more software programs included in the at least one data store 232. This function may enable persons who provide the machine or the software thereon, to determine if the machine has been modified with illegal copies of software, for example. Alternatively or in addition, the exception instructions may monitor the machine to determine if efforts have been made to modify software, encryption keys or other features programmed in the machine in a manner that is improper. In this way the exception instructions may report activity that suggests that potentially criminal activity has occurred with regard to the machine. Of course these approaches are exemplary and in other embodiments other approaches may be used.

In exemplary embodiments the exception instructions may be stored in a nonvolatile memory which is not readily accessed or modified. Thus for example, such exception instructions may be included on the machine in a manufacturing environment and in a way that prevents such instructions from being readily changed in the field. Alternatively or in addition, parameters may be set in a factory environment which provide for limited access to the exception instructions to prevent the execution thereof by unauthorized persons or in unauthorized circumstances Likewise electronic security mechanisms may be included to prevent unauthorized access or changing of the exception instructions. These approaches enable access to the exception instructions to be highly restricted so as to prevent the improper use and/or modification thereof. Of course these approaches are exemplary and in other embodiments other approaches may be used.

In some embodiments provisions may be made for assuring that attack devices and/or cash destructions devices do not malfunction and operate at inappropriate times. This may be done for example by providing for communication with a remote computer 264 or other computer to disarm the devices. Such messages may be sent in some embodiments via a wireless network or alternatively through the transaction network. Such messages may cause the at least one processor to carry out exception instructions which assure that such attack devices and/or cash destruction devices are not armed and/or have not or will not operate during a time period that the machine is being accessed by authorized personnel. In exemplary embodiments the status of the machine as being unarmed may be communicated through the service display that can be viewed through the window on the machine. Alternatively such messages may be output through another display or other output device on the machine. Such messages may provide servicers with assurance that they can access the machine without sustaining damage to person or property.

Alternatively or in addition, servicers may be provided with diagnostic devices or other devices that are enabled to communicate with the machine and which cause the exception instructions not to be carried out. These may include for example, devices such as portable phones, RFID cards, NFC devices or other portable devices that communicate data with the machine. Such devices may achieve communication through the at least one processor with various transaction devices, and may cause the exception instructions to be executed so as to assure that the cash destruction devices and/or attack devices are not operational. In some exemplary embodiments a portable device used for purposes of disabling such devices may also provide access to diagnostic data or status data of the machine to a servicer. In still other embodiments the machine may be programmed to disable the cash destruction devices and/or attack devices responsive to both the presence of local inputs or an article provided by a servicer, and certain remote signals from a remote source. Of course these approaches are exemplary of approaches that may be used in connection with some embodiments to assure that persons that are authorized to have access to the machines may do so without risk of activities being misunderstood as those of criminals.

Figure 21:
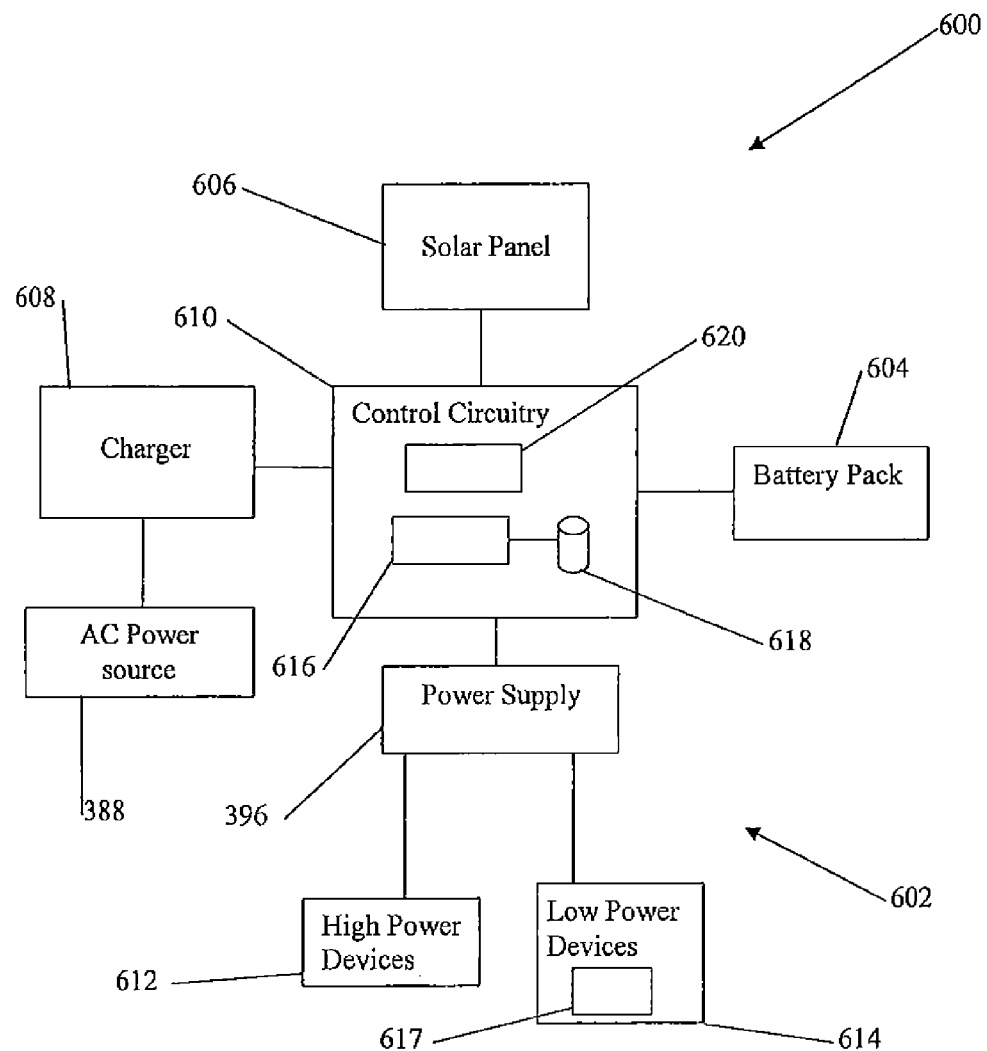
FIG. 21 is a schematic representation of an alternative exemplary embodiment of a power control system for an automated banking machine.
Figure 22:
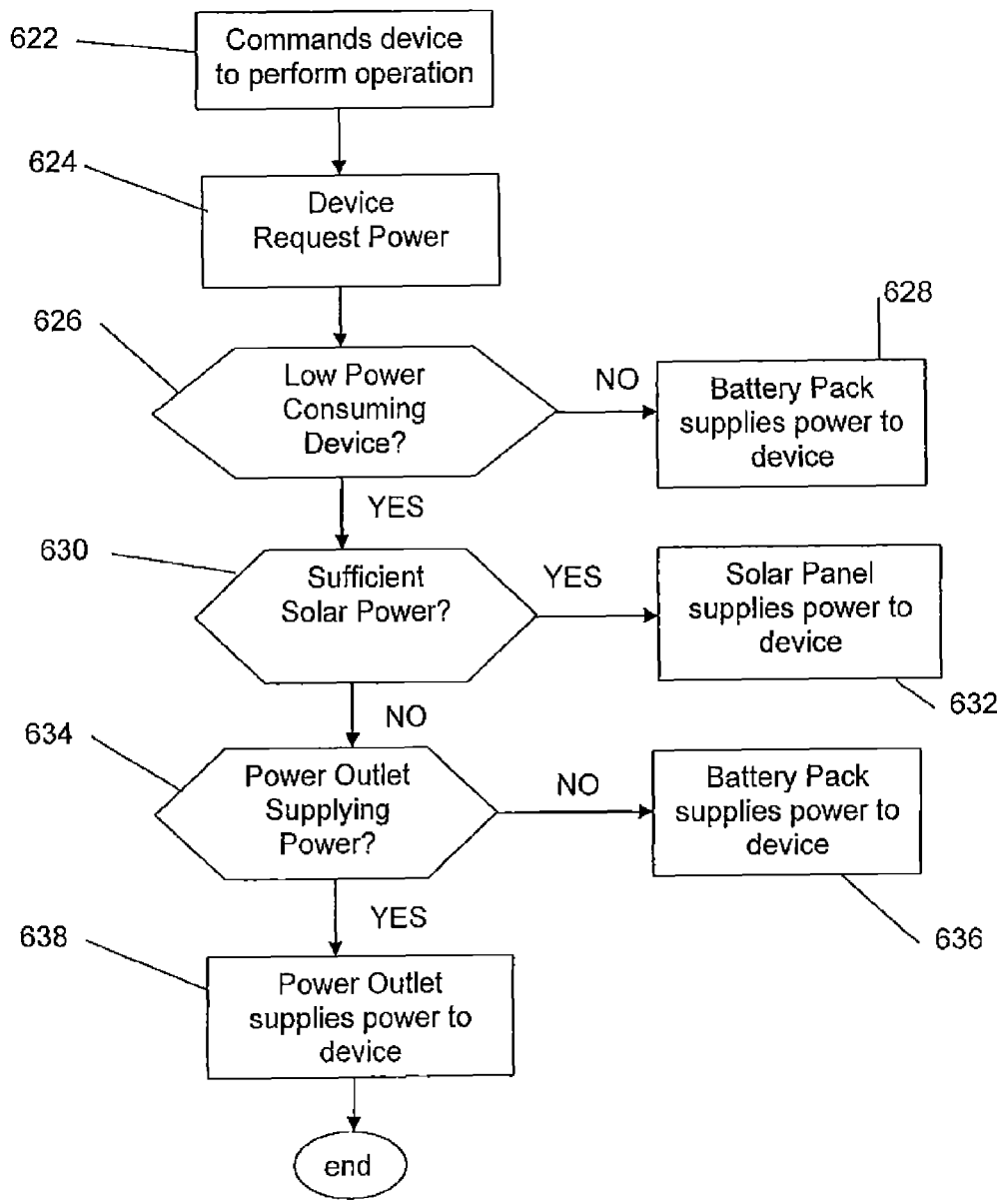
FIG. 22 is a schematic representation of steps for an exemplary process carried out by the power control system of FIG. 21.

It is not uncommon for power supplies used in automated banking machines of conventional design to be sized such that it meets the possible peak power demand of the devices which are included in the banking machine that could possibly run simultaneously plus some additional capability as a safety factor. The peak demand can be three to ten times more than the average demand, even though the peak demand may only last for a short time. For example, the near peak demand may last for ten seconds when printing a receipt and thirty seconds when dispensing cash. For most of the time, the machine is idling and requiring only a small fraction of the peak demand. This may be a power supply with much greater capability than is needed most of the time and inefficient operation by the power supply. FIG. 21 schematically shows another exemplary embodiment of a power control system for an automated banking machine 600 that provides for more energy efficient operation of the machine 600. The machine 600 may have similar features to the machine 340 previously described except as discussed below. The exemplary power control system 602 of this automated banking machine includes a battery back 604 including one or more batteries, a solar panel 606, and a battery charger which is alternatively referred to herein as a charging circuit 608. These components are operatively connected to a power control circuit 610. The control circuit 610 is operatively connected to the power supply 396. In this example embodiment the power supply may include transformers and other circuitry operative to deliver electrical power to the devices at the level or levels required for their operation. The power supply 396 is operatively connected to high power consuming devices 612 such as the cash dispenser 352 and the thermal printer 350, or other high power consuming device and to low power consuming devices 614 such as the card reader 348, LED display 617 (schematically indicated in FIG. 21), a keypad, low power printer, or other low power device. Although not indicated in the schematic diagram, example power supplies may include direct electrical connections to one or more of the battery pack, the solar panel, the battery charger or other power sources. Example embodiments may include relays or other components for operatively connecting and disconnecting the power sources and the power consuming devices. Of course it should be understood that these devices are exemplary and other banking machine embodiments may include other types of devices such as cash acceptors, cash recyclers, check acceptors, wireless ports, cell phone transceivers, satellite transceivers and other devices useful in carrying out financial transfers or other types of transactions. Example embodiments may also include other power sources, such as for example, wind power electrical generators, fuel cells, gas or diesel powered generators and the like.

The control circuit 610 may include at least one processor 616 which is alternatively referred to herein as a controller, that may be included on one or more printed circuit boards. The processor 616 may be in operative connection with at least one data store 618. The data store may include suitable forms of volatile and/or nonvolatile memory. The exemplary control circuit 610 may include a power monitor circuitry 620 that monitors the power available from power sources such as the battery pack 604 and solar panel 606 and the power available from the battery charger 608. The at least one processor 616 is in operative communication with the monitor circuit 620. Processor 616 uses data corresponding to power thresholds stored in the data store 618 to determine if there is sufficient power available from these power source components 604, 606, 608 to operate the devices 612, 614 and the power supply 396.

The battery pack 604 when adequately charged is capable of providing sufficient power to run the high power consuming devices 612. The battery pack 604 may be charged by electrical power from the battery charger 608 when such charging is determined to be desirable by the control circuitry 610 and power from the charger is available. The exemplary battery charger 608 is plugged into or otherwise operatively connected to the AC power source 388. In the exemplary embodiment, the AC power source 388 may be a power outlet connected to household current that provides 110 volts of alternating current. The battery charger 608 may be a suitable device that draws relatively little power and converts the AC power to DC power. The battery charger provides power which is directed to the battery at times and at levels as determined by the control circuitry. In the exemplary embodiment the control circuitry operates to vary the charging level so as to attempt to keep the battery generally fully charged, but also prevents overcharging. For example, the battery charger may be of the type that is used to power and charge a laptop computer battery and may be rated at 19.4V/5 A. Again, this is exemplary, and in other embodiments other power sources may be used.

The exemplary control circuit 610 also enables the battery pack 604 to be charged from power generated by the solar panel 606. The control circuit 610 also enables the low power consuming devices 614 such as the card reader 348 and display 617 to be run from power received from the solar panel 606, if the processor 616 determines that there is sufficient solar power available from the solar panel 606. The exemplary solar panel 606 may have a peak output of around 17V/4.6 A. Again, this is exemplary, and in other embodiments other power sources may be used.

If the processor 616 determines that there is not sufficient electrical power available from the solar panel 606 to run the low power consuming devices when required, the control circuitry 610 operates in accordance with its programming to cause the power supply to deliver power from another source. The exemplary control circuitry makes the power available through the battery charger from the AC power outlet 388 through the power supply to run the low power consuming devices 614. The control circuitry may also operate to use excess power available from the charger to charge the battery pack 604, if necessary. If power is lost from the power outlet 388, and power is not available from the solar panel 606, the control circuit 610 operates in accordance with its programming to cause the power from the battery pack 604 to be used to supply power to run the devices of the machine 600. This may be done in some embodiments by the control circuit operating to cause the power supply to operatively connect the battery pack to the devices through a relay in the power supply. The monitoring circuit also operates in accordance with programmed instructions stored in a data store associated with a processor of the control circuit to be sure that the battery is not overcharged (by reducing or stopping charging when the battery pack is fully charged) and is also not totally discharged (i.e., shuts machine off before the battery is depleted), since either condition would shorten the battery life. Of course other embodiments may perform other or different functions.

In an exemplary embodiment, the control circuit 610 is also operative to supply electrical power to the terminal processor. The terminal processor in an exemplary embodiment comprises a suitable computer including at least one processor and data store, which computer is alternatively referred to as a terminal processor. The terminal processor of the exemplary embodiment receives power from the power supply 396 under the control of the control circuit 610. The terminal processor includes the programmed instructions and data suitable for operating the transaction function devices of the machine in order to carry out financial transactions. Such example transactions may include dispensing cash assessed to accounts of the user, accepting cash, checking account balances, adding credit to cell phone accounts and other transactions. Example embodiments may also include other features of the types previously described. This may include features for purposes of starting and shutting down the operation of the terminal processor and other devices of the machine. This may be accomplished in some embodiments through the operation of the power control circuitry or other suitable devices.

An exemplary process involving the operation of the power control system 602 in response to a power request from one of the devices 612, 614 will now be discussed for further illustration. In step 622, the central terminal processor or other controller for operation of the machine sends at least one message to one of the devices 612, 614 which corresponds to an instruction to perform an operation. In step 624, the device sends a message to the processor 616 corresponding to a request to perform the operation. In some embodiments the message may include data corresponding to the device and/or operation type. In other embodiments the at least one message may include data which indicates a predetermined amount of power needed to perform the operation. In step 626, the processor 616 determines whether the device is a low power consuming device 614 based on the power request. If the device is not a low power consuming device 614 and thus a high power consuming device 612, the control circuitry 610 operates to cause the battery pack 604 to be operatively in operative connection with the device by controlling the power supply to make power available for operation of the high power consuming device 612 to complete the operation of the device as represented by step 628.

If the power requested is indicative of operation of a low power consuming device 614, the processor 616 determines whether there is currently sufficient power available from the solar panel 606 to run the device as represented by step 630. If there is sufficient power available from the solar panel 606, the control circuitry 610 causes the power from the solar panel 606 to be operatively connected to supply the power to run the device. If or when additional power from the solar panel is available, the control circuitry may also operate to cause power from the solar panel to be operatively connected to and used to charge the battery pack as represented by step 632. If there is not sufficient power currently available from the solar panel 606, the control circuitry 610 determines whether the power outlet 388 and the battery charger has power available as represented by step 634. If the power outlet 388 and charger circuit is not capable of supplying power, the control circuit 610 causes power from the battery pack 604 to be operatively connected to and used to supply power to the low power consuming device 614 to complete the operation of the device as represented by step 636. If the power outlet 388 is available to supply power, the control circuitry 610 causes power passed through from the battery charger from the power outlet 388 to be operatively connected to supply power to run the low power consuming device 614 to complete the operation. The control circuitry may also use excess power available from the battery charger when available to charge the battery pack 604 as represented by step 638. Of course similar steps may be taken with regard to other power sources that are included in exemplary systems.

When the machine is idle and not conducting a transaction, the machine may operate in accordance with the programming of its terminal processor to have its low power display 617 such as an LCD display present a message advising a user to insert a card or take another initial step if they wish to begin a transaction. The exemplary display and the terminal processor requires relatively little power to perform this operation. This amount of power is generally available from the battery charger 608 or during daylight from the solar panel 606. If a user inserts a card, the magnetic stripe of the card or other card data can be read responsive to one or more messages from processor 342. The LCD display then operates responsive to the processor to provide outputs that then prompts the user to input their PIN number through a keypad. The keypad may receive the PIN input responsive to the terminal processor 32. The keypad and the processor 342 that receives the PIN data of the exemplary embodiment consume relatively low power in performing these functions. Generally, in the exemplary machine these activities also require less power than is available from the battery charger 608 or from the solar panel 606, and the control circuit operates to make power from these power sources available to the devices through operation of the power supply.

When more power is needed to operate a high power consuming device 612, the control circuitry 610 enables power from the battery pack 604 to be available to operate the high power consuming device 612. The battery pack 604 may provide the power necessary through the power supply to cause the machine to communicate with a remote host computer through a cellular or satellite transceiver or a modem, to operate the motors and other electrical components of the cash dispenser 352 to dispense cash and/or to operate the motors, thermal print head, cutter and other electrical devices of printer 350 to print and deliver the receipt for the user, for example. Once this is done, the control circuitry 610 operates in accordance with its programming and/or communications from processor 342 to return to operating the machine 600 using minimal power from the solar panel 606, if the power is available in the solar panel 606, or from the battery charger, or other available power source.

This exemplary embodiment may allow the amount of power that must be provided through operation of the power supply to be significantly lower compared to that which might be used in other banking machines. For example, in some embodiments the power required from the power supply may be reduced from operating at hundreds of watts to under a hundred watts. For example, some example machines may require only a maximum 60 watt power supply. The smaller capacity power supply also operates more efficiently since it operates at a high efficiency more often at or nearly a full load. Hence, the example power supply avoids working at a low efficiency with a very light load as may occur in some conventional machines. Further, the exemplary power control system includes circuitry which provides a built-in uninterruptible power supply functionality from the battery pack and/or other available power sources and thus may obviate the need for a separate uninterruptible power supply. The circuitry of the exemplary embodiment operates to avoid interruption of power to the processor or other devices by assuring delivery of power thereto from another available sources. Also, multiple input power sources (the battery, solar panel, and power outlet) are used to better assure that power is available.

Moreover, when the other input power sources are not available, the power control system automatically switches the power supply or otherwise to make available power from the battery pack to supply the required power to perform required operations. The exemplary battery pack may be more efficient at supplying power than an uninterruptible power supply, since the battery pack does not have the energy losses from the AC/DC conversion of the power from the AC power source. The exemplary power control system also operates to cause at least one processor to monitor the battery charge level and charge and discharge history to prevent the over-charge or over-discharge of the battery. The exemplary power control system also operates in accordance with programmed instructions to prioritize the use of certain input power sources to supply needed power based on certain criteria. For example, the processor may operate to cause power from the solar panel to be used when available rather than draw power from the AC power source through the battery charger circuit. Of course in other example embodiments other power sources may be operatively connected to the machine and used to supply power for machine operation.

Further, while in some example embodiments described, at least some devices operate to communicate messages to the power control circuit to request power necessary to operate, other example embodiments may operate using other approaches. This may include for example, the approach previously described in which the power control circuit operates in conjunction with or is integrated and operates as part of the terminal processor. For example, in some embodiments the programming of the terminal processor may include the capability to determine the power required to operate a device before a device is instructed to operate through messages sent responsive to operation of the terminal processor. The terminal processor may operate in accordance with its programming to cause the control circuit and/or the power supply to make power from the processor selected power source available to the device before or concurrently with the sending of one or more messages from the terminal processor to the device, which messages cause the device to perform one or more functions. Of course these approaches are exemplary and in other embodiments other approaches may be used.

Figure 23:
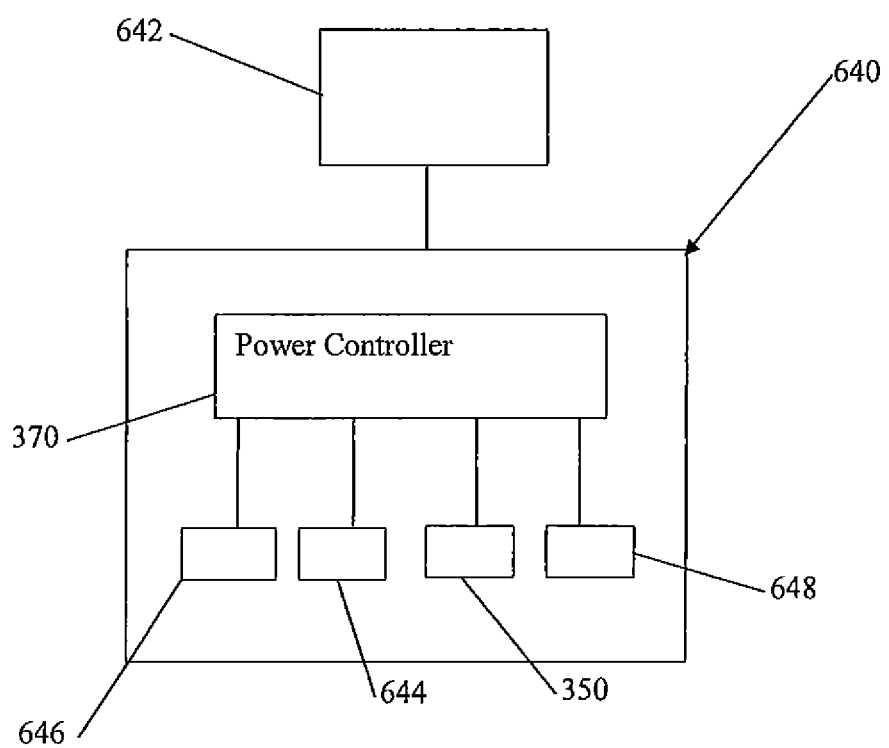
FIG. 23 is a schematic view of a portion of a power control system for an automated banking machine of still another exemplary embodiment.

In further example embodiments data from smart power grids can be used to more effectively deliver electricity from suppliers to automated banking machines. In such systems one or two-way digital communications may be used to control device operation for purposes of efficient power delivery to save energy, reduce costs, and increase reliability. FIG. 23 shows an exemplary embodiment of a system in which an automated banking machine is configured to conserve power in response to indications or messages from a smart grid or other electrical control data source 642. The exemplary machine may be similar to machine 340 except as discussed below. In this example embodiment, the source 642 is in operative communication with the power controller 370 of the machine. The source 642 may communicate messages indicative of a need to conserve energy to the power controller 370. Such messages may be output by a web or other portal provided by for example, the U.S. Department of Energy or a power company on a public or private network which indicates that devices within certain regions need to reduce energy usage. Alternatively, the source 642 may communicate the information to the power controller 370 through a host computer that communicates with the automated banking machine for purposes of conducting transactions. Alternatively messages may be received from a remote server via the Internet, a server provided by a bank or other entity that communicates over a public, private or wireless network which provides a periodic indication of energy availability in the geographic region of the machine. Alternatively, in some exemplary embodiments the machine may operate to reduce power consumption based on messages from a server that is operated by a service providing entity that is retained to reduce the energy costs of the machine owner. Such a system may additionally operate to determine time periods or other conditions that suggest that the operation of the machine may be modified to reduce power consumption. Messages from the server to the machine may operate to cause the machine to operate in a reduced power mode, or to shut off (and subsequently turn on). Such systems may employ principles like those described in U.S. Pat. Nos. 7,617,971; 7,604,164; 7,360,048; 7,334,723; 7,333,954; 7,316,349; 6,279,826; 5,984,178 and U.S. Publication No. 2009/0114719-A1, the disclosures of each of which are incorporated herein by reference in its entirety.

In response to receiving one or more messages corresponding to an indication to conserve power, the power controller 370 operates in accordance with its programming to reduce the machine power consumption. This may involve causing the power controller 370 to execute one or more sequences of programmed instructions to cause power to be shut off to certain transaction function devices while maintaining the processor in operating condition. The power controller 370 may cause the machine 640 to operate in a full or partial sleep mode to conserve power.

Alternatively, in response to receiving the indication to conserve power, the power controller 370 may execute one or more sequences of programmed instructions to cause the machine to shut off. The power controller 370 could then later execute one or more sequences of program instructions to cause the machine to start up, or to commence additional operations when the data source indicates that the need to conserve power has passed or for other suitable reasons.

In addition, the exemplary machine 640 may include at least one sensor 644 that is operative to sense a condition or an activity that indicates the need for the machine to wake up from the sleep mode. For example, the sensor 644 could be an ultrasonic sensor that is operative to sense an object or a person standing in close proximity to the front of the machine. Alternatively, a sensor could include a camera and video analysis system that detects a person moving to a position to operate the machine. Of course in other embodiments, other sensor types may be used. The power controller 370 is operatively connected to the sensor 644 and executes one or more sequences of programmed instructions to cause the machine 640 to be brought out of the sleep mode in response to the sensor 644 sensing this type of activity. Alternatively or in addition, the machine 640 may include a manual actuator such as a push button 646 in operative connection with the power controller 370 that may be activated by a user to cause the power controller 370 to bring the machine 640 out of the sleep mode. The push button 646 may be labeled to indicate to the user that it may be used to bring the machine into operation. Alternatively or in addition, the printer 350 of the machine 640 could print a document that is available through a receipt delivery slot to users, when the machine 640 goes into the sleep mode. The document includes information printed on it that advises a user to swipe their card to wake up the machine 640 from the sleep mode. Alternatively the receipt or a sign on the machine may instruct a user to place a phone call to a given number or to send a text message to a given number or address to bring the machine out of sleep mode.

Alternatively voice actuation, actuation by a mobile device through a wireless port via Bluetooth or NFC signals or other inputs may be used to bring the machine into an operative mode. For example, the machine may operate in accordance with its programming to transmit wireless signals from a wireless port that can be received by a nearby wireless phone. The signals cause the phone to provide an output through the phone indicating how to bring the machine into service. This might include an instruction to swipe a card through the card reader of the machine or press a button to bring the machine into operation. Alternatively, the phone output could prompt a user to provide one or more inputs through the phone to bring the machine into operation. This may include Bluetooth or NFC messages that are received by the machine and cause the machine to operate to become available for operation. Alternatively the user could be prompted through their phone to place a call to a designated number or to send a text message to a designated number or address. Such a message would be received by a remote computer which operates to cause messages to be sent to the machine to bring the machine into operation. Of course these approaches are exemplary.

When the user is about to conduct a transaction on the machine 640, the machine 640 would wake up and commence operation to perform the transaction for the user. After the transaction is performed, the power controller 370 may operate in accordance with its programming to cause the machine 640 to go back into the sleep mode. Alternatively, in some arrangements, the machine may operate in the wake up mode in a reduced power manner. For example, this may include having backlighting for a display 648 operating at low power and/or operating only during selected times during the operation of the transaction. These selected times of operation may be only when it is necessary to give the user a message on the display. This may be done responsive to at least one processor operating to cause the power to be shut off to backlighting or to reduce power to dim backlighting at times during transactions when the user does not need to receive messages from the machine. Of course other embodiments may operate to cause power to be turned off or power reduced to other types of devices when not in use.

Thus exemplary embodiments achieve at least some of the above stated objectives, eliminate difficulties encountered in the use of prior devices and systems, solve problems, and attain the desirable results described herein.

In the foregoing description, certain terms have been used for brevity, clarity, and understanding, however, no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function, and shall not be deemed limited to the particular means shown in the foregoing description or mere equivalents thereof. The provisions of an Abstract herewith shall not be construed as limiting the claims to features discussed in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:
an automated banking machine that is operable responsive at least in part to data read from data bearing records,
wherein the machine includes a plurality of transaction function devices,
wherein the transaction function devices include at least one data reader,
wherein the at least one data reader is operable to read user data that is usable to identify a financial account,
wherein the transaction function devices include a cash dispenser,
wherein the cash dispenser is operable to dispense cash to authorized users of the machine,
wherein the machine is associated with at least one processor operable to communicate with at least one remote computer,
wherein the at least one processor is operable to receive cash dispense transaction authorization messages provided by the at least one remote computer,
wherein the at least one processor is operable to cause, responsive at least in part to receiving a cash dispense transaction authorization message, the cash dispenser to dispense cash,
wherein the at least one processor is operable to receive reduce power consumption messages provided by the at least one remote computer responsive at least in part to a change in electrical grid demand in a geographic region in which the machine is located,
wherein the machine includes at least one user input device operable to receive user input from a machine user,
wherein the machine is operable in at least a first power consumption mode and a second power consumption mode,
wherein the machine is configured to consume less electricity in the second power consumption mode than in the first power consumption mode,
wherein the at least one processor is operable to cause, responsive at least in part to receiving a reduce power consumption message, the machine to be switched from the first power consumption mode to the second power consumption mode,
wherein the first power consumption mode allows the machine to carry out a plurality of transactions,
wherein the plurality of transactions include at least one user-selectable transaction,
wherein the second power consumption mode allows the machine to be asleep,
wherein when asleep the machine is unable to carry out the at least one user-selectable transaction,
wherein the second power consumption mode causes the machine to wake up from being asleep, responsive at least in part to at least one customer input that causes initiation of a user session involving the machine,
wherein when awake the machine is able to carry out the at least one user-selectable transaction,
wherein carrying out the at least one user-selectable transaction involves operation of at least one of the transaction function devices,
wherein the second power consumption mode causes the machine to return to being asleep responsive at least in part to completion of the user session,
wherein the machine is configured to consume less electricity when asleep than when awake.

2. The apparatus according to claim 1 wherein the machine is part of a banking system that includes a plurality of cash dispensing automated banking machines,
wherein the at least one data reader includes a card reader and a biometric reader,
wherein a transaction host includes the at least one remote computer,
wherein the machine includes the at least one processor,
wherein the at least one processor is operative to cause card data read by the card reader and card information stored in an authorized user information data store to be compared for a predetermined card relationship,
wherein the at least one processor is operative to cause biometric data read by the biometric reader and biometric information stored in the authorized user information data store to be compared for a predetermined biometric relationship,
wherein the at least one processor is operative to cause the read card data and the read biometric data to be compared for a predetermined user relationship,
wherein the at least one processor is operative to allow a machine user to request a cash dispense transaction responsive at least in part to each of:
the read card data and the card information having the predetermined card relationship,
the read biometric data and the biometric information having the predetermined biometric relationship, and
the read card data and the read biometric data having the predetermined user relationship.

3. The apparatus according to claim 1 wherein the machine includes a power controller, wherein the power controller is operable to switch the machine from the first power consumption mode to the second power consumption mode.

4. The apparatus according to claim 1 wherein the transaction function devices include a first transaction function device,
wherein the second power consumption mode causes the machine when awake for a user session, to operate the first transaction function device at a first power level,
wherein the second power consumption mode causes the machine when asleep after a user session, to operate the first transaction function device at a second power level, wherein the second power level is a reduced power level relative to the first power level.

5. The apparatus according to claim 1 wherein the transaction function devices include a first transaction function device,
wherein the second power consumption mode causes the first transaction function device to shutdown responsive at least in part to completion of a user session,
wherein when shutdown the first transaction function device does not use power.

6. The apparatus according to claim 1 wherein the second power consumption mode causes the machine to wake up from being asleep, responsive at least in part to the at least one user input device receiving user input from a machine user.

7. The apparatus according to claim 6 wherein the at least one user input device includes at least one manual input device,
wherein the second power consumption mode causes the machine to wake up from being asleep, responsive at least in part to the at least one manual input device receiving manual input from a machine user.

8. The apparatus according to claim 6 wherein the at least one user input device is operable to receive wireless signals,
wherein the second power consumption mode causes the machine to wake up from being asleep, responsive at least in part to the at least one user input device receiving at least one wireless signal from a mobile device.

9. A method involving an automated banking machine that is operable responsive at least in part to data read from data bearing records, comprising:
(a) operating the automated banking machine responsive at least in part to a change in electrical grid demand in a geographic region in which the machine is located, to switch from a first power consumption mode to a second power consumption mode,
wherein the machine includes a plurality of transaction function devices,
wherein the transaction function devices include at least one data reader,
wherein the at least one data reader is operable to read user data that is usable to identify a financial account,
wherein the transaction function devices include a cash dispenser,
wherein the cash dispenser is operable to dispense cash to authorized users of the machine,
wherein the machine is associated with at least one processor operable to communicate with at least one remote computer,
wherein the at least one processor is operable to receive cash dispense transaction authorization messages provided by the at least one remote computer,
wherein the at least one processor is operable to cause, responsive at least in part to receiving a cash dispense transaction authorization message, the cash dispenser to dispense cash,
wherein the at least one processor is operable to receive reduce power consumption messages provided by the at least one remote computer responsive at least in part to the change in the electrical grid demand,
wherein the at least one processor is operable to cause, responsive at least in part to receiving a reduce power consumption message, the machine to switch from the first power consumption mode to the second power consumption mode,
wherein the machine includes at least one user input device operable to receive user input from a machine user,
wherein the machine is configured to consume less electricity in the second power consumption mode than in the first power consumption mode,
wherein the first power consumption mode allows the machine to carry out a plurality of transactions,
wherein the plurality of transactions include at least one user-selectable transaction,
wherein the second power consumption mode allows the machine to be asleep,
wherein when asleep the machine is unable to carry out the at least one user-selectable transaction,
wherein the second power consumption mode allows the machine responsive at least in part to at least one customer input that causes initiation of a user session involving the machine, to wake up from being asleep,
wherein when awake the machine is able to carry out the at least one user-selectable transaction,
wherein carrying out the at least one user-selectable transaction involves operation of at least one of the transaction function devices,
wherein the second power consumption mode allows the machine to return to asleep responsive at least in part to completion of the user session,
wherein the machine is configured to consume less electricity when asleep than when awake;
(b) subsequent to (a), operating the machine to wake up from being asleep, responsive at least in part to at least one customer input that causes initiation of a user session involving the machine;
(c) subsequent to (b) and while still awake, operating the machine during the user session to carry out a first transaction of the at least one user-selectable transaction; and (d) subsequent to (c), operating the machine responsive at least in part to completion of the user session, to return to being asleep.

10. The method according to claim 9 wherein the machine includes a power controller,
   wherein (a) includes operating the power controller to switch the machine from the first power consumption mode to the second power consumption mode.

11. The method according to claim 9 wherein (c) causes a first transaction function device to operate at a first power level, wherein (d) causes the first transaction function device to operate at a second power level, wherein the second power level is a reduced power level relative to the first power level.

12. The method according to claim 9 wherein (d) causes a first transaction function device to be shutdown, wherein when shutdown the first transaction function device does not use power.

13. The method according to claim 9 and further comprising
   (e) prior to (b), operating the at least one user input device to receive user input from a machine user;
   wherein (b) includes operating the machine to wake up responsive at least in part to the user input received in (e).

14. The method according to claim 9
   wherein the machine includes at least one proximity sensor,
      wherein the at least one proximity sensor is operative to detect a person located adjacent the machine,
   and further comprising
      (e) prior to (b), operating the at least one proximity sensor to detect a person adjacent to the machine;
   wherein (b) includes operating the machine to wake up responsive at least in part to the detection in (e).

15. The method according to claim 9 wherein a transaction host includes the at least one remote computer,
   wherein (a) includes operating the machine to switch from the first power consumption mode to the second power consumption mode, responsive at least in part to the at least one processor receiving a reduce power consumption message provided by the transaction host.

16. A method comprising:
   (a) operating at least one processor associated with an automated banking machine to receive a reduce power consumption message provided by a remote computer system responsive at least in part to a change in electrical grid demand in a geographic region in which the machine is located,
      wherein the machine includes a plurality of transaction function devices,
         wherein the transaction function devices include at least one data reader,
            wherein the at least one data reader is operable to read data that is usable to identify a financial account,
         wherein the transaction function devices include a cash dispenser,
            wherein the cash dispenser is operable to dispense cash to authorized users of the machine,
               wherein the at least one processor is operable to cause, responsive at least in part to receiving a cash dispense transaction authorization message, the cash dispenser to dispense cash,
               wherein the at least one processor is operable to receive cash dispense transaction authorization messages provided by the remote computer system,
      wherein the machine includes at least one input device operable to receive input, including input indicative of a customer;
   (b) operating the at least one processor responsive at least in part to the message received in (a), to cause the machine to be switched from a first power consumption mode to a second power consumption mode,
      wherein the machine is configured to consume less electricity in the second power consumption mode than in the first power consumption mode,
      wherein the first power consumption mode allows the machine to carry out a plurality of transactions,
         wherein the plurality of transactions include at least one user-selectable transaction,
      wherein the second power consumption mode allows the machine to be in a sleep state,
         wherein the machine is configured to consume less electricity when in the sleep state than when in an awake state,
         wherein the machine when in the sleep state is unable to carry out the at least one user-selectable transaction;
   (c) subsequent to (b), operating the at least one processor to cause the machine to change from being in the sleep state to being in the awake state, responsive at least in part to the at least one input device receiving at least one input indicative of a customer;
   (d) subsequent to (c) and while the machine is still in the awake state, operating the at least one processor to cause the machine to carry out a first transaction of the at least one user-selectable transaction; and
   (e) subsequent to (d), operating the at least one processor responsive at least in part to completion of the machine carrying out the first transaction, to cause the machine to change from being in the awake state to being in the sleep state.

17. The method according to claim 16 wherein a transaction host includes the remote computer system,
   wherein (a) includes operating the at least one processor to receive a reduce power consumption message provided by the transaction host.

18. The method according to claim 16 wherein the at least one input device includes at least one manual input device,
   wherein (c) includes operating the at least one processor to cause the machine to change from being in the sleep state to being in the awake state, responsive at least in part to the at least one manual input device receiving at least one manual input from a customer.

19. The method according to claim 16 wherein the at least one input device includes at least one proximity sensor,
   wherein (c) includes operating the at least one processor to cause the machine to change from being in the sleep state to being in the awake state, responsive at least in part to the at least one proximity sensor sensing a customer.

20. The method according to claim 16 wherein the at least one data reader includes a card reader, wherein the machine includes a card slot leading to the card reader,
   wherein the at least one input device includes at least one card sensor located adjacent the card slot,
      wherein (c) includes operating the at least one processor to cause the machine to change from being in the sleep state to being in the awake state, responsive at least in part to the at least one card sensor sensing a card.

* * * * *